US012587124B2

(12) United States Patent
Sheeks et al.

(10) Patent No.: US 12,587,124 B2
(45) Date of Patent: Mar. 24, 2026

(54) HIGH POWER BATTERY-POWERED SYSTEM

(71) Applicant: MILWAUKEE ELECTRIC TOOL CORPORATION, Brookfield, WI (US)

(72) Inventors: Samuel Sheeks, Germantown, WI (US); Jeffrey M. Brozek, Mequon, WI (US); Keith Boulanger, Kenosha, WI (US); Andrew T. Beyerl, Pewaukee, WI (US); Timothy R. Obermann, Waukesha, WI (US); Alex Huber, Menomonee Falls, WI (US); Samantha L. Billetdeaux, New Berlin, WI (US); Lance D. Lamont, Brookfield, WI (US); Matthew J. Mergener, Mequon, WI (US); Donald J. Truettner, Waukesha, WI (US); Cameron R. Schulz, Milwaukee, WI (US); Kyle J. Radovich, West Bend, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 373 days.

(21) Appl. No.: 16/700,195

(22) Filed: Dec. 2, 2019

(65) Prior Publication Data

US 2020/0106380 A1    Apr. 2, 2020

Related U.S. Application Data

(63) Continuation of application No. 16/025,491, filed on Jul. 2, 2018.

(Continued)

(51) Int. Cl.
*H02P 29/40*        (2016.01)
*H01M 10/42*        (2006.01)
(Continued)

(52) U.S. Cl.
CPC ........ *H02P 29/40* (2016.02); *H01M 10/4207* (2013.01); *H01M 10/425* (2013.01);
(Continued)

(58) Field of Classification Search
CPC ............ H01M 10/482; H01M 10/425; H01M 10/4207; H01M 2/30; H02P 6/26; H02P 29/40
(Continued)

(56) References Cited

U.S. PATENT DOCUMENTS

| | | | |
|---|---|---|---|
| 3,952,239 A | 4/1976 | Owings et al. | |
| 4,905,423 A | 3/1990 | van Laere | |

(Continued)

FOREIGN PATENT DOCUMENTS

| | | | |
|---|---|---|---|
| AU | 2009268165 | | 1/2010 |
| AU | 2016262731 A1 | | 12/2016 |

(Continued)

OTHER PUBLICATIONS

International Search Report and Written Opinion for Application No. PCT/US2017/066972 dated Apr. 16, 2018, 15 pages.

(Continued)

*Primary Examiner* — Kawing Chan
(74) *Attorney, Agent, or Firm* — Michael Best & Friedrich LLP

(57)        ABSTRACT

An electrical combination, a tool system, an electric motor, a battery pack, and operating and manufacturing methods. The tool may include a tool housing, a motor supported by the tool housing, the motor having a nominal outer diameter of up to about 80 millimeters (mm), the motor being operable to output at least about 2760 watts (W), and a tool terminal electrically connected to the motor; a battery pack including a pack housing defining a volume of the battery pack, the volume being up to about $5.2 \times 10^6$ cubic millime- (Continued)

ters (mm³), battery cells supported by the pack housing, the battery cells being electrically connected and having a nominal voltage of up to about 80 volts (V), and a pack terminal electrically connectable to the tool terminal to transfer current between the battery pack and the tool; and a controller operable to control the transfer of current.

30 Claims, 94 Drawing Sheets

Related U.S. Application Data

(60) Provisional application No. 62/527,735, filed on Jun. 30, 2017.

(51) Int. Cl.
    *H01M 10/48*      (2006.01)
    *H01M 50/204*    (2021.01)
    *H01M 50/296*    (2021.01)
    *H02P 6/26*      (2016.01)

(52) U.S. Cl.
    CPC ....... *H01M 10/482* (2013.01); *H01M 50/296* (2021.01); *H02P 6/26* (2016.02); *H01M 2010/4271* (2013.01); *H01M 50/204* (2021.01)

(58) Field of Classification Search
    USPC .......................................................... 318/17
    See application file for complete search history.

(56) References Cited

U.S. PATENT DOCUMENTS

| | | | |
|---|---|---|---|
| 5,238,083 | A | 8/1993 | Horie et al. |
| 5,534,788 | A | 7/1996 | Smith et al. |
| 5,553,675 | A | 9/1996 | Pitzen et al. |
| 5,578,391 | A | 11/1996 | Meyers et al. |
| 5,762,512 | A | 6/1998 | Trant et al. |
| 5,973,476 | A | 10/1999 | Irvin |
| 6,225,153 | B1 | 5/2001 | Neblett et al. |
| 6,225,708 | B1 | 5/2001 | Furukawa et al. |
| 6,365,297 | B1 | 4/2002 | Wolczak et al. |
| 6,741,065 | B1 | 5/2004 | Ishii et al. |
| D535,250 | S | 1/2007 | Watson |
| 7,161,326 | B2 | 1/2007 | Kubota et al. |
| 7,323,846 | B2 | 1/2008 | Santana, Jr. |
| 7,397,219 | B2 | 7/2008 | Phillips et al. |
| 7,411,326 | B2 * | 8/2008 | Achor .................... H02K 5/225 |
| | | | 310/68 B |
| 7,443,134 | B2 | 10/2008 | Phillips et al. |
| 7,463,007 | B2 | 12/2008 | Phillips et al. |
| 7,486,047 | B2 | 2/2009 | Phillips et al. |
| 7,489,108 | B2 | 2/2009 | Matsumoto et al. |
| D597,931 | S | 8/2009 | Aglassinger |
| 7,598,705 | B2 | 10/2009 | Watson et al. |
| 7,701,172 | B2 | 4/2010 | Watson et al. |
| 7,767,335 | B2 | 8/2010 | Sharrow et al. |
| D633,036 | S | 2/2011 | Murray |
| D640,196 | S | 6/2011 | Shuang et al. |
| 8,054,047 | B2 | 11/2011 | Chen et al. |
| 8,337,237 | B2 | 12/2012 | Masuda et al. |
| 8,368,283 | B2 | 2/2013 | Kim et al. |
| D679,651 | S | 4/2013 | Stratford |
| D680,064 | S | 4/2013 | Tirone et al. |
| 8,450,975 | B2 | 5/2013 | Kim |
| D687,380 | S | 8/2013 | Tirone et al. |
| 8,564,245 | B2 | 10/2013 | Bosch et al. |
| D699,180 | S | 2/2014 | Sweere et al. |
| 8,752,645 | B2 | 6/2014 | Liebhard |
| 8,766,599 | B2 | 7/2014 | Kim |
| 8,852,775 | B2 | 10/2014 | McGuire et al. |
| 9,077,053 | B2 | 7/2015 | Schneider et al. |
| 9,112,292 | B2 | 8/2015 | Ogura |
| 9,197,146 | B2 * | 11/2015 | Mergener .................. H02P 6/15 |
| 9,444,082 | B2 | 9/2016 | Tsujimura et al. |
| D780,688 | S | 3/2017 | Elder |
| 9,601,729 | B2 | 3/2017 | Naito |
| 9,786,877 | B2 | 10/2017 | Umemura et al. |
| D812,555 | S | 3/2018 | Schoch |
| 9,923,249 | B2 | 3/2018 | Rejman et al. |
| 9,931,707 | B2 | 4/2018 | Balaster |
| D826,150 | S | 8/2018 | Cayon |
| D841,572 | S | 2/2019 | Gilpatrick et al. |
| D844,556 | S | 4/2019 | Irfan et al. |
| D844,558 | S | 4/2019 | Taniguchi et al. |
| 10,406,662 | B2 * | 9/2019 | Leh ......................... B25B 21/02 |
| 2003/0142490 | A1 | 7/2003 | Parsons et al. |
| 2003/0201738 | A1 | 10/2003 | Yamamoto |
| 2005/0058890 | A1 | 3/2005 | Brazell et al. |
| 2005/0099155 | A1 | 5/2005 | Okuda et al. |
| 2005/0248320 | A1 | 11/2005 | Denning |
| 2006/0091858 | A1 | 5/2006 | Johnson et al. |
| 2006/0219059 | A1 | 10/2006 | Kageler et al. |
| 2007/0193761 | A1 | 8/2007 | Brotto |
| 2009/0108806 | A1 | 4/2009 | Takano et al. |
| 2009/0202894 | A1 | 8/2009 | Bublitz |
| 2009/0242227 | A1 | 10/2009 | Hashimoto et al. |
| 2010/0218386 | A1 | 9/2010 | Ro kamp et al. |
| 2010/0218966 | A1 | 9/2010 | Liebhard et al. |
| 2010/0221933 | A1 | 9/2010 | Wu |
| 2010/0225277 | A1 | 9/2010 | Ochi et al. |
| 2011/0163701 | A1 | 7/2011 | Carrier et al. |
| 2011/0308831 | A1 | 12/2011 | Martinsson et al. |
| 2011/0309799 | A1 | 12/2011 | Firehammer |
| 2012/0013194 | A1 | 1/2012 | Yamanoue |
| 2012/0061117 | A1 | 3/2012 | Nagasaka et al. |
| 2012/0251229 | A1 | 10/2012 | Liang et al. |
| 2013/0089764 | A1 | 4/2013 | Melnyk et al. |
| 2013/0106343 | A1 | 5/2013 | Cruise et al. |
| 2013/0324981 | A1 | 12/2013 | Smith et al. |
| 2013/0324982 | A1 | 12/2013 | Smith et al. |
| 2014/0015451 | A1 * | 1/2014 | Funabashi ............... H02P 1/028 |
| | | | 318/139 |
| 2014/0131059 | A1 | 5/2014 | Verbrugge et al. |
| 2014/0147718 | A1 | 5/2014 | Furui et al. |
| 2014/0210419 | A1 | 7/2014 | Kim |
| 2014/0326477 | A1 | 11/2014 | Thorson et al. |
| 2015/0010782 | A1 | 1/2015 | Tanigaki et al. |
| 2015/0108949 | A1 | 4/2015 | Averitt |
| 2015/0228937 | A1 | 8/2015 | Spilker |
| 2015/0283964 | A1 | 10/2015 | Janarthanam |
| 2015/0288219 | A1 | 10/2015 | Lin et al. |
| 2015/0328764 | A1 | 11/2015 | Yoshikane et al. |
| 2015/0333301 | A1 * | 11/2015 | Ota ...................... H01M 10/48 |
| | | | 15/405 |
| 2016/0020443 | A1 | 1/2016 | White et al. |
| 2016/0049815 | A1 | 2/2016 | Wu et al. |
| 2016/0126533 | A1 | 5/2016 | Velderman et al. |
| 2016/0164328 | A1 | 6/2016 | Kim |
| 2016/0204475 | A1 | 7/2016 | White et al. |
| 2016/0226290 | A1 | 8/2016 | Johnson et al. |
| 2016/0244009 | A1 | 8/2016 | Demmerle |
| 2016/0293909 | A1 | 10/2016 | O'Sullivan et al. |
| 2017/0072553 | A1 | 3/2017 | Bakker |
| 2017/0104243 | A1 | 4/2017 | Velderman et al. |
| 2017/0194670 | A1 * | 7/2017 | Kawano ........... H01M 10/4257 |
| 2018/0087758 | A1 | 3/2018 | Pavlik et al. |
| 2018/0169851 | A1 | 6/2018 | Radovich et al. |
| 2018/0175458 | A1 | 6/2018 | Radovich et al. |
| 2018/0277801 | A1 | 9/2018 | Brozek et al. |
| 2019/0006980 | A1 | 1/2019 | Sheeks et al. |
| 2019/0067971 | A1 | 2/2019 | Reed |
| 2019/0081290 | A1 | 3/2019 | Fauteux |
| 2020/0016734 | A1 | 1/2020 | Kelleher et al. |

FOREIGN PATENT DOCUMENTS

| | | |
|---|---|---|
| CN | 201353758 Y | 12/2009 |
| CN | 101758488 A | 6/2010 |
| CN | 103247830 A | 8/2013 |
| CN | 203506135 U | 4/2014 |
| CN | 203808341 U | 9/2014 |

(56) References Cited

FOREIGN PATENT DOCUMENTS

| | | | |
|---|---|---|---|
| CN | 212366942 | U | 1/2021 |
| DE | 1256763 | | 12/1967 |
| DE | 29702266 | U1 | 5/1997 |
| DE | 29823347 | U1 | 4/1999 |
| DE | 102008064037 | | 6/2009 |
| DE | 102008017424 | | 10/2009 |
| DE | 102011001107 | | 1/2012 |
| EP | 1516702 | A2 | 3/2005 |
| EP | 2645525 | | 10/2013 |
| EP | 3059781 | A1 | 2/2016 |
| EP | 3085499 | A1 | 10/2016 |
| JP | 2005151794 | A | 6/2005 |
| JP | 2005287240 | | 10/2005 |
| JP | 2007234488 | A | 9/2007 |
| JP | 2013196816 | A | 9/2013 |
| JP | 2015526835 | A | 9/2015 |
| JP | 2016196051 | A | 11/2016 |
| KR | 20060094231 | | 8/2006 |
| KR | 20120016993 | A | 2/2012 |
| KR | 1020120094529 | A | 8/2012 |
| KR | 101686018 | | 12/2016 |
| WO | 9605623 | A1 | 2/1996 |
| WO | 0181132 | A1 | 11/2001 |
| WO | 2005117232 | A2 | 12/2005 |
| WO | 2008035811 | A1 | 3/2008 |
| WO | 2012047118 | A1 | 4/2012 |
| WO | 2012023707 | | 12/2012 |
| WO | 2014125758 | A1 | 8/2014 |
| WO | 2015179318 | A1 | 11/2015 |
| WO | 2016085540 | A1 | 6/2016 |

OTHER PUBLICATIONS

International Search Report and Written Opinion for Application No. PCT/US2017/066966 dated Jul. 30, 2018, 19 pages.

International Search Report and Written Opinion for Application No. PCT/US2018/024172 dated Jul. 13, 2018, 18 pages.

International Search Report and Written Opinion for Application No. PCT/US2018/040587 dated Jan. 18, 2019, 28 pages.

Co-pending U.S. Appl. No. 29/637,376, filed Feb. 16, 2018.

Patent Cooperation Treaty Third Party Observation Report for Application No. PCT/US2018/043749 dated Nov. 14, 2019 (9 pages).

Australian Patent Office Examination Report No. 1 For Application No. 201829441 dated Sep. 17, 2020 (5 pages).

Chinese Patent Office Action for Application No. 201880056649.1 dated Aug. 4, 2021 (25 pages including statement of relevance).

* cited by examiner

330B

38B

Dotted Line: 84V BL80-50 2P(.149mOhm) 19T 1.2mm 45M II DELTA +10Deg STEPPED Motor#7
Solid Line 84V BL80-50 1P(.286mOhm) 19T 1.2mm 45M II DELTA +10Deg STEPPED Motor#9

18A

486

HIGH POWER BATTERY-POWERED SYSTEM

RELATED APPLICATION

The present application is a continuation of U.S. patent application Ser. No. 16/025,491, filed on Jul. 2, 2019, which claims priority to U.S. Provisional Patent Application No. 62/527,735, filed Jun. 30, 2017, the entire contents of which is hereby incorporated by reference.

FIELD

The present invention relates to battery-powered devices and, more particularly to high power batteries and such devices.

SUMMARY

A high-powered electrical combination is schematically illustrated in FIG. 1A. The combination generally includes a battery power source, an electrical device including a load (e.g., a motor, as illustrated), electrical interconnections between the power source and the load, and electronics operable to control, for example, discharge of the power source, operation of the load, etc.

The combination is incorporated into a motorized device (e.g., power tools, outdoor tools, other motorized devices, etc.) or a non-motorized device having an associated output mechanism powered by the load (e.g., a saw blade, a bit, a grinding wheel, a power supply, a lighting device, etc.). At least some of the devices incorporating the combination are hand-held devices (e.g., a device supportable by a user during operation), and, accordingly, the combination must fit within limitations (e.g., weight, volume/package size, etc.) of a hand-held device.

In the illustrated construction, the battery power source has a nominal voltage of up to about 80 volts (V). Also, the combination is operable to output high power (e.g., power of 2760 watts (W) to 3000 W or more (3.7 horsepower (hp) to 4.0 hp or more)) for sustained durations (e.g., at least 5-6 minutes or more). In order to achieve this sustained power, a high sustained current (e.g., 50 amps (A) or more) is discharged from the power source, through the interconnections, through components of the electronics and to the load. Again, this high power output is achieved within limitations of a hand-held device.

One challenge is increasing the deliverable power of the battery power source. Such an increase can be obtained by increasing the number of cells in the battery, in series and/or in parallel. An increase in the cell form factor, with associated reduced impedance, will also increase the available power. However, each of these solutions results in an increase in the size and weight of the battery power source, contrary to the limitations of the hand-held devices. With high voltage, arcing may occur when the battery pack is disconnected. With the increased voltage and power of the battery pack, sudden high current output can damage control components, switches, etc., upon start-up of the power tool.

Another challenge is effectively exploiting, at the load (e.g., the motor), the power provided by the battery power source. An increase in motor size (e.g., diameter) will result in increased power output. Such an increase again conflicts with the limitations of hand-held devices. To maximize increased deliverable power from the battery power source to the load, impedance and losses in the system must be reduced.

Increased deliverable power from the battery power source and/or increased power output from the load require additional electronics to control such discharge, operation, etc. Further, the increased power for sustained durations requires relatively-high current which generates heat. Operation must be controlled and/or cooling structure provided to manage the increased current and heat.

Existing interconnections (e.g., terminals, switches, conductors, etc.) are generally not designed to handle the increased current/heat. Operation must be controlled and/or cooling structure provided to manage the increased current and heat.

However, overcoming these challenges raises others. For example, increased power from the power source and output by the load could possibly be achieved by adding more and/or larger components—more and larger battery cells, a larger motor, thicker terminals, bigger switches, etc. As discussed above, each of these additions, however, conflicts with the limitations imposed by the device being hand-held by making the combination heavier, larger, etc.

When multiple lithium-based cells are discharged collectively in high-power applications, cell discharge imbalances, cell-to-cell heating, over-discharge, and excessive cell heating are just some of the issues that arise. These issues become more complex as more cells are added.

Battery packs having cells with lithium-based chemistry may be subject to shipping regulations. Such shipping regulations may limit the voltage and/or power capacity of the battery pack being shipped. Adding battery cells to achieve increased power requirements will cause the resulting battery power source to be subject to these regulations.

In order to meet these shipping regulations, the lithium-based cells in the battery pack may be required to be electrically disconnected. It can be challenging to connect the remote battery cell(s) to the battery terminals.

In one independent embodiment, an electrical combination may generally include an electrical device, a battery pack, and a controller. The electrical device may include a device housing, a motor supported by the device housing, the motor having a nominal outer diameter of up to about 80 mm, the motor being operable to output at least about 2760 W (about 3.7 hp), and a device terminal electrically connected to the motor. The battery pack may include a pack housing defining a volume of the battery pack, the volume being up to about $5.2 \times 10^6$ cubic millimeters (mm³), battery cells supported by the pack housing, the battery cells being electrically connected and having a nominal voltage of up to about 80 volts, and a pack terminal electrically connectable to the device terminal to transfer current between the battery pack and the electrical device. The controller may be operable to control the transfer of current. The motor may be operable to output at least about 3000 W (about 4 hp).

In some constructions, the motor may include a brushless direct current motor. The motor may include a stator supported by the device housing, the stator including windings, and a rotor supported by the housing for rotation relative to the stator. The device may include a power tool (e.g., a hand-held power tool), and the motor may be operable to drive a tool member. The pack housing may be connectable to and supportable by the device housing such that the battery pack is supportable by the hand-held power tool.

In some constructions, the battery cells may each have a diameter of up to about 21 mm and a length of up to about 71 mm. The battery cells may each have a diameter of about 21 mm and a length of about 71 mm. The battery pack may include up to 20 battery cells. The battery cells may be connected in series.

The battery cells may be operable to output a sustained operating discharge current of between about 40 A and about 60 A. The battery cells may have a capacity of between about 3.0 Amp-hours (Ah) and about 5.0 Ah (e.g., about 4.2 Ah).

A power circuit may be electrically connected between the battery cells and the motor, the power circuit including semi-conducting switches operable to apply current to the motor. The switches may be operable to apply current across the windings.

The combination may include control electronics including the controller; the control electronics may have a volume of up to about 920 cubic millimeters (mm³; e.g., 918 mm³), and the motor may have a volume of up to about 443,619 mm³ (stator volume envelope including end caps). The control electronics may have a weight of up to about 830 grams (g), the motor may have a weight of up to about 4.6 pounds (lbs.; including wound stator, rotor, shaft, bearings, and fan), and the battery pack may have a weight of up to about 6 lbs.

In another independent aspect, a power tool system may generally include a power tool, a battery pack and a controller. The power tool may include a tool housing, a motor supported by the tool housing, the motor including an output shaft operable to drive a tool element, the motor having a nominal outer diameter of up to about 80 mm, the motor being operable to output at least about 2760 watts (W) (about 3.7 hp), and a tool terminal electrically connected to the load. The battery pack may include a pack housing defining a volume of the battery pack, the volume being up to about $2.9 \times 10^6$ mm³, battery cells supported by the pack housing, the battery cells being electrically connected and having a nominal voltage of up to about 80 volts, and a pack terminal electrically connectable to the tool terminal to transfer current between the battery pack and the power tool. The controller may be operable to control the transfer of current.

In yet another independent aspect, a battery pack may include a housing; a first battery cell disposed within the housing; a second battery cell disposed within the housing; and a switch located on an exterior of the housing and configured to be in a first position, in which the first battery cell is electrically connected to the second battery cell, or in a second position, in which the first battery cell is electrically disconnected from the second battery cell. The switch may be configured to slide between the first position and the second position. When the switch in the first position, the battery pack may be configured to output a nominal voltage of about 80 V. When the switch is in the first position, the battery pack may be configured to have a power capacity approximately equal to or less than 300 watt-hours.

In a further independent aspect, a battery pack may generally include a housing; a first battery cell within the housing; a second battery cell within the housing; and a switch located on an exterior of the housing and configured to be in a first position, in which the first battery cell is electrically connected to the second battery cell, or in a second position, in which the first battery cell is electrically disconnected from the second battery cell. The switch may include a first terminal electrically connected to the first battery cell, a second terminal electrically connected to the second battery cell, a conductive portion configured to engage the first terminal and the second terminal when the switch is in the first position, and a non-conductive portion configured to engage at least one of the first terminal and the second terminal when the switch is in the second position.

In another independent aspect, a battery pack may generally include a housing defining an aperture; a first battery cell within the housing; a second battery cell within the housing; and a switch located on an exterior of the housing and configured to be in a first position, in which the first battery cell is electrically connected from the second battery cell, and a second position, in which the first battery cell is electrically disconnected to the second battery cell. The switch may include a plate, a male member supported on the plate and configured to be inserted into the aperture when the switch is in the second position, and a biasing member biasing the plate away from the housing.

In yet another independent aspect, an interface for a battery pack may be provided. The interface may generally include a body and a rail extending along an axis, the rail and the body defining a space therebetween, the space having a first dimension proximate a first axial location and a different second dimension at a different second axial location.

In a further independent aspect, an electrical combination may generally include an electrical device, a battery pack and a controller. The device may include a device housing providing a device support portion, and a circuit supported by the device housing. The battery pack may include a battery pack housing providing a pack support portion for engagement with the device support portion, and a battery cell supported by the housing, power being transferrable between the battery cell and the circuit when the battery pack is connected to the device. One of the device support portion and the pack support portion may include a body and a rail extending along an axis, the rail and the body defining a space therebetween, the space having a first dimension proximate a first axial location and a different second dimension at a different second axial location. The other of the device support portion and the pack support portion may include a first portion positionable in the space at the first axial location and a second portion positionable in the space at the second location.

In another independent aspect, a latch mechanism for a battery pack may be provided. The mechanism may generally include a latching member movable between a latched position, in which the latching member is engageable between the battery pack and an electrical device to inhibit relative movement, and an unlatched position, in which relative movement is permitted; and a switch operable with the latching member, the switch inhibiting power transfer between the battery pack and the electrical device when the latching member is between the latched position and the unlatched position.

In yet another independent aspect, an ejector for a battery pack may be provided. The ejector may generally include an ejection member engageable between the battery pack and an electrical device; a biasing member operable to bias the ejection member toward an ejecting position, in which a force is applied to disengage the battery pack and the electrical device; and a switch operable with the ejection member, the switch deactivating at least a portion of the device as the ejection member moves toward the ejecting position.

In a further independent aspect, a dual-action latch mechanism for a battery pack may be provided. The mechanism may generally include a primary actuator operatively coupled to a latching member movable between a latched position, in which the latching member is engageable between the battery pack and an electrical device to inhibit relative movement, and an unlatched position, in which relative movement is permitted; and a secondary actuator operatively coupled to the primary actuator and movable between a first position, in which the secondary actuator inhibits operation of the primary actuator, and a second position, in which the secondary actuator allows operation of the primary actuator.

In another independent aspect, an electrical combination may generally include an electrical device, a battery pack and a main controller. The electrical device may include a device housing, a motor supported by the device and including an output shaft, a device terminal electrically connected to the motor, and a motor controller supported by the device housing and operable to control the motor. The battery pack may include a pack housing, battery cells supported by the pack housing, the battery cells being electrically connected, and a pack terminal electrically connectable to the device terminal to transfer current between the battery pack and the electrical device. The main controller may communicate between the battery pack and the motor controller to control operation of the device.

In some constructions, the motor controller may be formed as a modular unit with the motor. The motor may include a motor housing, a stator supported by the motor housing, and a rotor supported by the motor housing. The motor controller may be supported by the motor housing.

In yet another independent aspect, a method of operating a battery-powered device may be provided. The method may generally include determining a discharge capability of a battery pack; setting a discharge current threshold based on the discharge capability; and controlling a motor of the device based on the current threshold. The method may include, after a time interval, determining a discharge capability of the battery pack; setting a different second discharge current threshold based on the discharge capability; and controlling a motor of the device based on the second discharge current threshold.

In a further independent aspect, an electric motor assembly may generally include a motor housing; a brushless electric motor supported by the housing; and a printed circuit board (PCB) assembly connected to the housing, the PCB assembly including a heat sink, a power PCB coupled to a first side of the heat sink, and a position sensor PCB coupled to an opposite second side of the heat sink and in facing relationship with the motor.

In some constructions, the position sensor PCB may include a plurality of Hall-effect sensors. The motor may include a rotor supporting a magnet, the Hall-effect sensors being operable to sense a position of the magnet. In some constructions, the position sensor PCB may include a magnetic encoder including a plurality of Hall elements, the magnetic encoder using the Hall elements to resolve an angle of the rotor directly.

In a further independent aspect, a battery pack may include a housing; a plurality of battery cells supported by the housing; a plurality of terminals including a positive power terminal, a negative power terminal, and a low power terminal; a low power circuit connecting the plurality of battery cells to the low power terminal and the negative terminal to output a first voltage; and a power circuit connecting the plurality of battery cells to the positive power terminal and the negative terminal to output a second voltage, the second voltage being greater than the first voltage (e.g., 80 V compared to 5 V).

In some constructions, the low power circuit may include a transformer. The battery pack may also include a controller operable to control the battery pack to selectively output the first voltage and the second voltage.

In another independent aspect, a method of operating a battery-powered device with a battery pack may be provided. The device may include a device housing, a load supported by the device housing, and a device controller supported by the device housing. The battery pack may include a pack housing, and a plurality of battery cells supported by the housing. The method may generally include supplying a first voltage from the plurality of battery cells to the device to power the device controller; and supplying a second voltage from the plurality of battery cells to the device to power the device. Supplying a first voltage may include, with a transformer, reducing a voltage of the plurality of battery cells to the first voltage.

In yet another independent aspect, a battery pack may generally include a housing; a plurality of battery cells supported by the housing; a controller; a plurality of terminals including a positive power terminal, a negative power terminal and a communication terminal, the communication terminal being electrically connected to the controller and operable to communicate between the controller and an external device, the communication terminal being isolated from the positive power terminal and the negative power terminal.

In some constructions, the housing may include a terminal block supporting the plurality of terminals, the positive power terminal and the negative terminal being arranged in a first row, the communication terminal being arranged in a second row spaced from the first row.

In a further independent aspect, an electric motor may generally include a stator including a core defining a plurality of teeth, a plurality of coils disposed on respective stator teeth, and an end cap proximate an end of the core, the end cap including a plurality of coil contact plates molded in the end cap and a first terminal and a second terminal separate from and connectable to the contact plates, the contact plates short-circuiting opposite ones of the plurality of coils; and a rotor supported for rotation relative to the stator.

In another independent aspect, a battery pack may generally include a housing having a first end and an opposite second end; at least one battery cell supported by the housing proximate the second end, the battery cell having a first cell terminal and a second cell terminal; a terminal block supported proximate the first end, the terminal block including a first power terminal electrically connected to the first cell terminal and a second power terminal electrically connected to the second cell terminal; and a current sense resistor electrically connected between the first cell terminal and the first power terminal, the current sense resistor extending from proximate the second end to proximate the first end.

In yet another independent aspect, a motor assembly may generally include a housing; a motor supported by the housing, the motor including a stator including coil windings, and a rotor supported for rotation relative to the stator; and a stator end cap connected to the stator, the stator end cap including an annular carrier defining a circumferential groove in a side facing the stator, a plurality of ribs being in the groove, coil contact plates supported in the groove, an air gap between adjacent coil contact plates being maintained by the ribs, the coil contact plates being connected to the coil windings, and a resin layer molded over the carrier and the supported coil contact plates.

In a further independent aspect, a method of manufacturing a motor assembly may be provided. The motor assembly may include a housing, and a motor supported by the housing, the motor including a stator including coil windings, and a rotor supported for rotation relative to the stator. The method may generally include forming a stator end cap connectable to the stator, forming including molding an annular carrier defining a circumferential groove in a side facing the stator with a plurality of ribs in the groove, supporting coil contact plates in the groove with an air gap between adjacent coil contact plates maintained by the ribs, the coil contact plates being connectable to the coil windings, and injection molding a resin layer over the carrier and the supported coil contact plates.

In another independent aspect, an electrical combination may generally include an electrical device including a device housing, an electrical circuit supported by the device housing, and a device controller; and a battery pack connectable to the electrical device, the battery pack including a pack housing, a battery cell supported by the pack housing, power being transferable between the cell and the electrical circuit, and a pack controller. The device controller and the pack controller may be configured to communicate via a grouped read, the grouped read including a group of measurements or states of the battery pack or the electrical device.

In yet another independent aspect, a method for operating an electrical combination may be provided. The electrical device may include an electrical device and a battery pack, the electrical device including a device housing, an electrical circuit supported by the device housing, and a device controller, the battery pack being connectable to the electrical device and including a pack housing, a battery cell supported by the pack housing, power being transferable between the cell and the electrical circuit, and a pack controller. The method may generally include communicating, with the device controller and the pack controller, via a grouped read, the grouped read including a group of measurements or states of the battery pack or the electrical device.

Other independent aspects of the invention may become apparent by consideration of the detailed description and accompanying drawings.

DETAILED DESCRIPTION

Figure 1A:
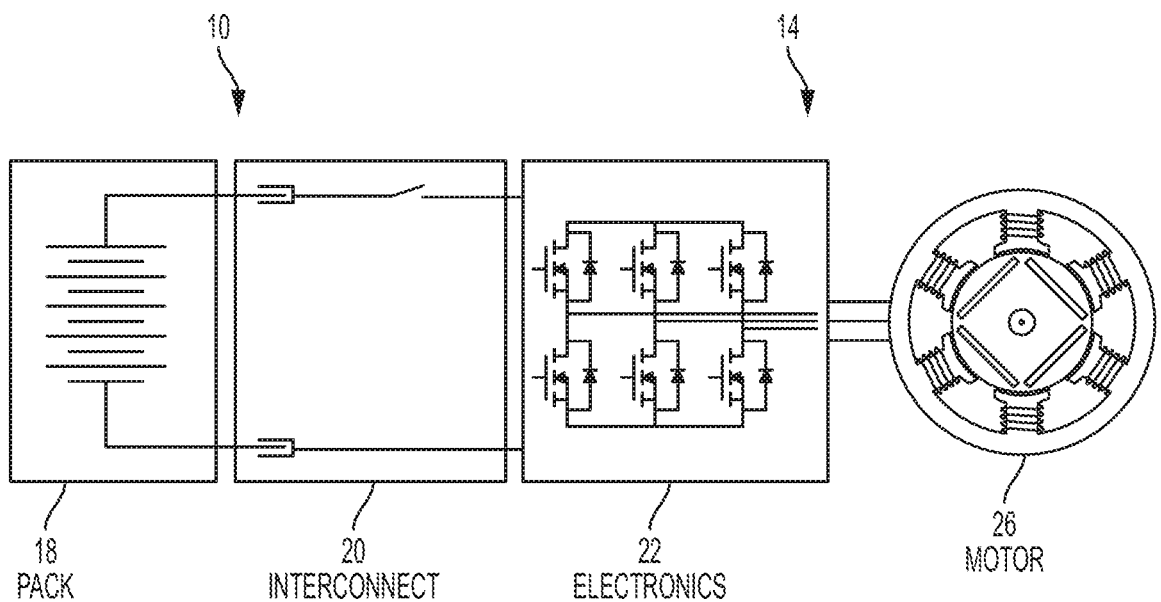
FIG. 1A is a schematic diagram of an electrical combination including a battery assembly, an electronics assembly, and a motor assembly.

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways.

Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof.

Relative terminology, such as, for example, "about", "approximately", "substantially", etc., used in connection with a quantity or condition would be understood by those of ordinary skill to be inclusive of the stated value and has the meaning dictated by the context (for example, the term includes at least the degree of error associated with the measurement of, tolerances (e.g., manufacturing, assembly, use, etc.) associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10% or more) of an indicated value.

Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed.

Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

Many of the modules and logical structures described are capable of being implemented in software executed by a microprocessor or a similar device or of being implemented in hardware using a variety of components including, for example, application specific integrated circuits ("ASICs"). Terms like "controller" and "module" may include or refer to both hardware and/or software. Capitalized terms conform to common practices and help correlate the description with the coding examples, equations, and/or drawings. However, no specific meaning is implied or should be inferred simply due to the use of capitalization. Thus, the claims should not be limited to the specific examples or terminology or to any specific hardware or software implementation or combination of software or hardware.

Figure 1B:
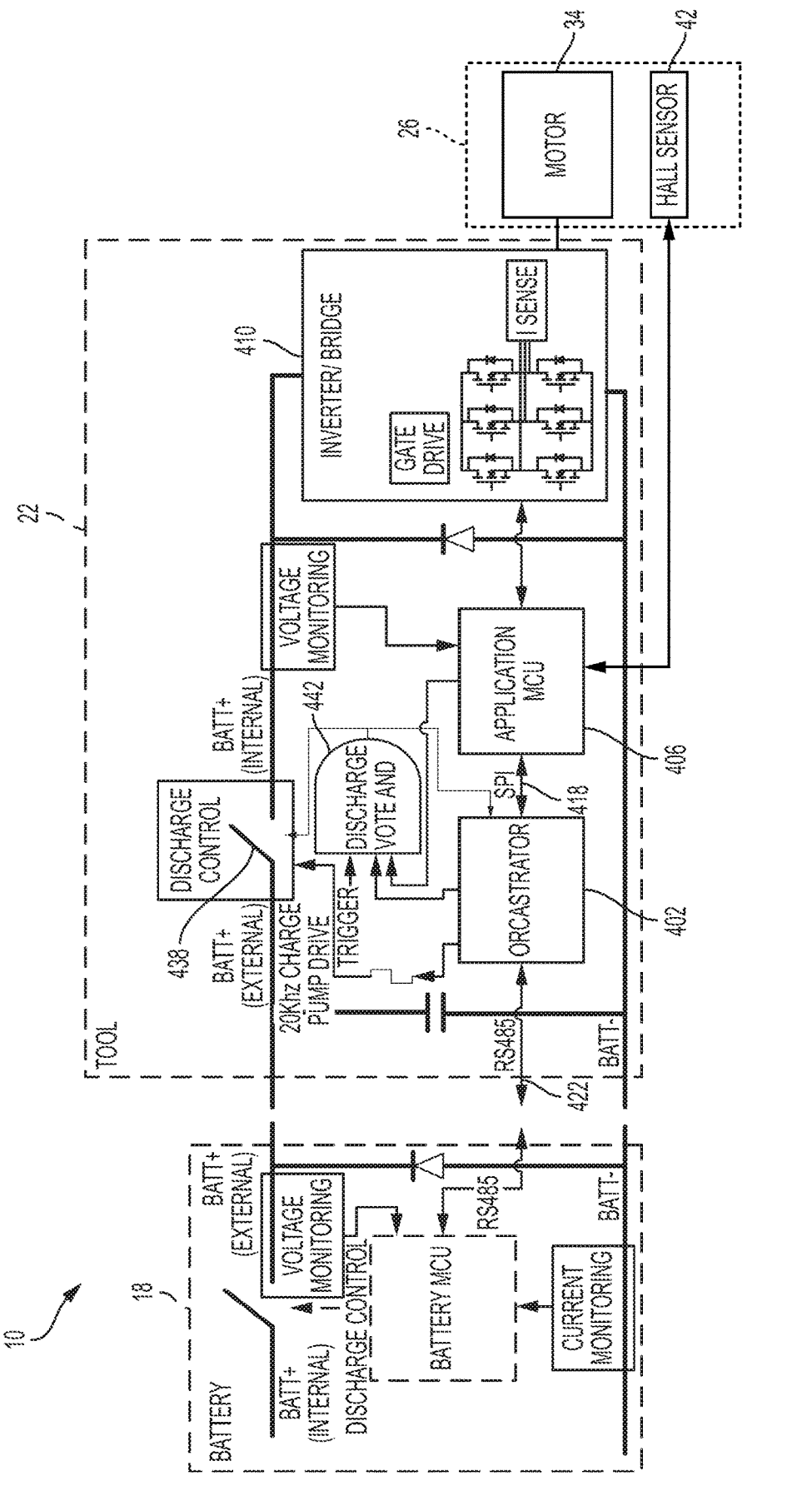
FIG. 1B is a block diagram of the electrical combination of FIG. 1A.

FIGS. 1A-1B illustrate simplified block diagrams of an electrical combination 10. The combination 10 includes a high power DC electrical device (e.g., power tool) system 14 that includes a power source (e.g., a battery assembly 18), interconnects 20 (e.g., terminals, conductors, switches, etc.), an electronic assembly 22 (e.g., controls, switching field-effect transistors (FETs), trigger, etc.), a motor assembly 26. As explained in greater detail below, the high power DC tool system 14 achieves a high power output with a DC power source within the packaging restrictions (e.g., weight, volume, etc.) of a hand-held power tool.

Figure 2:
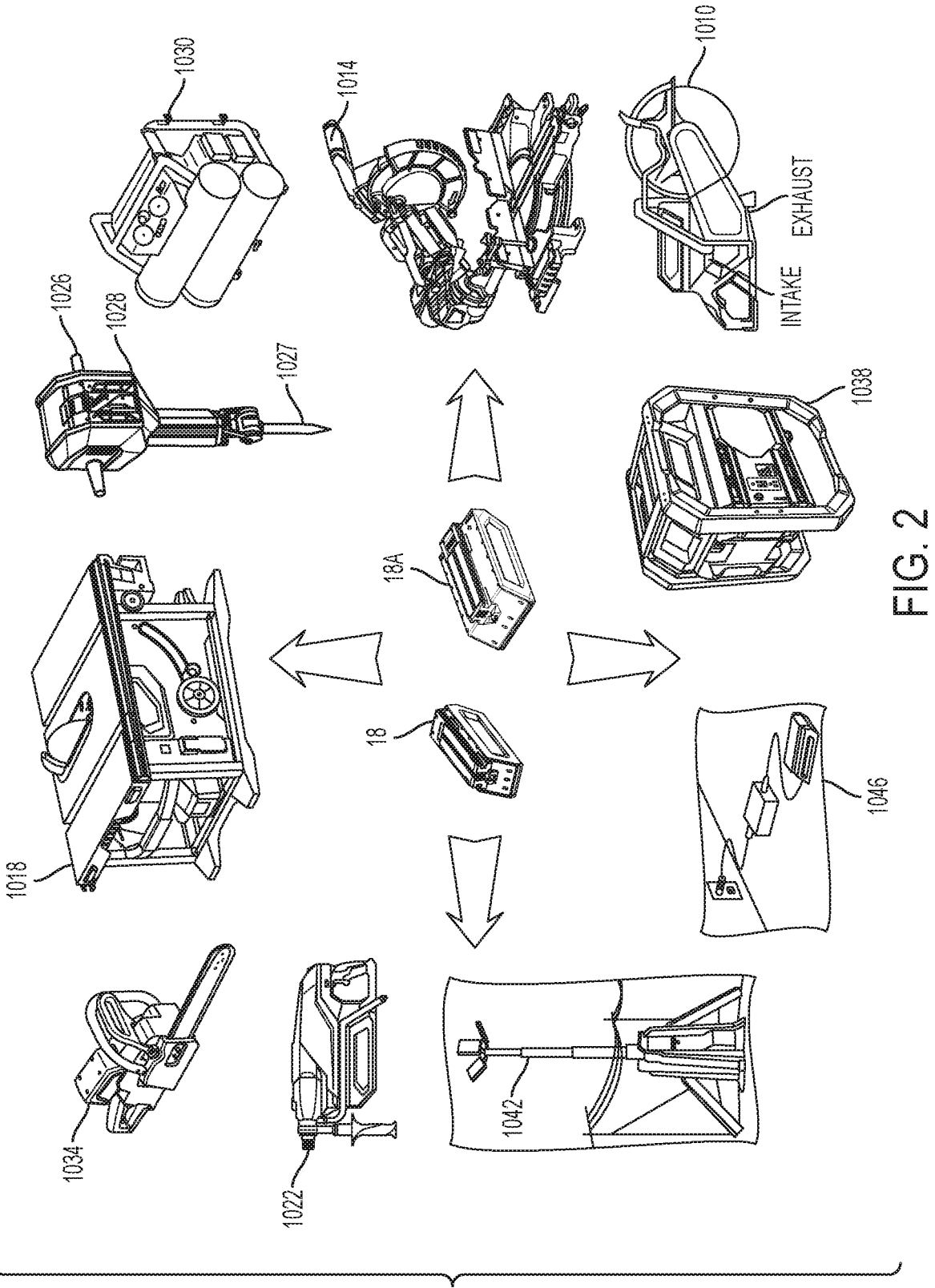
FIG. 2 is an illustration of a high power electrical system including the electrical combination shown in FIG. 1.

FIG. 2 illustrates a high power electrical system 1000 including various high power electrical devices incorporating the high power electrical combination 10. For example, the system 1000 includes hand-held devices (i.e., devices configured to be supported by an operator during use) and non-hand-held devices (i.e., devices supported on a work surface or support rather than by the operator during use. Such devices include motorized power tools (e.g., a drill, an impact driver, an impact wrench, a rotary hammer, a hammer drill, a saw (a circular saw, a cut-off saw 1010, a reciprocating saw, a miter saw 1014, a table saw 1018, etc.), a core drill 1022, a breaker 1026, a demolition hammer, a compressor 1030, a pump, etc.), outdoor tools (e.g., a chain saw 1034, a string trimmer, a hedge trimmer, a blower, a lawn mower, etc.), drain cleaning and plumbing tools, construction tools, concrete tools, other motorized devices (e.g., vehicles, utility carts, wheeled and/or self-propelled tools, etc.), etc. and non-motorized electrical devices (e.g., a power supply 1038, a light 1042, an AC/DC adapter 1046, a generator, etc.). By further example, the high power electrical devices may include a tool element 1027 and a tool housing 1028, as shown with the breaker 1026.

With reference to FIGS. 3-6B, the motor assembly 26 includes a motor housing 30, a motor 34 positioned within the motor housing 30, a fan 38, and a rotor position sensing assembly 42. The motor 34 includes the stator 46 and a rotor 50 positioned at least partially within the stator 46. A similar motor is described and illustrated in U.S. Provisional Patent Application No. 62/458,367, filed Feb. 13, 2017, and in U.S.

patent application Ser. No. 15/894,386, filed Feb. 12, 2018, the entire contents of both of which are hereby incorporated by reference.

With reference to FIGS. 3-6B and 18-21, the motor housing 26 includes a cylindrical portion 54 at least partially housing the motor 34. Mounting bosses 58 are provided along the cylindrical portion 54 through which fasteners extend to interconnect an end cap (e.g., a PCB assembly, a housing end cap, etc.) to the motor housing 30. In addition, mounting flanges 62 radially extend from the cylindrical portion 54 and are configured to receive additional fasteners for securing the motor housing 30. The motor housing 30 also includes a hub portion 66 coaxial with the cylindrical portion 54 and axially spaced from the cylindrical portion 54, posts 70 extending axially from a front end 74 of the cylindrical portion 54, and radially extending spokes 78 interconnecting the hub portion 66 to the post 70. Windows 82 are formed in a rear end 86 of the cylindrical portion 54 radially outward from the fan 38.

With reference to FIGS. 5 and 18-21, the cylindrical portion 54 of the motor housing 30 also includes radially inward-extending ribs 90 extending the entire length of the cylindrical portion 54, with each pair of adjacent ribs 90 defining a channel 94 therebetween. When the motor 34 is inserted into the motor housing 30, corresponding ribs 98 on the motor 34 are slidably received within the respective channels 94 defined in the cylindrical portion 54, thereby rotationally orienting the motor 34 relative to the motor housing 30. In addition, the motor housing 30 includes radially inward-extending support ribs 102 extending the entire length of the cylindrical portion 54, which contact and support the stator 46.

With particular reference to FIGS. 5-10, the stator 46 includes a plurality of individual stator laminations 106 stacked together to form a stator core 110 (i.e., a stator stack). As mentioned above, the stator 46 includes radially outward extending ribs 98 on an outer circumferential surface 114 extending the entire length of the stator core 110. Adjacent ribs 98 define a concave channel 118, which corresponds to the channel 94 defined by the motor housing 30, through which fasteners extend. In addition, the stator 46 includes recesses 122 the purposes of which is described below, extending parallel with and rotationally offset from the ribs 98.

Figure 11:
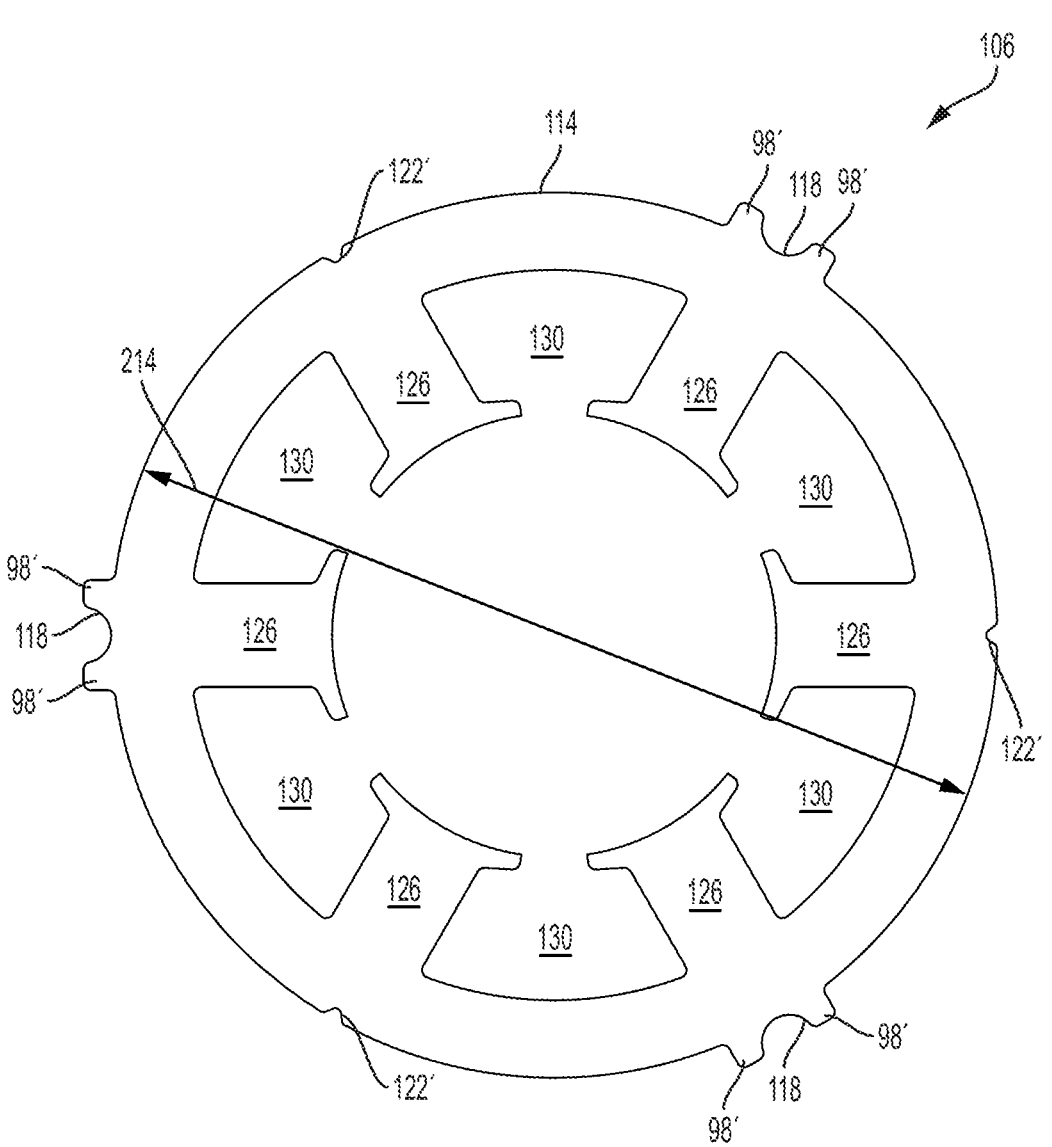
FIG. 11 is a front view of a stator lamination.
Figure 12:
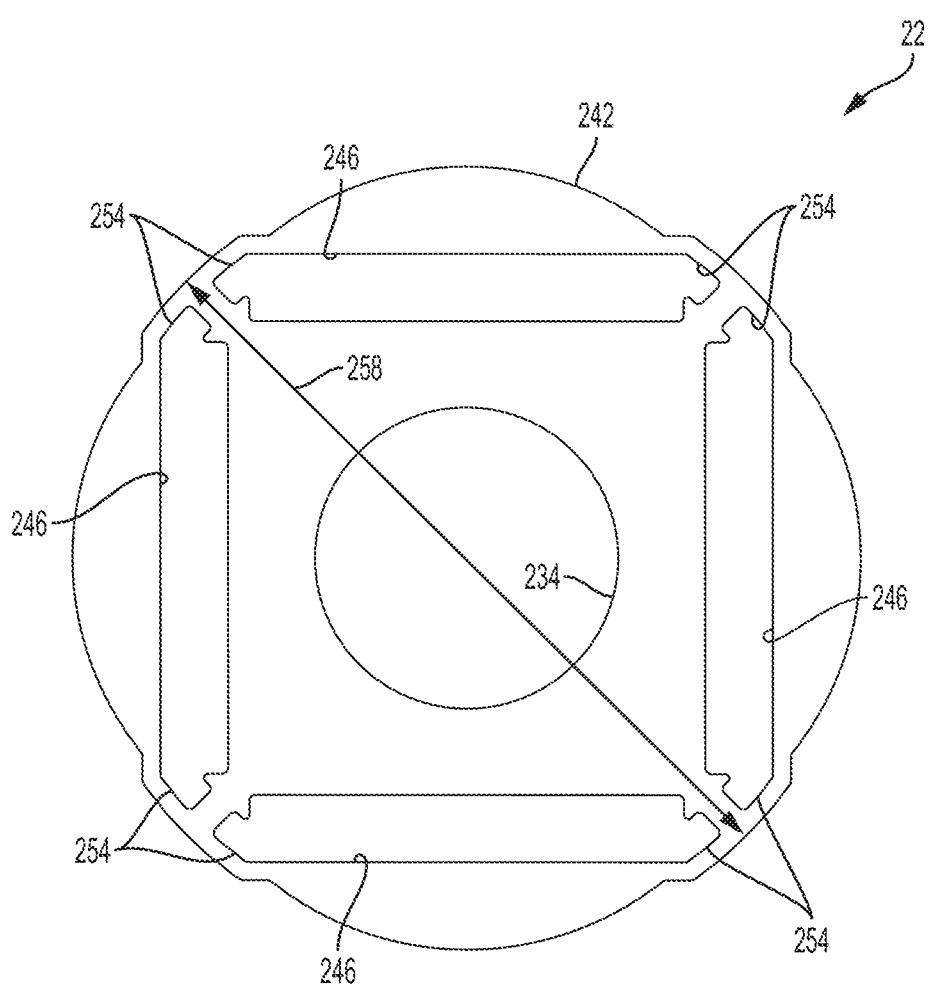
FIG. 12 is a front view of a rotor lamination.
Figure 13:
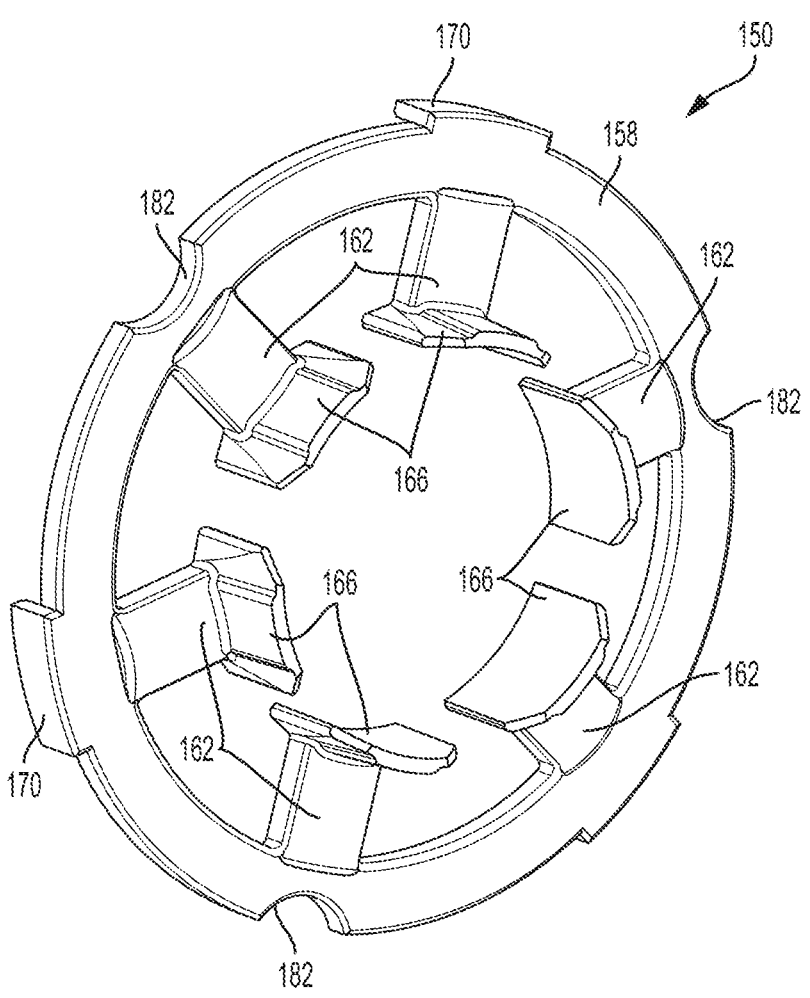
FIG. 13 is a perspective view of a stator end cap.

With reference to FIG. 11, each stator lamination 106 includes a yoke 124 (a.k.a., a rim, a back iron, etc.) having multiple radially outwardly-extending protrusions 98' (FIG. 11) collectively defining the ribs 98 when the laminations 106 are stacked together. Each stator lamination 106 also includes recesses 122' defined on the outer surface of the yoke 124 collectively defining the recesses 122 when the laminations 106 are stacked together. The stator 46 also includes inwardly extending stator teeth 126 and slots 130 defined between each pair of adjacent stator teeth 126 when the laminations 106 are stacked together. In the illustrated embodiment, the stator laminations 106 include six stator teeth 126, defining six stator slots 130.

The stator 46 further includes stator windings 134 at least partially positioned within the slots 130. In the illustrated embodiment, the stator windings 134 include six coils 134A-134F connected in a three phase, parallel delta configuration. In alternative embodiments (not shown), the coils 134A-134F may be connected in alternative configurations (e.g., series, delta, etc.). Insulating members 138 (FIG. 9) are provided within each of the slots 130 to insulate the stator teeth 126 from the stator windings 134. The stator windings 134 are wound around the stator core 110 with a continuous (i.e., single wire) precision winding process that results in filling the slots 130 to a value of at least 46%. In some embodiments, the slot fill may be at least 48%.

In some embodiments (i.e., a 50 mm stator stack length 220), the stator windings 134 have a wire gauge of approximately 1.2 mm. In some embodiments, the delta, line-line resistance of the stator windings 134 is within a range from approximately 10 mΩ to approximately 16 mat. In other embodiments, the delta, line-line resistance of the stator windings 134 is approximately 13 mat. The parallel resistance of the stator windings 134 (i.e., the resistance of two coils in parallel) is within a range of approximately 23.4 mΩ and approximately 28.6 mat. In some embodiments, the parallel resistance of the stator windings 134 is approximately 26 mΩ.

In other embodiments (e.g., a 25 mm stator stack length 220), the stator windings 134 have a wire gauge of approximately 0.72 mm (i.e., 21 AWG). In some embodiments, the delta, line-line resistance of the stator windings 134 is within a range from approximately 78 mΩ to approximately 98 mat. In other embodiments, the delta, line-line resistance of the stator windings 134 is approximately 88 mat. The parallel resistance of the stator windings 134 (i.e., the resistance of two coils in parallel) is within a range of approximately 118.8 mΩ and approximately 145.2 mat. In some embodiments, the parallel resistance of the stator windings 134 is approximately 132 mΩ.

The stator 46 includes a front end cap 142 adjacent a front end 146 of the stator core 110 and a rear end cap 150 adjacent a rear end 154. With reference to FIGS. 7-9 and 13-14, each end cap 142, 150 includes rim portions 158 and end cap teeth 162 extending radially inward from the rim portions 158. The end cap teeth 158 include projections 166 that support the respective stator coil windings 134. The stator windings 134 are also guided between adjacent stator teeth 126 by flanges 168 formed on the front end cap 142.

Each end cap 142, 150 additionally includes tabs 170 extending transversely from the rim portions 158, with each tab 170 including a radially inward extending projection 174 received in the corresponding recesses 122 formed on the stator core 110 to rotationally align each end cap 142, 150 relative to the stator core 110. The front end cap 142 includes concave recesses 178 aligned with the channels 118 in the stator core 110 through which the fasteners extend. Likewise, the rear end cap 150 includes concave recesses 182 that are aligned with the channels 118 in the stator core 110.

Figure 14:
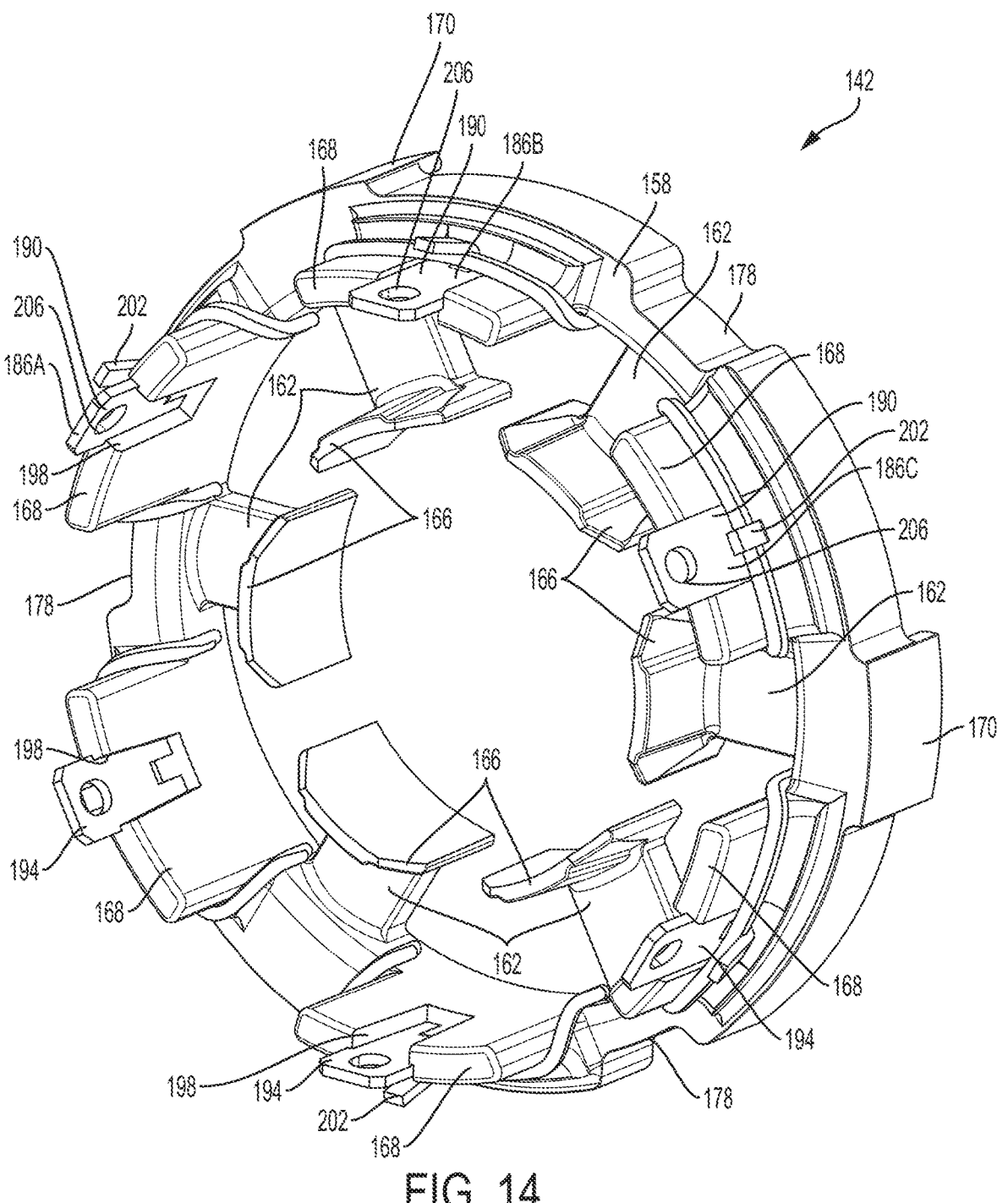
FIG. 14 is a perspective view of another stator end cap with coil contact plates overmolded therein.
Figure 15:
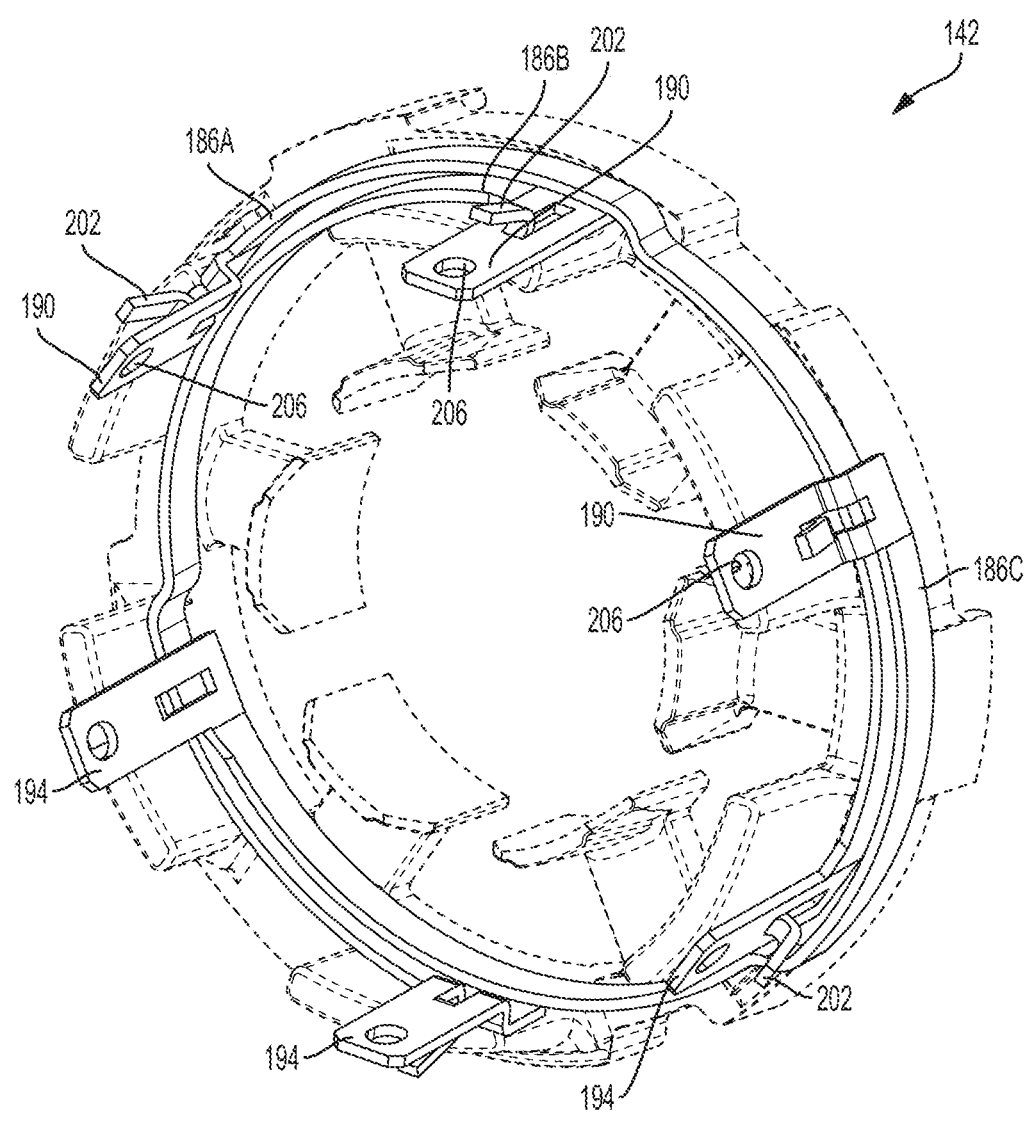
FIG. 15 is another perspective view of the stator end cap and coil contact plates of FIG. 14, illustrating the stator end cap in a transparent state.
Figure 16:
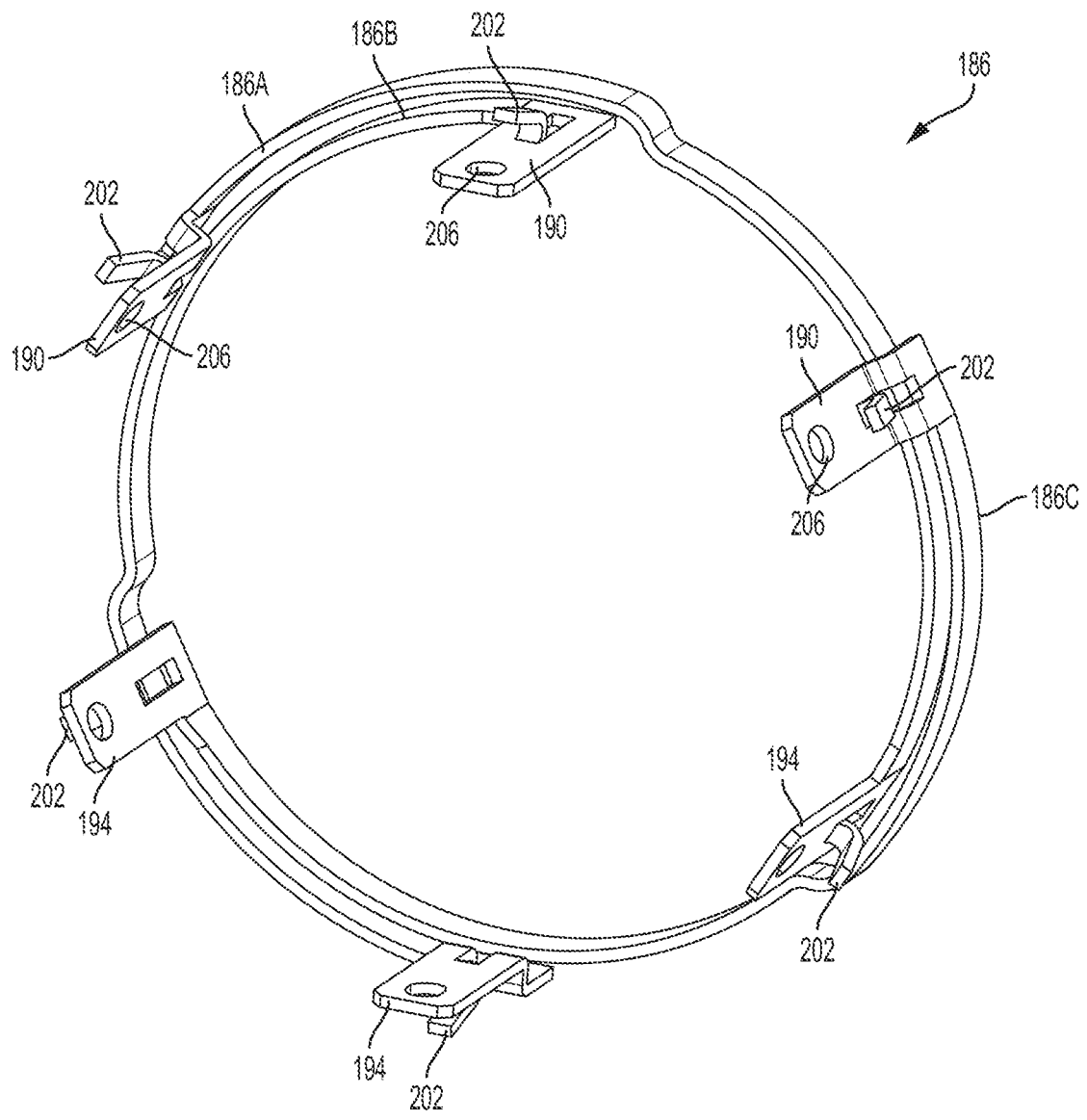
FIG. 16 is a perspective view of the coil contact plates of FIG. 15.

With reference to FIGS. 14-16, the stator 46 includes coil contact plates 186A, 186B, 186C (also referred interchangeably herein as coil contact plates 186) overmolded in the front end cap 142. During assembly of the stator 46, the stator windings 134 are wound around the stator teeth 126 and the end cap teeth 162, and the coil contact plates 186 short-circuit diagonally opposite pairs of coil windings 134 (e.g., 134A and 134D, 134B and 134E, 134C and 134F).

Figure 7:
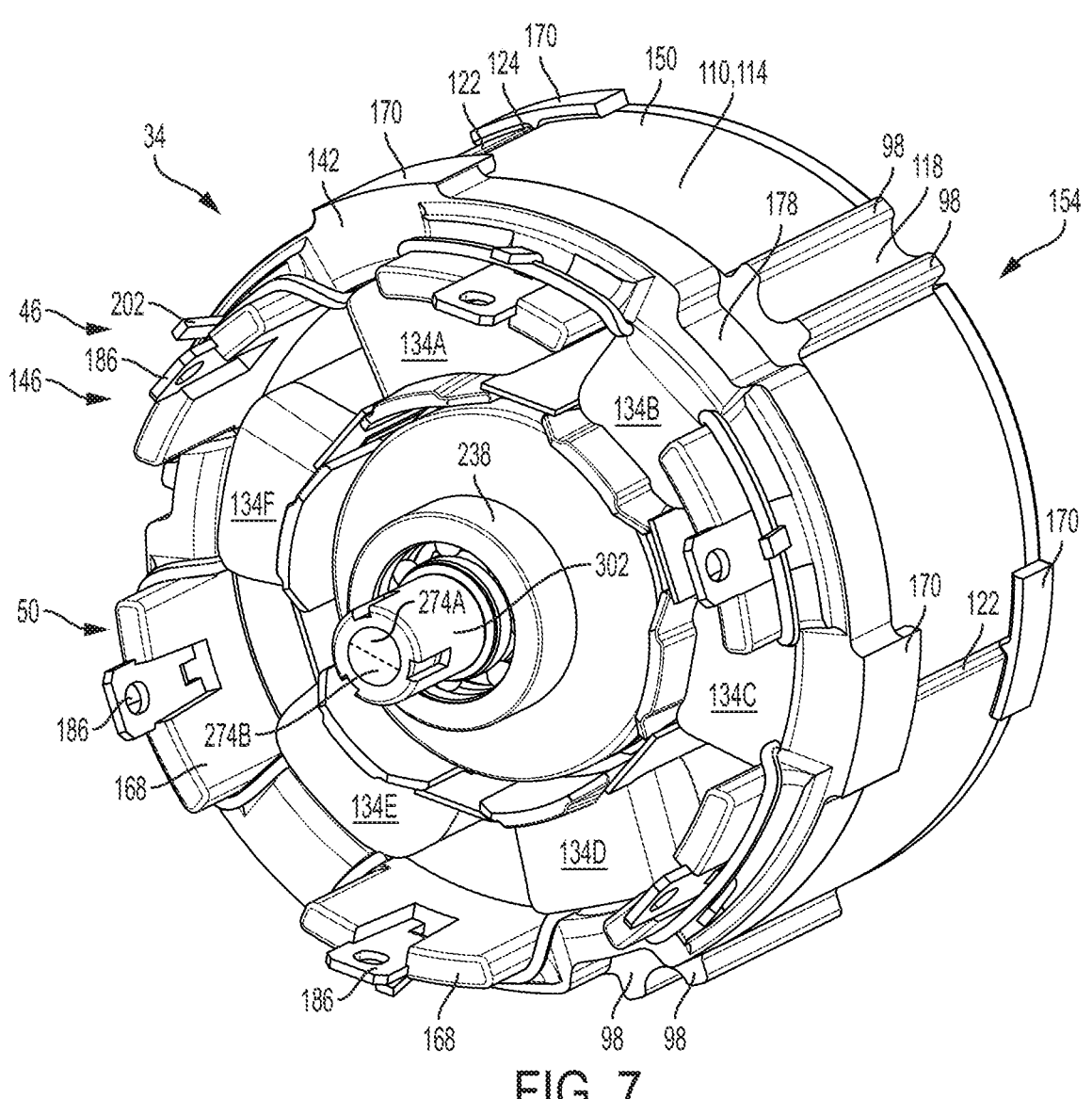
FIG. 7 is a perspective view of the motor assembly of FIG. 3, with portions removed.
Figure 8:
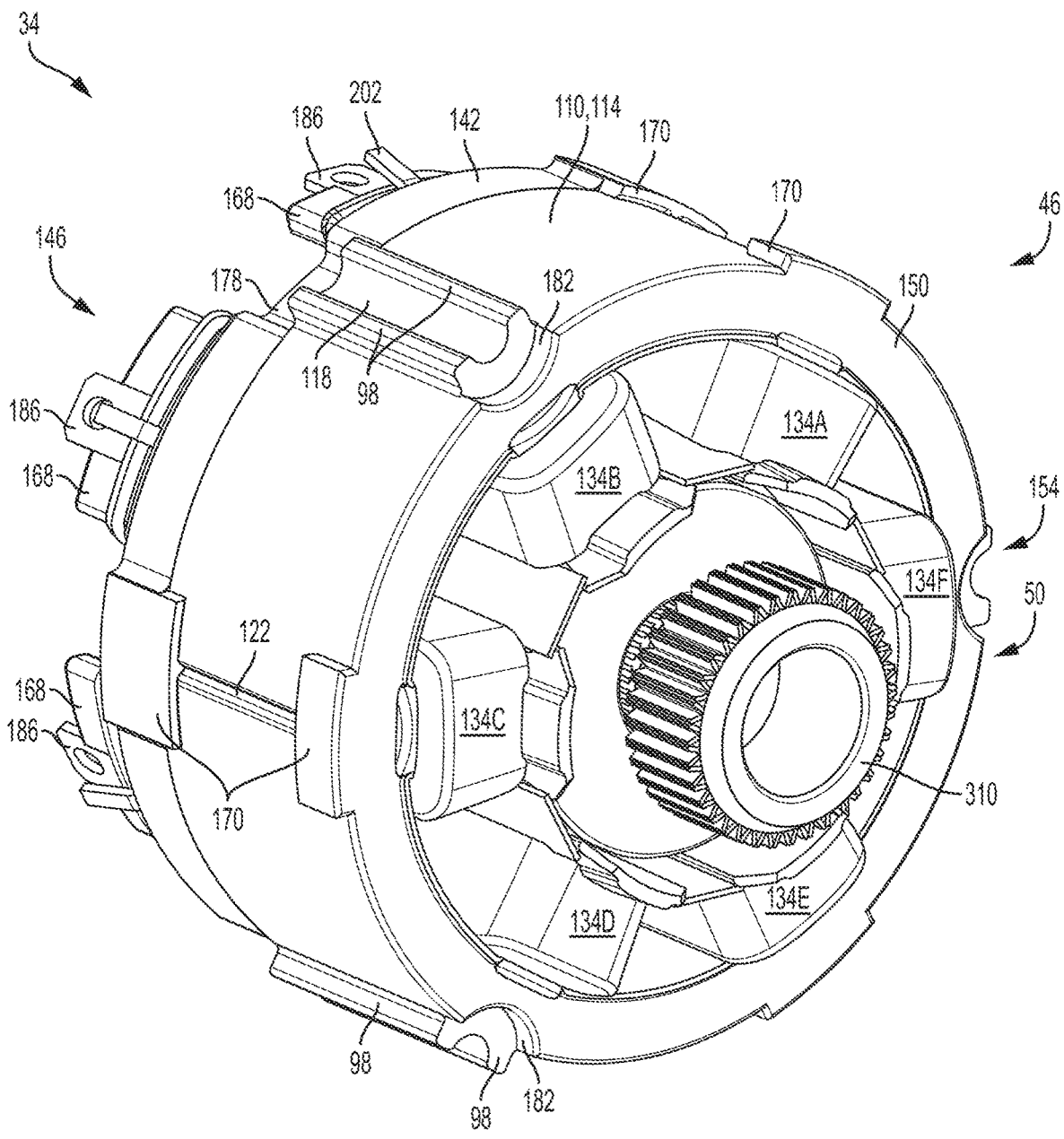
FIG. 8 is another perspective view of the motor assembly of FIG. 3, with portions removed.
Figure 9:
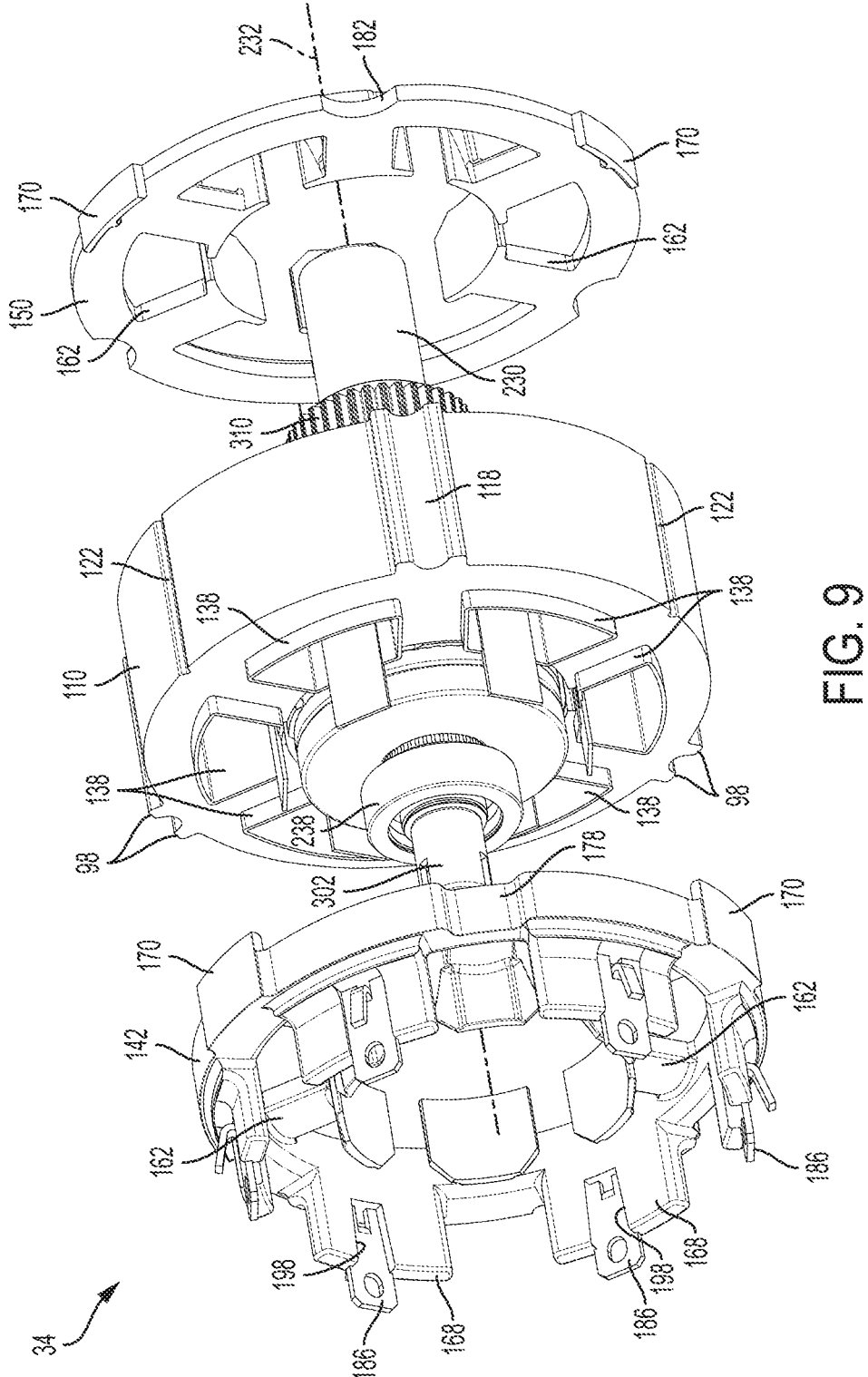
FIG. 9 is a perspective exploded view of the motor assembly of FIG. 3, with portions removed.

With reference to FIGS. 15-16, the coil contact plates 186 are generally semi-circular in shape and staggered to avoid contact between adjacent coil contact plates 186. Each coil contact plate 186 includes a first terminal 190 and a second terminal 194 diagonally opposite the first terminal 190. In the illustrated embodiment, the terminals 190, 194 are positioned within a slot 198 formed by the flange 168 on the front end cap 142. The stator windings 134 are connected to hooks 202 formed on the terminals 190, 194 (FIG. 7). The terminals 190, 194 of the coil contact plates 186A, 186B, 186C are connected, respectively to the U, V, W phases of the inverter bridge 410.

In some embodiments, the coil contact plates 186 are directly electrically coupled to a printed circuit board via the terminals 190, 194. In other embodiments, the coil contact plates 186 may be connected to a printed circuit board by lead wires. For example, lead wires may be connected to the first terminals 190 (e.g., to holes 206 in the first terminals 190) and routed to the PCB within the power tool housing (e.g., the tool housing 1028).

In some embodiments, the front end cap 142 and the rear end cap 150 may be manufactured separately from the stator core 110, positioned relative to the stator core 110 using the tabs 170 and the recesses 122, and then retained to the stator core 110 by the completed coil windings 134. In such an embodiment, the coil contact plates 186 may be overmolded by the front end cap 142 using, for example, an insert molding process.

In other embodiments (not shown), the stator core 110 and the coil contact plates 186 may be inert molded together, for example, using an injection molding process. In such an embodiment, the mold material defining each of the end caps 142, 150 may also overlie one or more of the stator laminations 106 in the front 146 and the rear 154 of the stator core 110.

In both embodiments, because the coil contact plates 186 are molded within the front end cap 142, separate means of attaching the coil contact plates 186 to the end cap 142 is unnecessary. Also, the entire circumferential length of the coil contact plates 186 is insulated within the nonconductive mold material comprising the end cap 142, thereby reducing the likelihood of corrosion of the coil contact plates 186 if the motor 34 is exposed to wet or damp environments.

Figure 17:
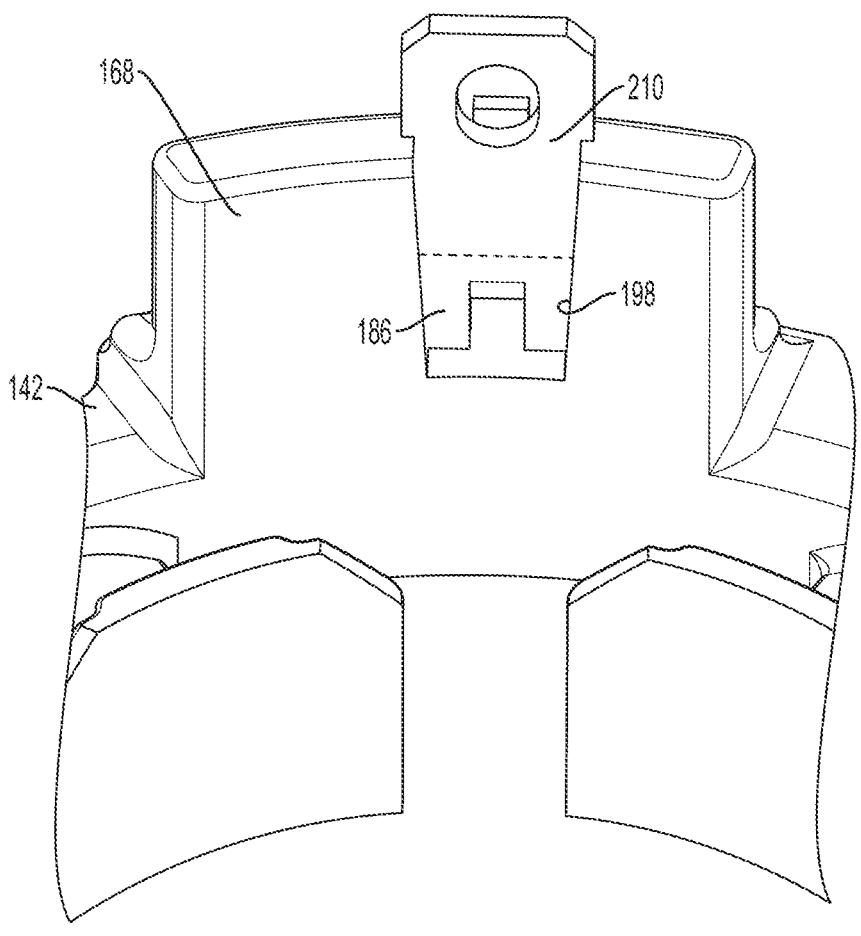
FIG. 17 is an enlarged partial perspective view of a stator end cap and coil contact plate terminal according to an independent aspect of the invention.

With reference to FIG. 17, in some embodiments, the embedded stator coil contact plates 186 include an attachable terminal 210. Specifically, the attachable terminal 210 may be secured to the coil contact plates 186 after the coil contact plates 186 have been embedded within the end cap 142. Advantageously, the attachable terminals 210 can be properly selected for size (e.g., thickness), shape (e.g., hook size), material, etc., for a given application. In other words, a thicker terminal with a larger hook size may be required for an application requiring larger current values. In addition, separating the terminals 210 from the coil contact plates 186 reduces the amount of material wasted in manufacturing the coil contact plates via stampings. The terminals 210 may be coupled to the coil contact plates 186 by, for example, a soldering or welding process.

Figure 17A:
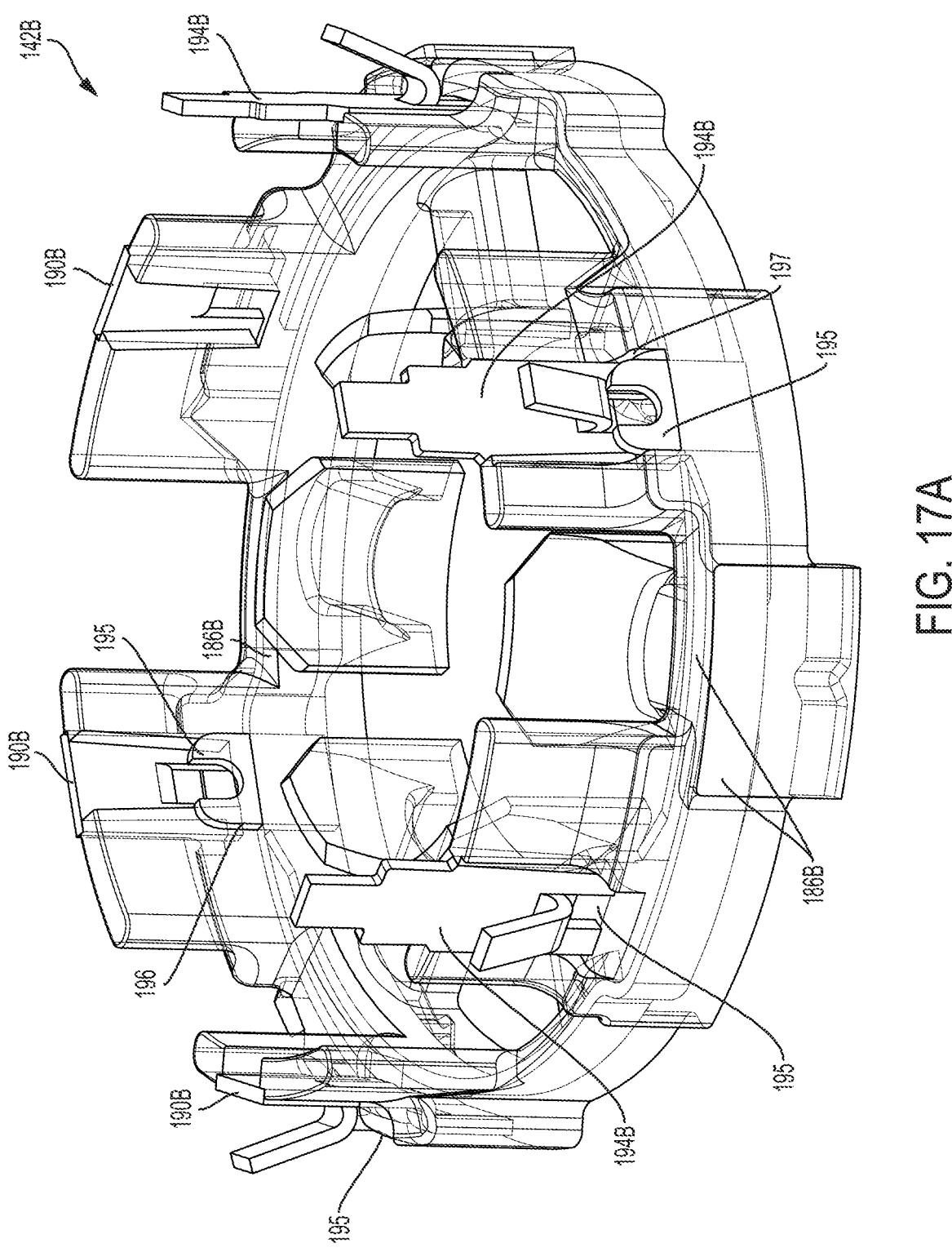
FIG. 17A is a perspective view of a stator end cap with coil contact plates and attachable terminals, according to another aspect of the invention, illustrating the stator end cap in a transparent state.

With reference to FIG. 17A, a stator end cap 142B according to another embodiment is illustrated. The stator end cap 142B includes three embedded coil contact plates 186B (i.e., busbars) and six terminals 190B, 194B. Specifically, three identical contact plates 186B are overmolded within the stator end cap 142B, and can be, for example, approximate 1.0 mm thick.

The terminals 190B, 194B are joined to the contact plates 186B after the molding process by, for example, a welding process. In particular, the terminals 190B, 194B connect to the contact plates 186B at a connection portion 195. In the illustrated embodiment, the adjacent connection portions 195 alternate between positioned on an inner surface 196 and positioned on an outer surface 197 to enable all of the terminals 190B, 194B to be located in the same radial location. The terminals 190B, 194B include three short terminals 190B and three long terminals 194B (e.g., between approximately 1.3 mm and approximately 1.5 mm). As mentioned above, the terminals 190B, 194B can range in size to meet various design requirements.

Figures 17B, 17C:
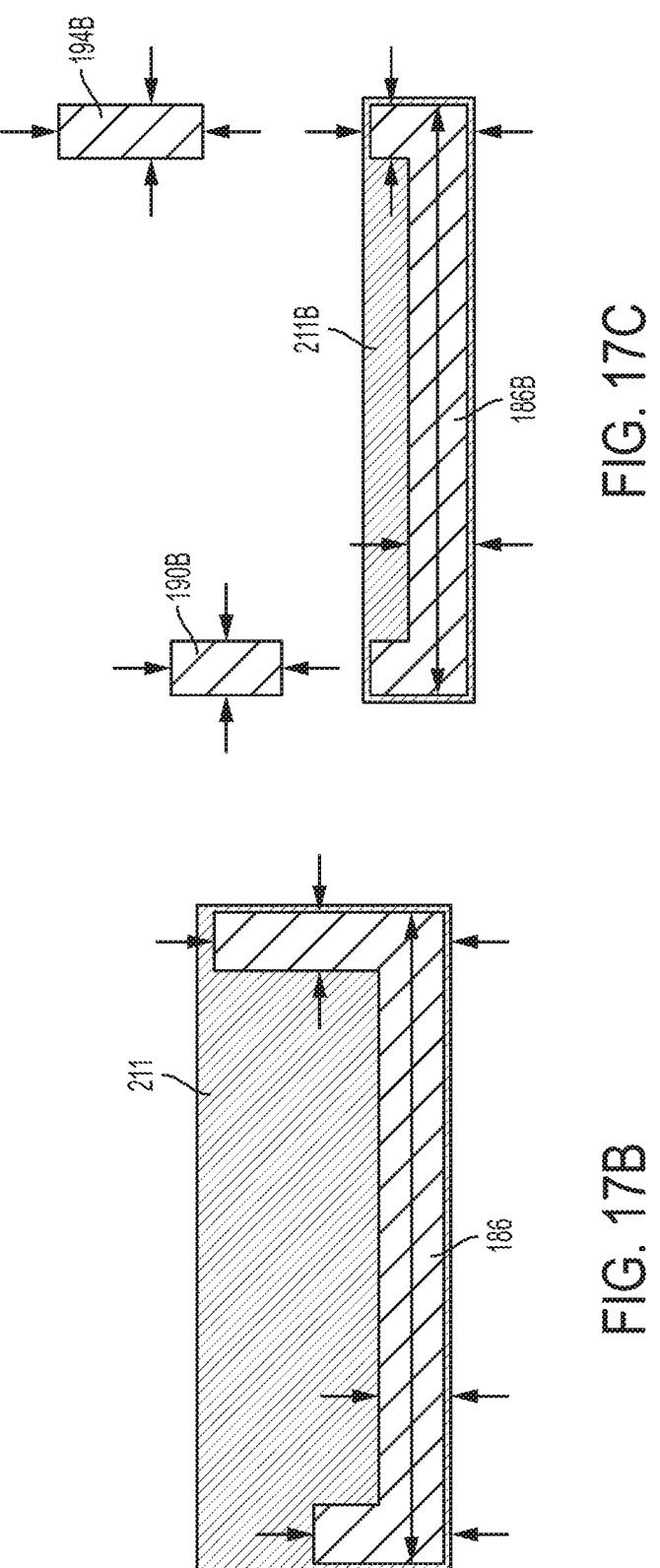
FIG. 17B is a manufacturing schematic for a coil contact plate according to an embodiment of the invention.
FIG. 17C is a manufacturing schematic for a coil contact plate and attachable terminals according to another independent embodiment of the invention.
Figure 18:
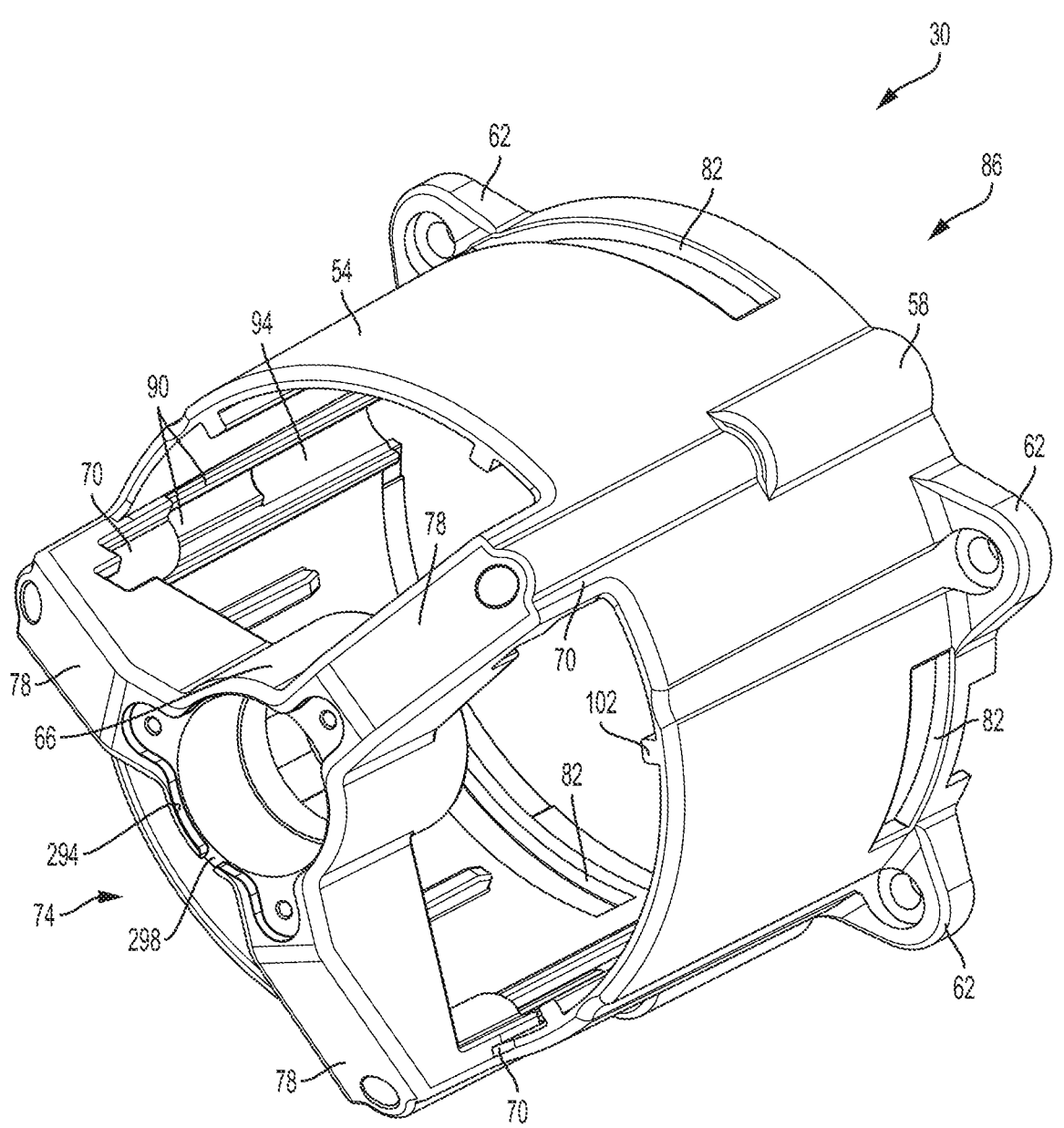
FIG. 18 is a perspective view of a motor housing of the motor assembly of FIG. 3.
Figure 19:
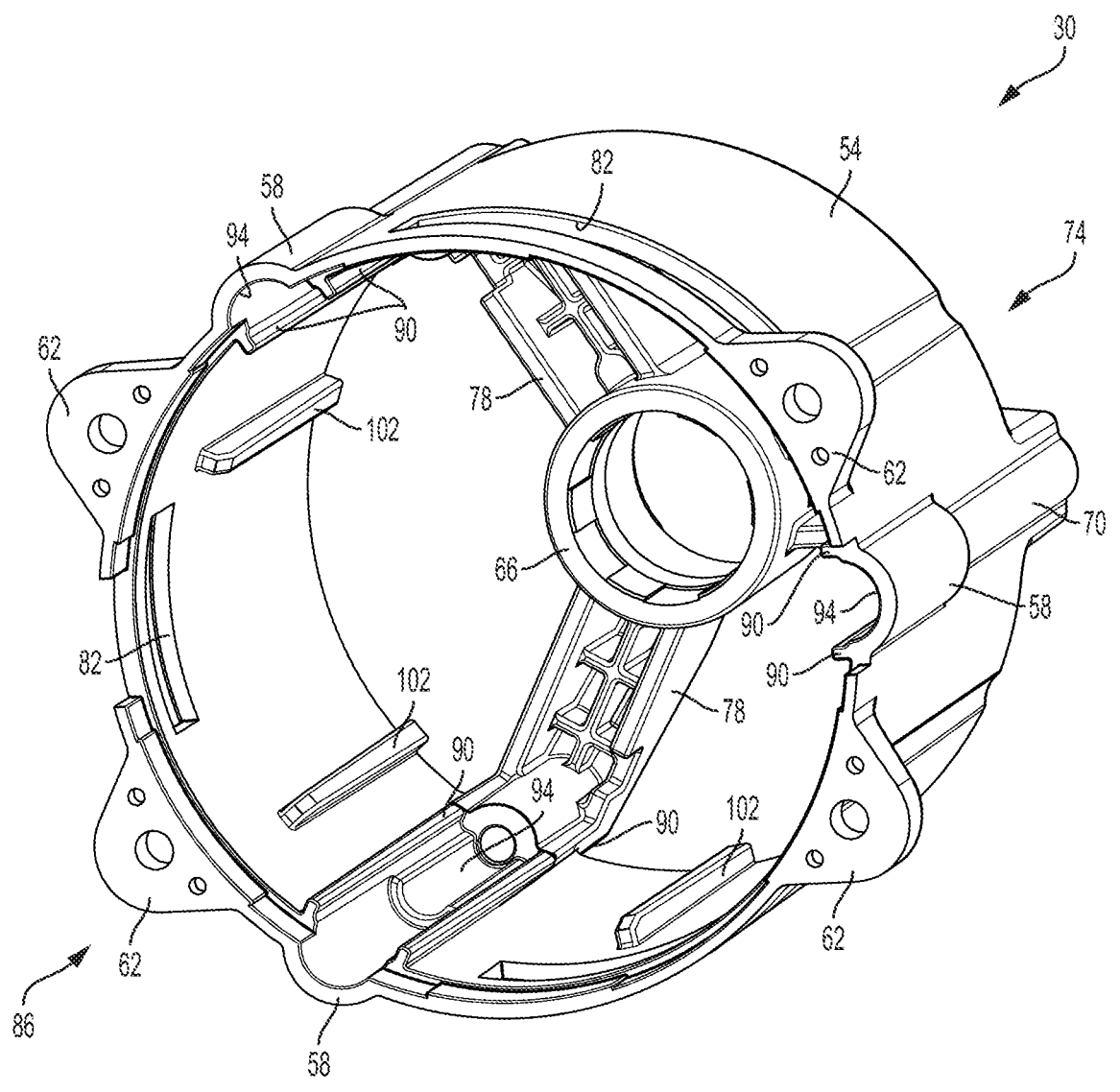
FIG. 19 is another perspective view of the motor housing of FIG. 18.
Figure 20:
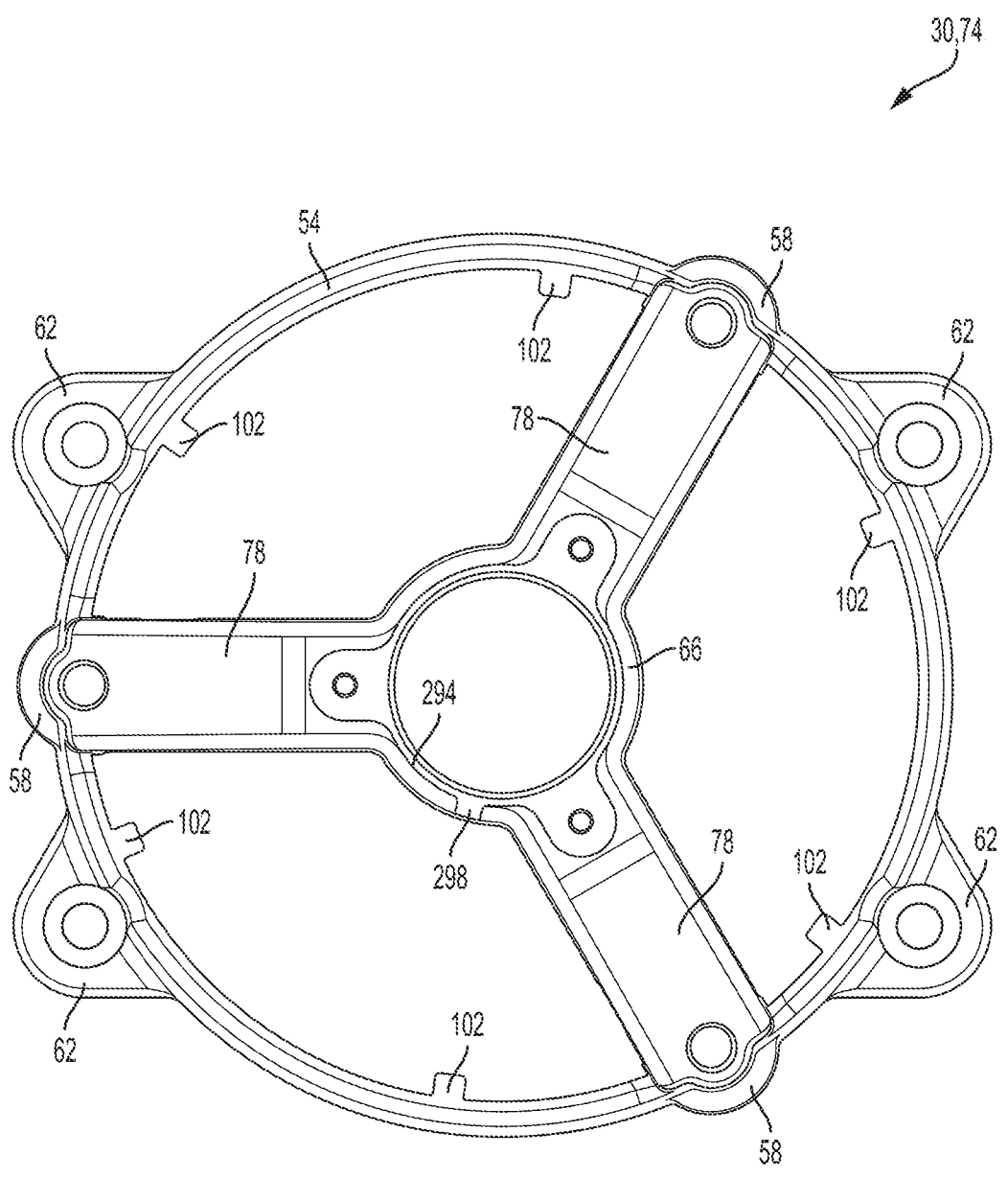
FIG. 20 is a front view of the motor housing of FIG. 18.
Figure 21:
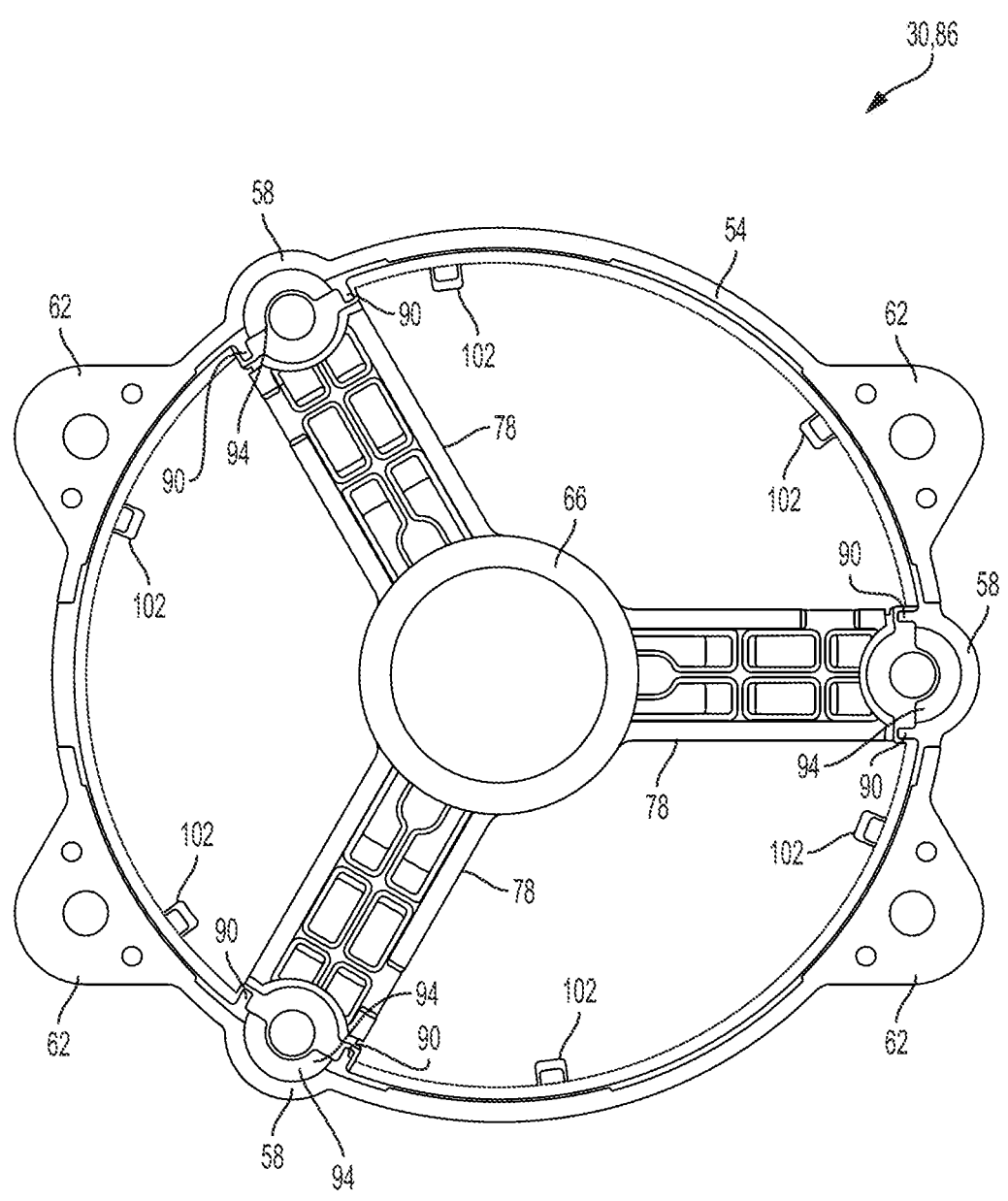
FIG. 21 is a rear view of the motor housing of FIG. 18.

With reference to FIGS. 17B and 17C, the coil contact plates (e.g., 186) and terminals (e.g., 190, 194) can be manufactured via a metal stamping process, for example. With reference to FIG. 17B, the coil contact plate 186 can be stamped from a single piece of material 211. The single piece of material 211 may include an area of approximately 3190 square millimeters (mm²), and the coil contact plate 186 may include an area of approximately 768 mm². This results in a material scrap rate of approximately 76%.

With reference to FIG. 17C, the coil contact plate 186B is stamped from a first piece of material 211B, and the two terminals 190B, 194B are each stamped separately. The total required amount of material necessary for manufacturing the coil contact plate 186B, the short terminal 190B, and the long terminal 194B is approximately 1310 mm², and the total area of the resulting parts is approximately 840 mm². This results in a material scrap rate of approximately 36%.

In addition, material savings can be further increased with the design of FIG. 17C, since the thickness of the individual components can be adjusted. For example, the coil contact plate 186B can be approximately 1 mm thick, while the terminals 194B can be approximately 1.3 mm to approximately 1.5 mm thick. In contrast, the single piece design of FIG. 17B is a uniform thickness on account of using a single piece of material 211.

Figure 4:
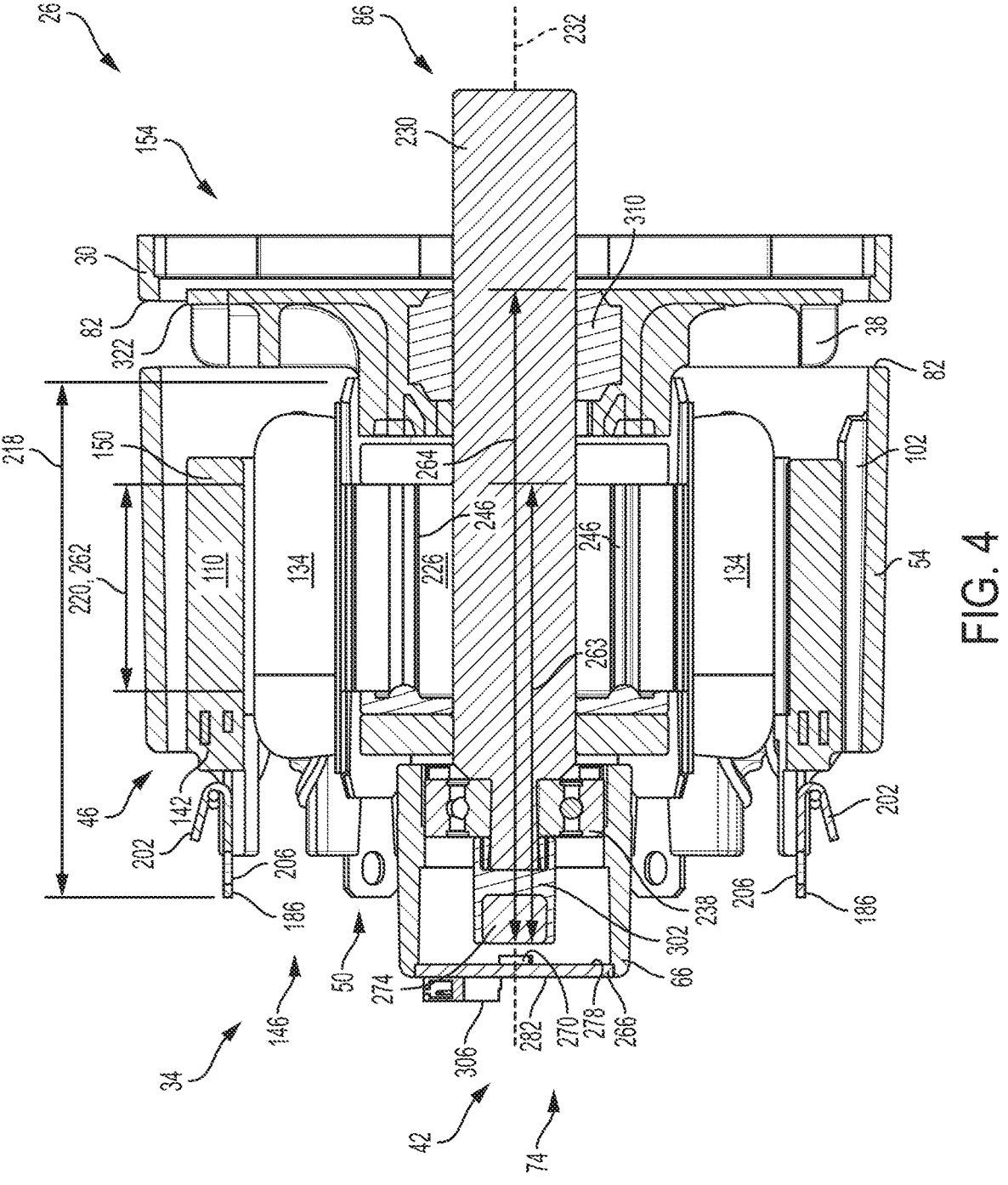
FIG. 4 is a cross-sectional view of the motor assembly of FIG. 3, taken generally along lines 3-3 of FIG. 3.
Figure 5:
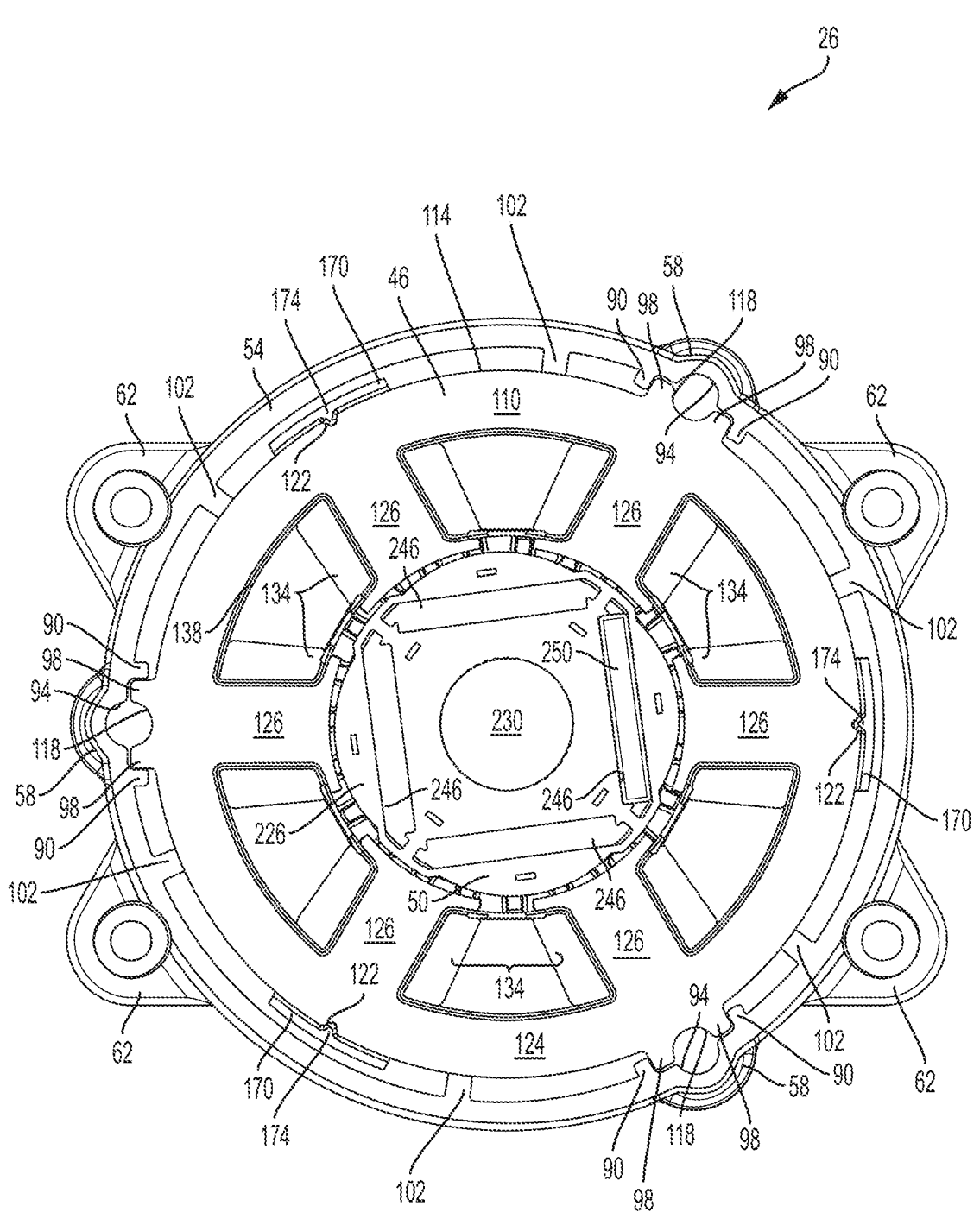
FIG. 5 is a cross-sectional view of the motor assembly of FIG. 3, taken generally along lines 4-4 of FIG. 3.
Figure 10:
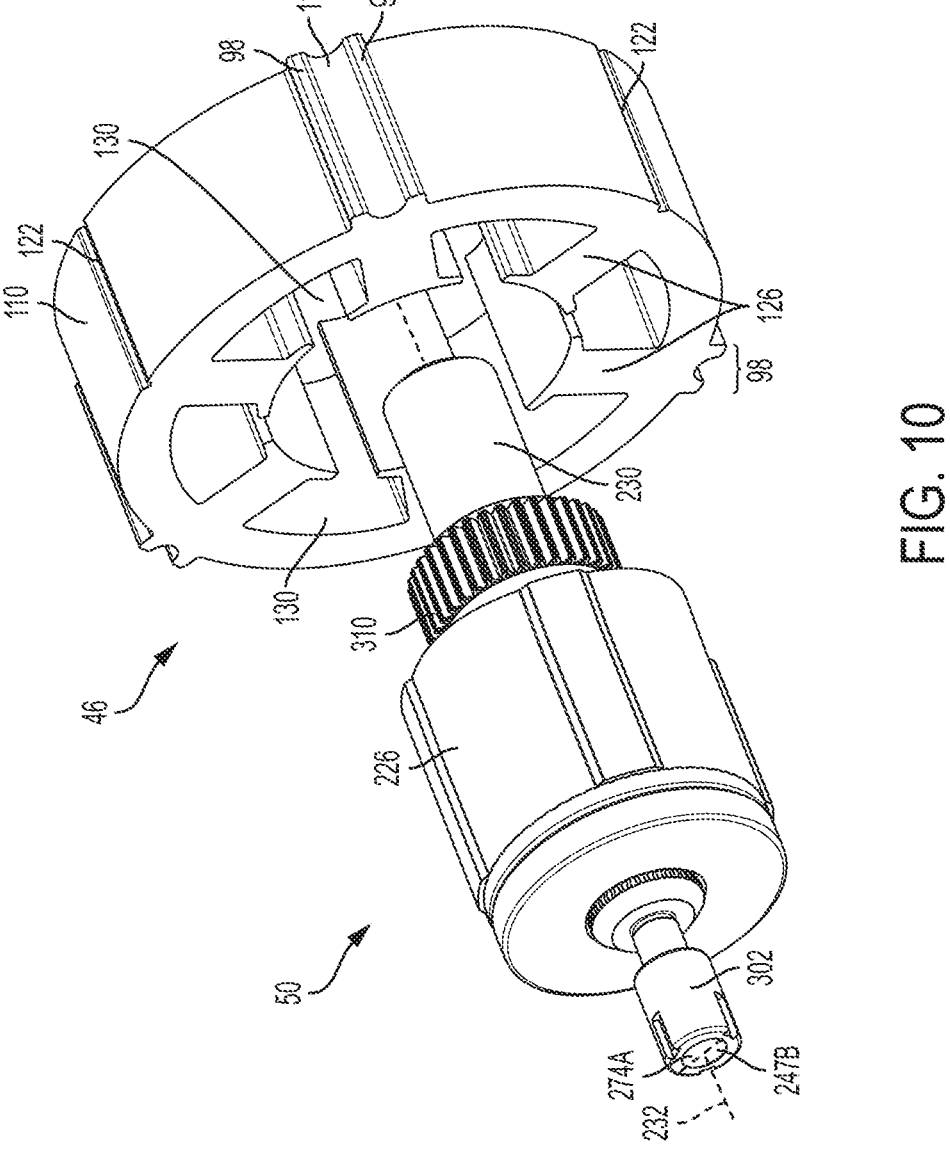
FIG. 10 is a perspective exploded view of the motor assembly of FIG. 3, with portions removed.

With particular reference to FIGS. 4-5 and 10, the rotor 50 includes individual rotor laminations 222 stacked together to form a rotor core 226. A rotor shaft 230 is positioned through a center aperture 234 in the rotor laminations 222. The rotor shaft 230 is at least partially supported by a bearing 238 (FIG. 22) positioned within the hub portion 66. The rotor shaft 230 defines a rotational axis 232 of the rotor 50.

The rotor laminations 222 include a non-circular outer circumference 242 and a plurality of slots 246 in which permanent magnets 250 are received (only one of which is shown in FIG. 5). In the illustrated embodiment, the rotor 50 is an interior permanent magnet (IPM) type rotor (a.k.a., a buried magnet type rotor). In the illustrated embodiment, the plurality of slots 246 further include air barriers 254 (i.e., flux barriers) at ends of the slots 246. In addition to improving the magnetic characteristics of the rotor 50, the air barriers 254 may accommodate adhesive to aid in retaining the permanent magnets 250 within the slots 246.

Figure 6A:
FIG. 6A is a perspective exploded view of the motor assembly of FIG. 3.
Figure 6B:
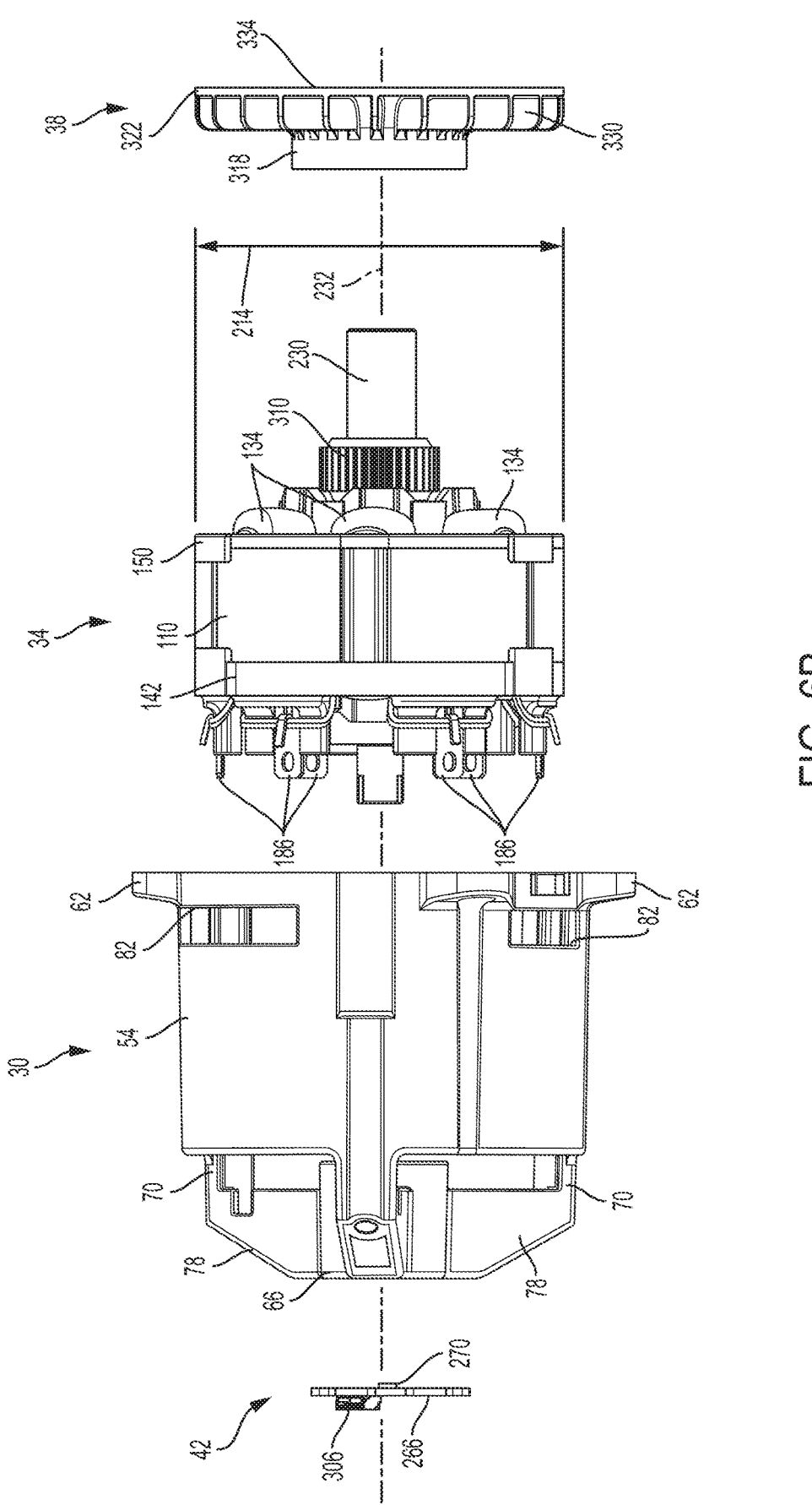
FIG. 6B is a side exploded view of the motor assembly of FIG. 3.

With continued reference to FIGS. 6B and 11, the stator 46 defines an outer diameter 214 of at least 70 mm. In some embodiments, the outer diameter 214 is between approximately 70 mm and approximately 100 mm. In some embodiments, the outer diameter 214 is approximately 80 mm. In other embodiments, the outer diameter 214 may be approximately 85 mm, 90 mm, or 100 mm).

With reference to FIG. 4, the stator 46 defines a length 218 within a range of approximately 78 mm to approximately 98 mm. In some embodiments, the length 218 is approximately 88 mm (e.g., between about 87.8 mm and about 88.8 mm (88.3 mm)). The stator core 110 defines a length 220 within a range of approximately 40 mm to approximately 80 mm. In some embodiments, the length 220 of the stator core 110 is approximately 50 mm (e.g., between about 49.7 mm and about 50.7 mm (50.2 mm)).

The total weight of the stator 46 (i.e., stator core 110, end caps 142, 150, and coils 134) is within a range of approximately 2.62 pounds and approximately 2.82 pounds. In some embodiments, the total weight of the stator 46 is approximately 2.72 pounds.

The stator laminations 106 themselves define a volume within a range of approximately 112.45 cubic centimeters (cm³) and approximately 132.45 cm3. In some embodiments the stator laminations 106 themselves define a volume of approximately 122.45 cm³. The stator core 110 further defines a cylindrical volumetric envelope containing the stator laminations 106 within a range of approximately 242,200 mm³ and approximately 262,200 mm³. In some embodiments, the stator core 110 defines a cylindrical volumetric envelope containing the stator laminations 106 of approximately 252,200 mm³. The stator 46 defines a cylindrical volumetric envelope containing the stator laminations 106 and the end caps 142, 140 within a range of approximately 433,600 mm³ and approximately 453,000 mm³. In some embodiments, the stator 46 defines a cylindrical volumetric envelope containing the stator laminations 106 and the end caps 142, 140 of approximately 443,000 mm³.

With continued reference to FIG. 4 and the embodiment with a stator core 110 length 220 of approximately 50 mm, the rotor 50 defines an outer diameter 258 within a range of approximately 30 mm and approximately 50 mm. In some embodiments, the outer diameter 258 is approximately 39.1 mm. With reference to FIG. 4, the rotor core 226 defines a length 262 within a range of approximately 40 mm to approximately 80 mm. In some embodiments, the length 262 of the rotor core 226 is approximately 50 mm. In some embodiments, the length 262 of the rotor core 226 is equal to the length 220 of the stator core 110. The rotor 50 further defines a length 263 from the magnet 274 to end of the rotor core 226 of approximately 81.45 mm. In addition, the rotor 50 defines a length 264 from the magnet 274 to the back of the fan 38 of approximately 105.2 mm.

The total weight of the rotor 50 (i.e., the weight of the rotor core 226, magnets 250, rotor shaft 230, bearings 238 and fan 38) is within a range of approximately 1.68 pounds and approximately 2.08 pounds. In some embodiments, the total weight of the rotor 50 is approximately 1.88 pounds. The weight of the rotor core 226 is within a range of approximately 0.6 pounds to approximately 1.0 pounds. In some embodiments, the weight of the rotor core 226 is approximately 0.8 pounds. In addition, the rotor laminations 222 themselves define a volume within a range of approximately 34.02 cm³ to approximately 36.02 cm³. In some embodiments, the rotor laminations 222 themselves define a volume of approximately 35.02 cm³.

In an alternative embodiment, the stator 46 defines a length 218 within a range of approximately 53 mm to approximately 73 mm. In some embodiments, the length 218 is approximately 63 mm (e.g., between about 62.8 mm and about 63.8 mm (63.3 mm)). The stator core 110 defines a length 220 within a range of approximately 15 mm to approximately 35 mm. In some embodiments, the length 220 of the stator core 110 is approximately 25 mm (e.g., between about 24.7 mm to about 25.7 mm (25.2 mm)).

The total weight of the stator 46 (i.e., stator core 110, end caps 142, 150, and coils 134) is within a range of approximately 1.26 pounds and approximately 1.46 pounds. In some embodiments, the total weight of the stator 46 is approximately 1.36 pounds.

The stator laminations 106 themselves define a volume within a range of approximately 51.25 cm³ and approximately 71.25 cm³. In some embodiments the stator laminations 106 themselves define a volume of approximately 61.25 cm³. The stator core 110 further defines a cylindrical volumetric envelope containing the stator laminations 106 within a range of approximately 116,600 mm³ and approximately 136,600 mm³. In some embodiments, the stator core 110 defines a cylindrical volumetric envelope containing the stator laminations 106 of approximately 126,600 mm³. The stator 46 defines a cylindrical volumetric envelope containing the stator laminations 106 and the end caps 142, 140 within a range of approximately 308,000 mm³ and approximately 328,000 mm³. In some embodiments, the stator 46 defines a cylindrical volumetric envelope containing the stator laminations 106 and the end caps 142, 140 of approximately 318,000 mm³.

With continued reference to the alternative embodiment with a stator core 110 length 220 of approximately 25 mm, the rotor 50 defines an outer diameter 258 within a range of approximately 30 mm and approximately 50 mm. In some embodiments, the outer diameter 258 is approximately 39.1 mm. With reference to FIG. 4, the rotor core 226 defines a length 262 within a range of approximately 15 mm to approximately 35 mm. In some embodiments, the length 262 of the rotor core 226 is approximately 25 mm. In some embodiments, the length 262 of the rotor core 226 is equal to the length 220 of the stator core 110. The rotor 50 further defines a length 263 from the magnet 274 to end of the rotor core 226 of approximately 56.45 mm. In addition, the rotor 50 defines a length 264 from the magnet 274 to the back of the fan 38 of approximately 80.2 mm.

The total weight of the rotor 50 (i.e., the weight of rotor core 226, magnets 250, rotor shaft 230, bearings 238 and fan 38) is within a range of approximately 0.84 pounds and approximately 1.04 pounds. In some embodiments, the total weight of the rotor 50 is approximately 0.94 pounds. The rotor core 226 weight is within a range of approximately 0.3 pounds to approximately 0.5 pounds. In some embodiments, the weight of the rotor core 226 is approximately 0.4 pounds.

In addition, the rotor laminations 222 themselves define a volume within a range of approximately 16.51 cm³ to approximately 18.51 cm³. In some embodiments, the rotor laminations 222 themselves define a volume of approximately 17.51 cm³.

Figure 3:
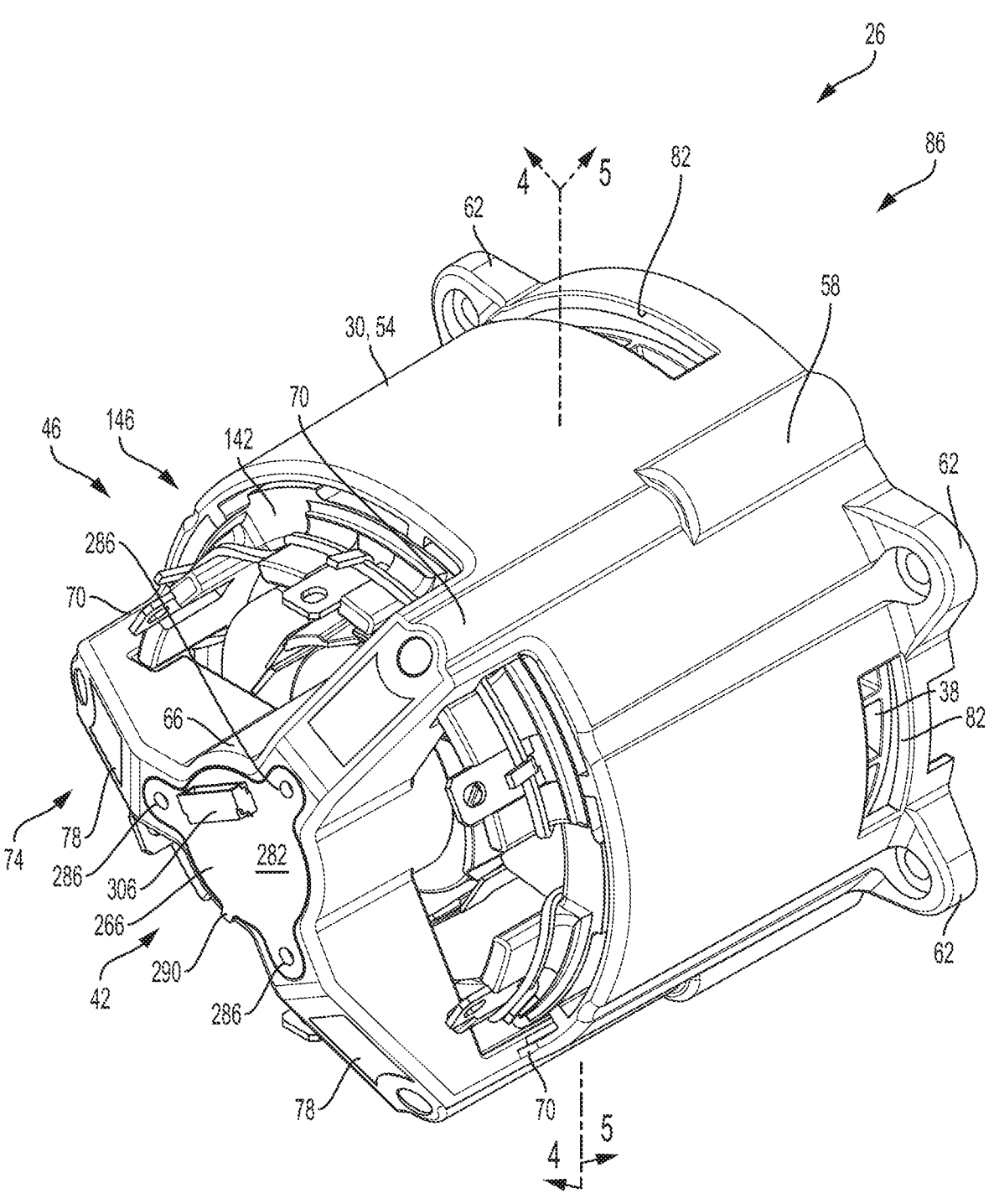
FIG. 3 is a perspective view of the motor assembly of the power tool system of FIG. 1.
Figure 22:
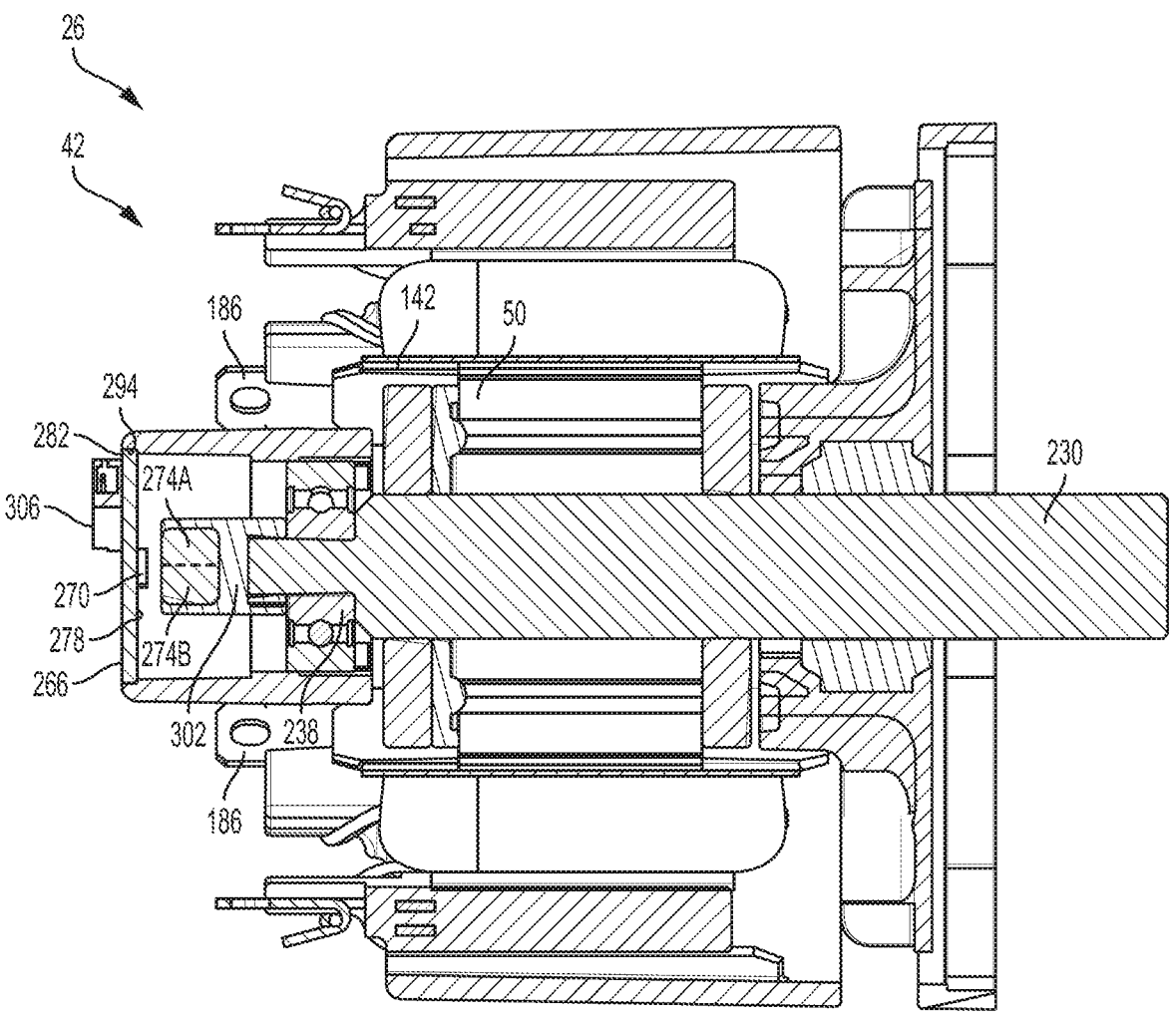
FIG. 22 is an enlarged cross-sectional view of a rotor position sense assembly of the motor assembly of FIG. 3, taken along lines 22-22 of FIG. 3.
Figure 23:
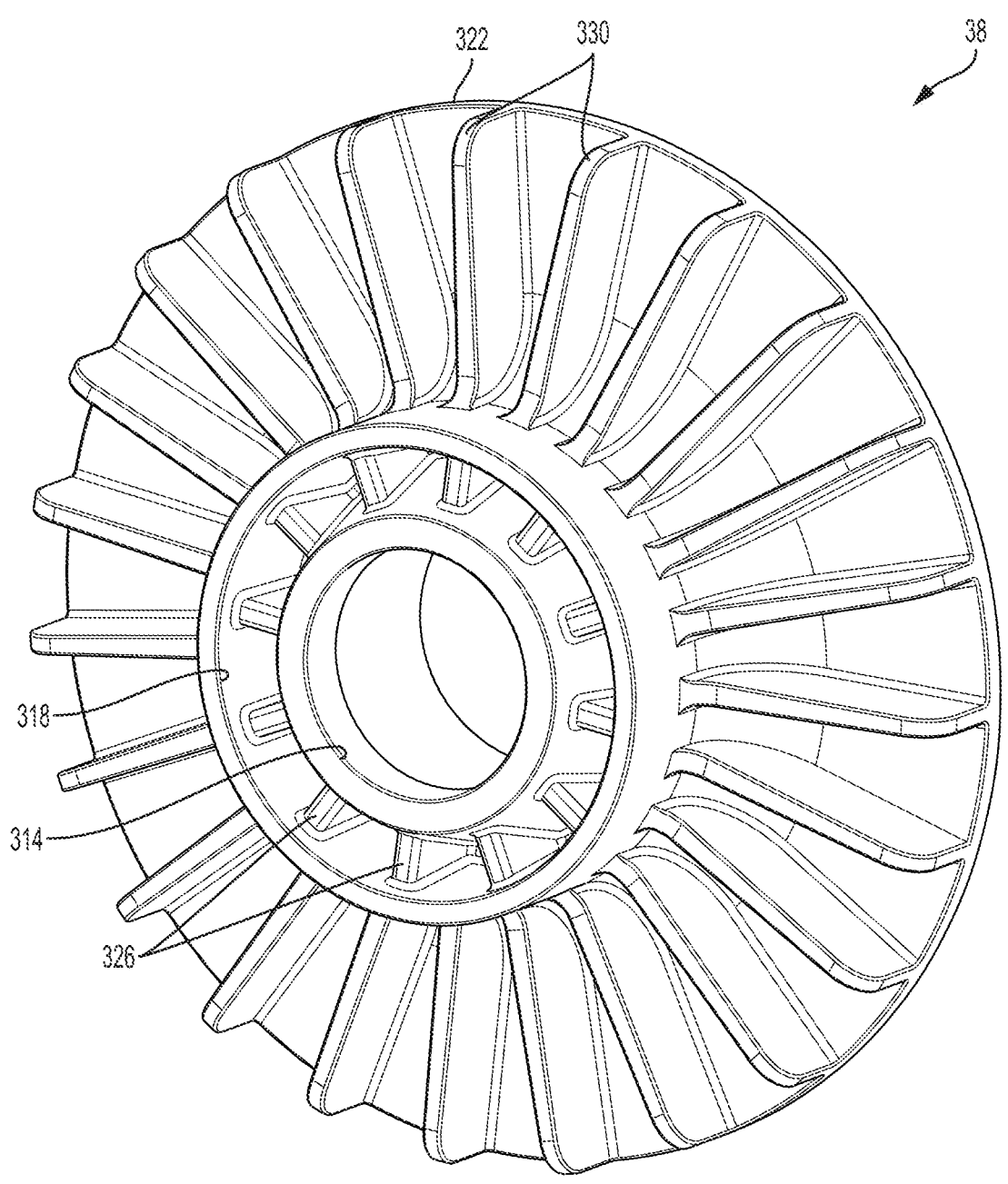
FIG. 23 is a perspective view of a fan of the motor assembly of FIG. 3.

With reference to FIGS. 3 and 22, the rotor position sensing assembly 42 includes a printed circuit board (PCB) 266, a Hall-effect array sensor 270 (i.e., a Hall-effect encoder), and a magnet 274. The PCB 266 includes a first side 278 and a second, opposite side 282. The PCB 266 includes three mounting lobes 286 and a tab 290 for properly orienting the PCB 266. Specifically, the PCB 266 is received within a recess 294 formed in the hub portion 66 of the motor housing 30. The recess 294 defines a slot 298 to receive the tab 290 to enable installation of the rotor position sensing assembly 42 in only the correct orientation.

With continued reference to FIG. 22, the magnet 274 is a solid circular magnet with two magnetic poles (i.e., a north pole 274A on one half and a south pole 274B on the other half). The magnet 274 is mounted to the rotor shaft 230 via a coupler 302. In some embodiments, the magnet 274 may be molded or pressed on to the rotor shaft. The Hall-effect array sensor 270 is mounted on the first side 278 of the PCB 266, in facing relationship with the magnet 274. In particular, the Hall-effect array sensor 270 is mounted aligned with and spaced from the magnet 274. In other words, the Hall-effect array sensor 270 is co-axially mounted with respect to the magnet 274.

A connection terminal 306 is provided on the second side 282 of the PCB 266, which transmits a signal generated by the Hall-effect array sensor 270 indicative of the rotor 50 position. In the illustrated embodiment, the Hall-effect array sensor 270 is a non-contact sensor with absolute position detection capability. In other words, the sensor 270 can be utilized to determine the absolute rotational position of the rotor 50 (i.e., a position between 0 degrees and 360 degrees).

Figure 24:
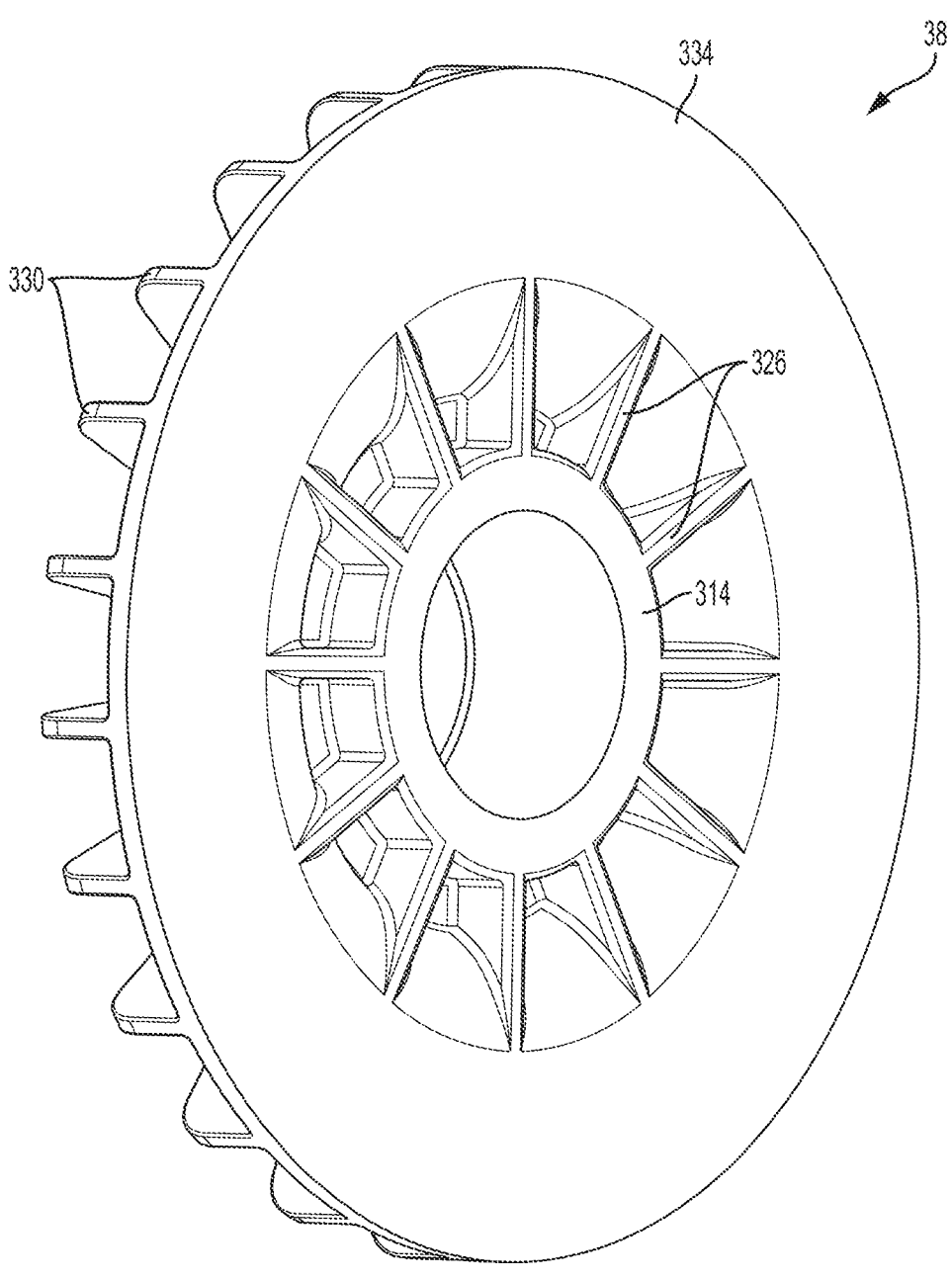
FIG. 24 is another perspective view of the fan of FIG. 23.
Figure 25:
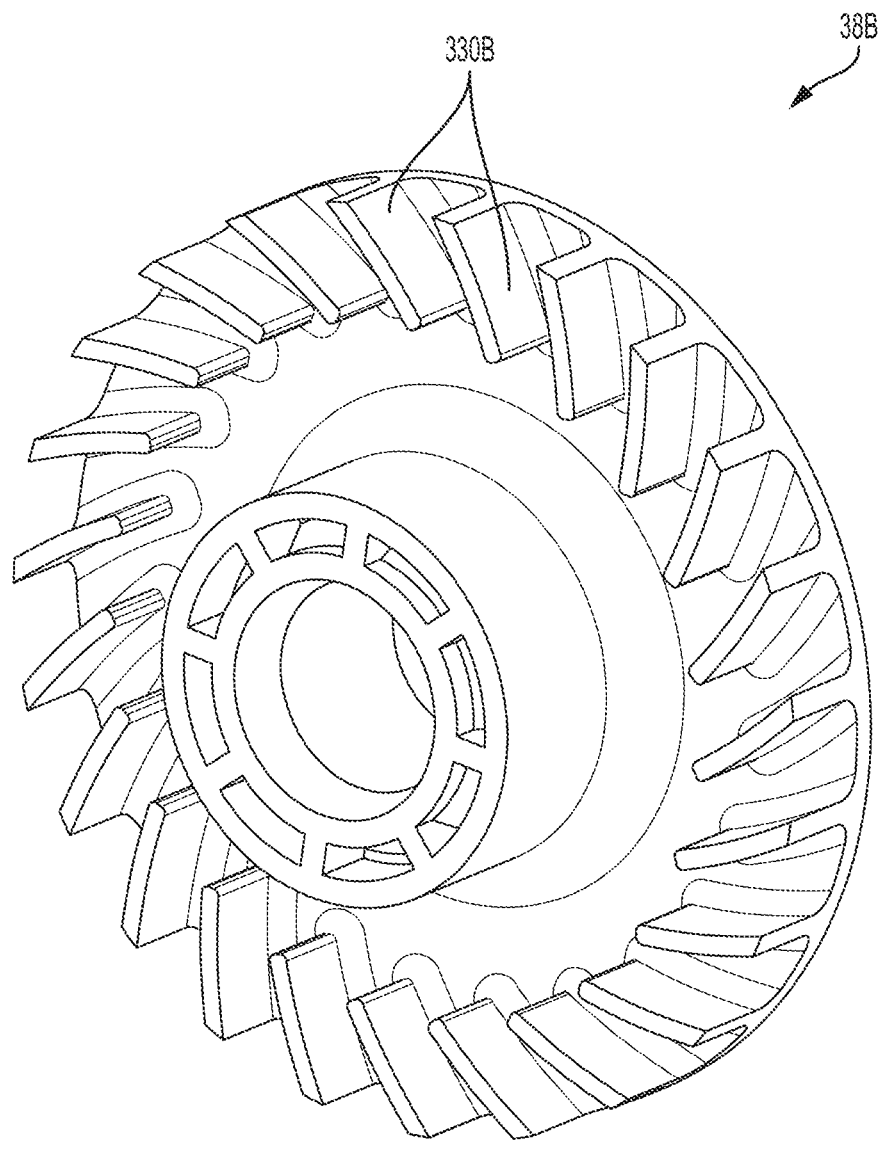
FIG. 25 is a perspective view of a fan according of the motor assembly of FIG. 3, according to another independent aspect of the invention.

With reference to FIGS. 6A-6B and 23-24, the fan 38 is coupled to the rotor shaft 230 for co-rotation therewith. In particular, a fitting 310 is mounted around the rotor shaft 230, and the fitting 310 couples the fan 38 to the rotor shaft 230. The fan 38 includes a central aperture 314, an intermediate ridge 318, and an outer circumferential edge 322. A first set of ribs 326 extends between the central aperture 314 and the intermediate ridge 318, and a second set of ribs 330 (i.e., fan blades) extends from the intermediate ridge 318 to the outer circumferential edge 322. The first set of ribs 326 also extend through a rear surface 334 of the fan 38 (FIG. 24). With reference to FIG. 25, in other embodiments, the motor assembly 26 may include a fan 38B with a single set of fan blades 330B.

Figure 26:
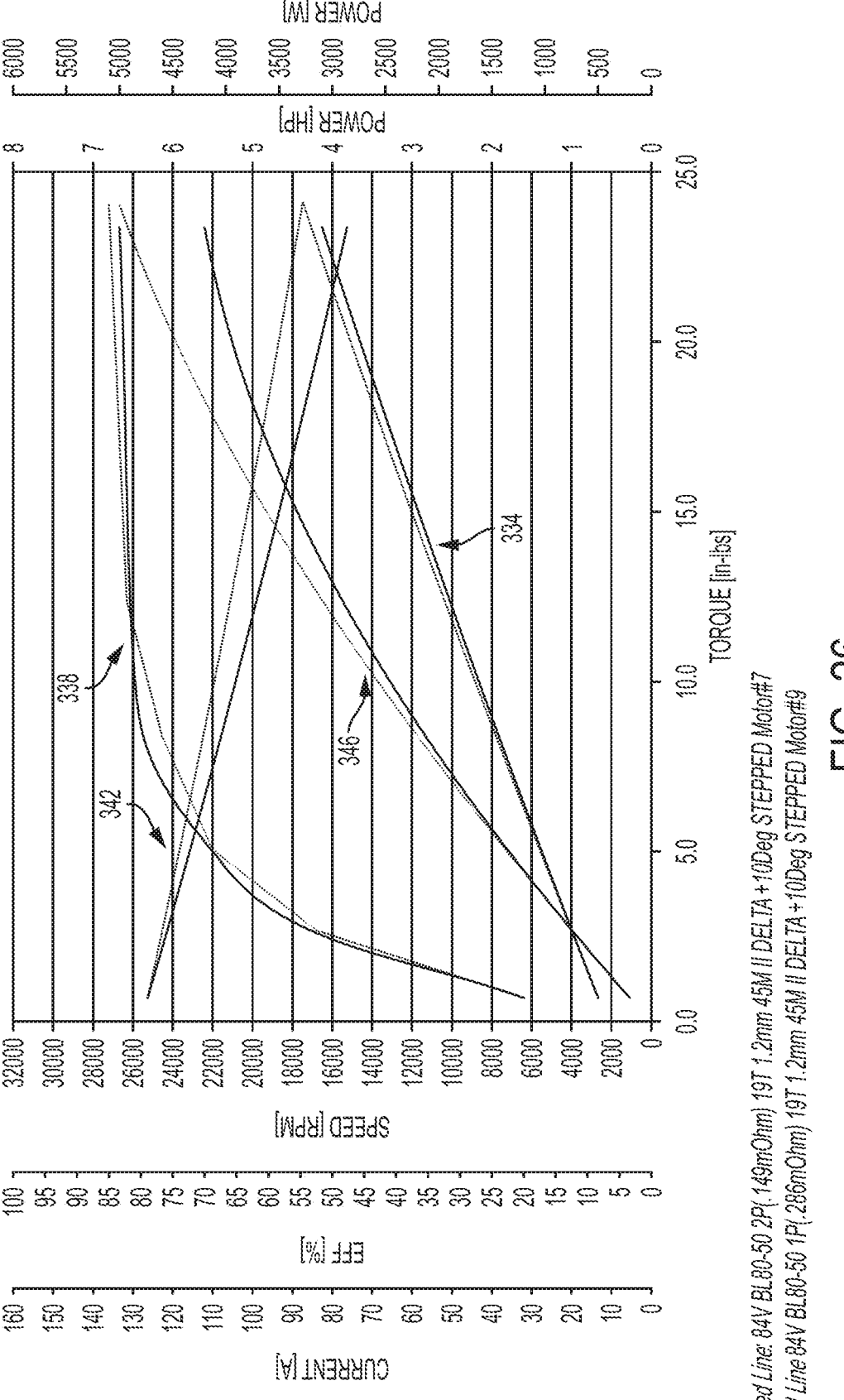
FIG. 26 is a graph of current, efficiency, speed, and power as a function of motor output torque for a high power tool system according to one independent embodiment.

With reference to FIG. 26, experimental results for current 346, efficiency 338, speed 342, and motor power output 334 is illustrated for two high power DC tool systems 14. The results shown are for two embodiments of high power DC tool system 14 with the diameter 214 of the stator 46 approximately 80 mm and the length 220 of the stator core 110 approximately 50 mm. In some embodiments, the peak power output of the motor assembly 26 (with the stator stack length 220 of approximately 50 mm) is within a range of approximately 5,000 W and approximately 8,000 W. In some embodiments, the peak power of the motor assembly 26 is approximately 5,400 W for a single string battery cell arrangement (i.e., the blue traces). In other embodiments, the peak power of the motor assembly 26 is approximately 7,500 W for a two parallel string battery cell arrangement (i.e., the green traces). In some embodiments, the peak power of the motor assembly 26 (with the stator stack length 220 of approximately 50 mm and 19 coil turns of 1.2 mm wire) is approximately 16,000 W at approximately 106 in-lbs. with a stall torque of approximately 158 in-lbs., a peak efficiency of approximately 88% at 34 in-lbs., and a no-load speed of 29,000 RPM.

Figure 27:
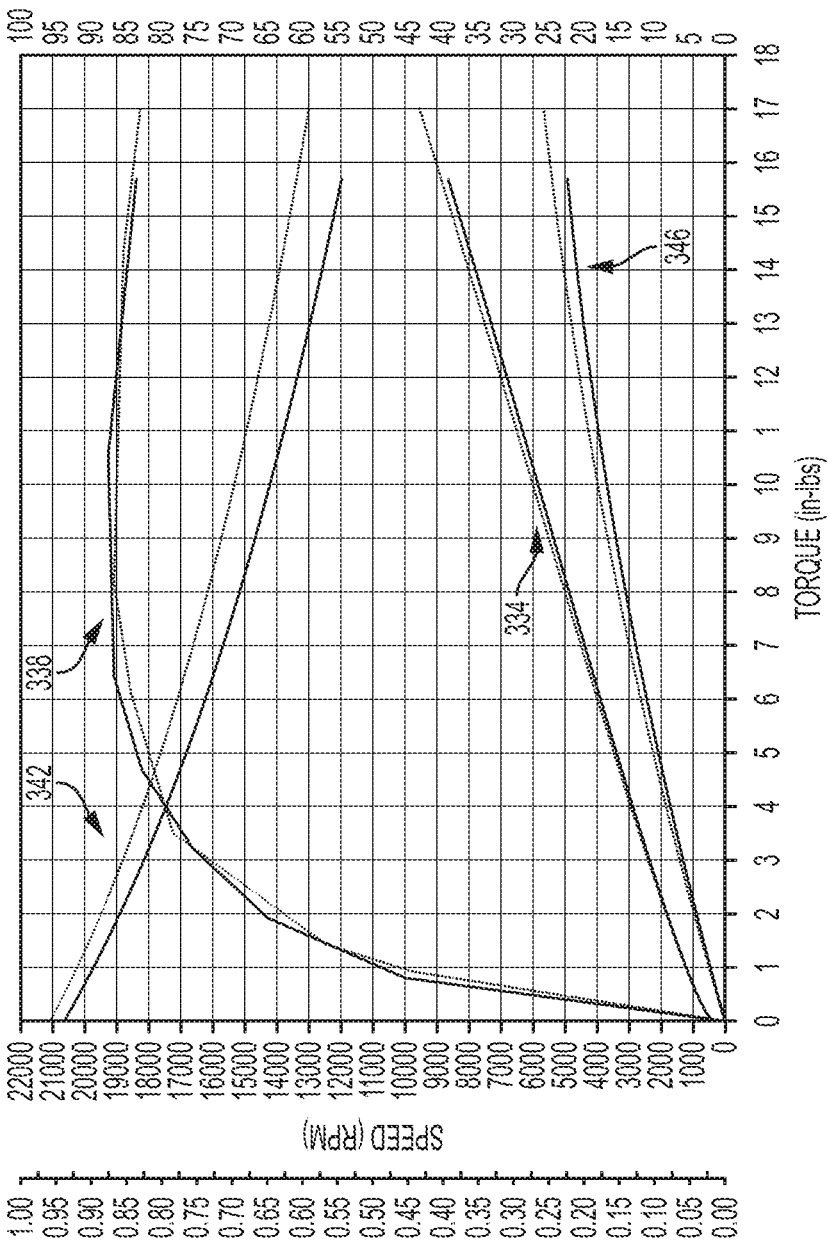
FIG. 27 is a graph of current, efficiency, speed, and power as a function of motor output torque for a high power tool system according to another independent embodiment.

With reference to FIG. 27, experimental results for current 334, efficiency 338, speed 342, and motor power output 346 is illustrated for two high power DC tool systems 14. The results shown are for two embodiments of high power DC tool system 14 with the diameter 214 of the stator 46 approximately 80 mm and the length 220 of the stator core 110 approximately 25 mm. In some embodiments, the peak power output of the motor assembly 26 (with the stator stack length 220 of approximately 25 mm) is within a range of approximately 2,000 W and approximately 4,000 W. In some embodiments, the peak power of the motor assembly 26 is approximately 2,800 W for a single string battery cell arrangement (i.e., the blue traces). In other embodiments, the peak power of the motor assembly 26 is approximately 3,500 W for a two parallel string battery cell arrangement (i.e., the green traces). In some embodiments, the peak power of the motor assembly 26 (with the stator stack length 220 of approximately 25 mm and 54 coil turns of 0.7 mm wire) is approximately 4,500 W at approximately 43 in-lbs. with a stall torque of approximately 75 in-lbs., a peak efficiency of approximately 87% at 14 in-lbs., and a no-load speed of 20,000 RPM.

Figure 28:
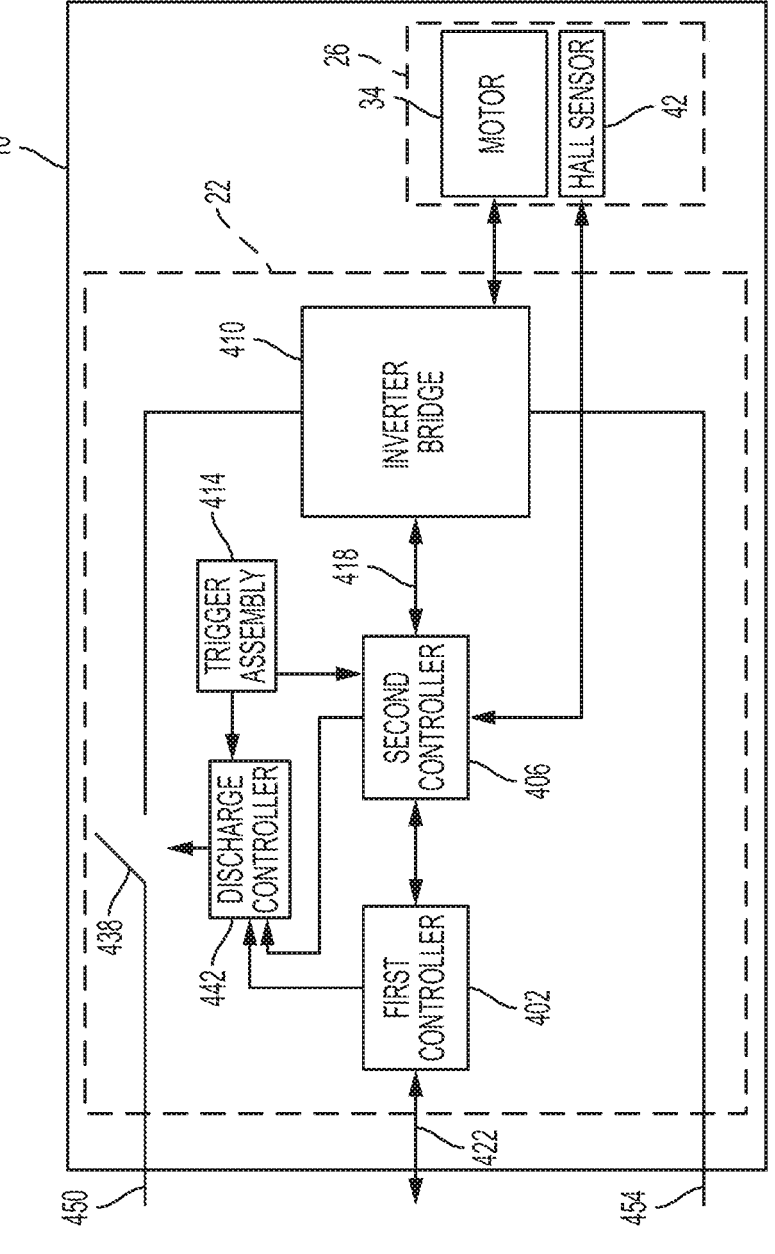
FIG. 28 is a block diagram of the power tool of FIG. 1.

FIG. 28 is a simplified block diagram of one embodiment of the combination 10 illustrating the electronics assembly 22 and the motor assembly 26. The electronics assembly 22 includes a first controller 402, a second controller 406, an inverter bridge 410, and a trigger assembly 414. As described above, with respect to FIGS. 3-6B, the motor assembly 26 includes the motor 34 and the rotor position sensing assembly 42. The electronics assembly 22 may also include additional user inputs (not shown), for example, a mode selector switch, a speed dial, a clutch setting unit, etc.

In some embodiments, the electronics assembly 22 may include a power switch (not shown) in addition to or in place of the trigger assembly 414.

The functionality of the combination 10 may be divided between the first controller 402 and the second controller 406. For example, the first controller 402 may be a main controller of the combination 10, whereas the second controller 406 is an application controller controlling one or more applications of the combination 10. In some embodiments, the second controller 406 may be a motor controller controlling operation of the inverter bridge 410 and the motor 34, and the first controller 402 may be a main controller that performs other functionality of the combination 10. By distributing the functional load of the high-capacity and high-powered combination 10, and by particularly separating motor control functionality from a first controller 402, thermal load is distributed among the first controller 402 and the second controller 406. This thermal distribution thereby reduces the thermal signature of the combination 10.

In some embodiments, the first controller 402 and/or second controller 406 are implemented as microprocessors with separate memory. In other embodiments, the first controller 402 and/or the second controller 406 may be implemented as microcontrollers (with memory on the same chip). In other embodiments, the first controller 402 and/or the second controller 406 may be implemented partially or entirely as, for example, field programmable gate arrays (FPGA), an application specific integrated circuits (ASIC), hardware implemented state machines, etc., and the memory may not be needed or modified accordingly.

In some embodiments, the second controller 406 and the motor assembly 26 may be part of a single motor package. This motor package offers modularity for future applications. For example, multiple motor packages, each including a motor assembly 26 and a second controller 406, may be assembled in a combination 10 and controlled by a single first controller 402.

A communication protocol may be implemented between the first controller 402 and the second controller 406 in order to maintain an uninterrupted operation of the combination 10. In one example, the first controller 402 and the second controller 406 may communicate over a communication bus 418 such as a serial peripheral interface (SPI) bus. The first controller 402 and the second controller 406 may be configured such that the first controller 402 and the second controller 406 exchange communications at a certain time interval. The time interval may be, for example, between 3 milliseconds (ms) to 15 ms. The first controller 402 may also communicate with a battery controller over a communication link 422 as will be described below.

As described above, in some embodiments, the second controller 406 controls the operation of motor 34 through the inverter bridge 410. With reference to FIG. 28, the first controller 402 is communicatively coupled to the trigger assembly 414. The trigger assembly 414 may include, for example, a potentiometer, a distance sensor, etc., to determine and provide an indication of the distance the trigger is pulled to the first controller 402. The first controller 402 reads and processes the trigger information and provides the trigger information to the second controller 406. The second controller 406 is communicatively coupled to the rotor position sensor assembly 42. As described above, the rotor position sensor assembly 42 provides an absolute rotational position of the rotor 50 and/or the rotational speed of the rotor 50. The second controller 406 performs an open loop or closed loop control of the motor 34 through the inverter bridge 410 based on the signals received from the first controller 402 (i.e., trigger information) and the rotor position sensor assembly 42. In some embodiments, the first controller 402 and the second controller 406 are communicatively coupled to the rotor position sensor assembly 42 to provide redundancy for monitoring rotation speed.

Figure 29:
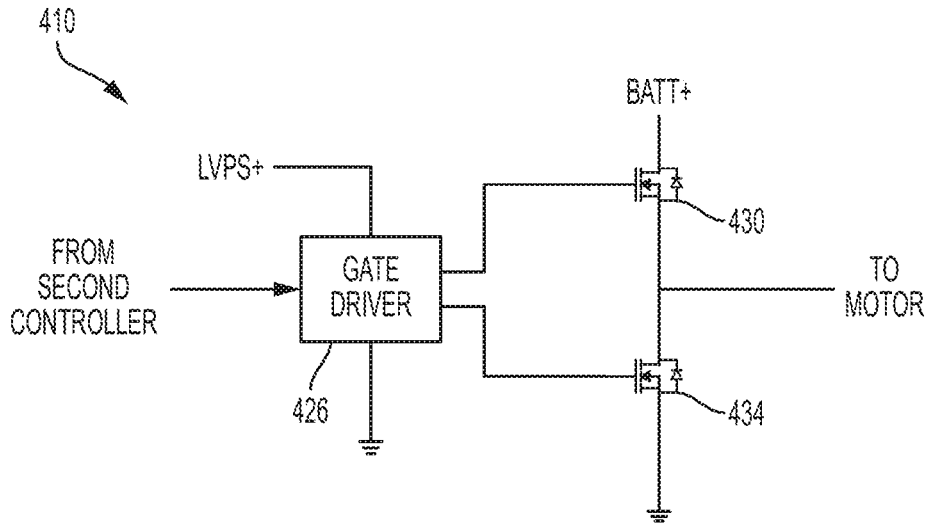
FIG. 29 is a block diagram of an inverter bridge of the power tool of FIG. 1.

With reference to FIG. 29, the inverter bridge 410 controls the power supply to the three-phase (e.g., U, V, and W) motor 34 of the power tool 10. The inverter bridge 410 includes gate drivers 426, high-side FETs 430, and low-side FETs 434 for each phase of the motor 34. The high-side FETs 430 and the low-side FETs 434 are controlled by the corresponding gate drivers 426.

In some embodiments, the inverter bridge 410 may include more than one high-side FET 430 and more than one low-side FET 434 per phase in order to provide redundant current paths for each phase. Although FIG. 29 illustrates only one set of a gate driver 426, a high-side FET 430, and a low-side FET 434, the inverter bridge 410 includes three sets of gate drivers 426, high-side FETs 430, and low-side FETs 434, one for each phase of the motor 34.

The high-side FETs 430 receive battery power supply at the drain of the high-side FETs 430. The source of the high-side FETs 430 is connected to the motor 34 (e.g., phase coil 134 of the motor 34) to provide battery power supply to the motor 34 when the high-side FETs 430 are closed. In other words, the high-side FETs 430 are connected between the battery power supply and the motor phase coils 134.

The drain of the low-side FETs 434 is connected to the motor 34 (e.g., phase coils 134 of the motor 34) and the source of the low-side FETs 434 is connected to ground. In other words, the low-side FETs 434 are connected between the motor phase coils 134 and ground. The low-side FETs 434 provide a current path between the motor phase coils 134 and ground when closed.

When the FETs 430, 434 are closed (or ON), the FETs 430, 434 allow a current flow through the phase coils 134. In contrast, when the FETs 430, 434 are open (or OFF), the FETs 430, 434 prevent a current flow through the phase coils 134. The FETs 430, 434 are characterized by a relatively high drain-source breakdown voltage (e.g., between 120 V to 210 V), a relatively high continuous drain current (e.g., between 50 A to 90 A), a relatively high pulsed drain current (e.g., over 300 A), and a drain-source on-state resistance ($R_{DS(on)}$ between 3 milliohms (mΩ) and 15 mΩ.

In contrast, FETs used in existing power tools were not rated for such high voltage and current characteristics. Accordingly, existing power tools would not be capable of handling such high current and voltage characteristics.

The gate drivers 426 provide a gate voltage to the FETs 430, 434 to control the FETs 430, 434 to open or close. The gate drivers 426 receive an operating power supply (e.g., a low-voltage power supply) from the battery pack 18. The gate drivers 426 also receive control signals, one each for the high-side current path and the low-side current path, from the second controller 406. The gate drivers 426 provide a control gate voltage (e.g., from the low-voltage power supply) to the FETs 430, 434 based on the control signals received from the second controller 406.

In some embodiments, the second controller 406 and the gate drivers 426 may control only the low-side FETs 434 to operate the motor 34. In other embodiments, the second controller 406 and the gate drivers 426 may control only the high-side FETs 430 to operate the motor 34. In yet other embodiments, the second controller 406 and the gate driver 426 alternate between controlling the high-side FETs 430 and the low-side FETs 434 to operate the motor 34 and to distribute the thermal load between the FETs 430, 434.

In some embodiments, the inverter bridge 410 may also include a current sensor (not shown) provided in the current path to detect a current flowing to the motor. The output of the current sensor is provided to the second controller 406. The second controller 406 may control the motor 34 further based on the output of the current sensor.

With reference to FIG. 28, a discharge switch 438 is provided on a current path between the power terminals and the inverter bridge 410 of the combination 10. The discharge switch 438 may be implemented using, for example, a metal-oxide-semiconductor field effect transistor (MOS-FET). When the discharge switch 438 is open, current flow is stopped between the power terminals and the inverter bridge 410. When the discharge switch 42 is closed, current flow resumes between the power terminals and the inverter bridge 410.

A discharge controller 442 controls the discharge switch 438 (that is, opens and closes the discharge switch 438). The discharge controller 442 may be a logic circuit, a hardware implemented state machine, an electronic processor, etc. The discharge controller 442 receives inputs from the first controller 402, the second controller 406, and the trigger and provides a control signal to the discharge switch 438. The discharge controller 442 may also provide a status indication to the first controller 402 indicating whether the discharge switch 438 is open on closed.

Several techniques may be contemplated to implement a discharge control scheme of the power tool 10 using the discharge switch 438. In one example, the discharge controller 442 may be an AND gate that implements a voting system with inputs from the first controller 402, the second controller 406, and the trigger assembly 414. The discharge controller 442 may close the discharge switch 438 only when the trigger, the first controller 402, and the second controller 406 provide controls signals to close the discharge switch 438.

In some embodiments, it may be desirable to close the discharge switch 438 to operate the motor 34 when the trigger is operated and the first controller 402 and the second controller 406 are ready for the operation. In these embodiments, the discharge controller 442 may close the discharge switch 438 only when the discharge controller 442 receives a signal to close the discharge switch 438 from the trigger, the first controller 402, and the second controller 406. Accordingly, when one of first controller 402 and the second controller 406 generates an interrupt due to detecting a problem, or when the trigger is released, the discharge controller 442 opens the discharge switch 438 to prevent current flow to the inverter bridge 410. In some embodiments, when the first controller 402 or the second controller 406 detects an overvoltage condition, an overcurrent condition, an overheating condition, etc., the first controller 402 or the second controller 406 may generate or terminate a signal to the discharge controller 442 to open the discharge switch 438.

Figure 30:
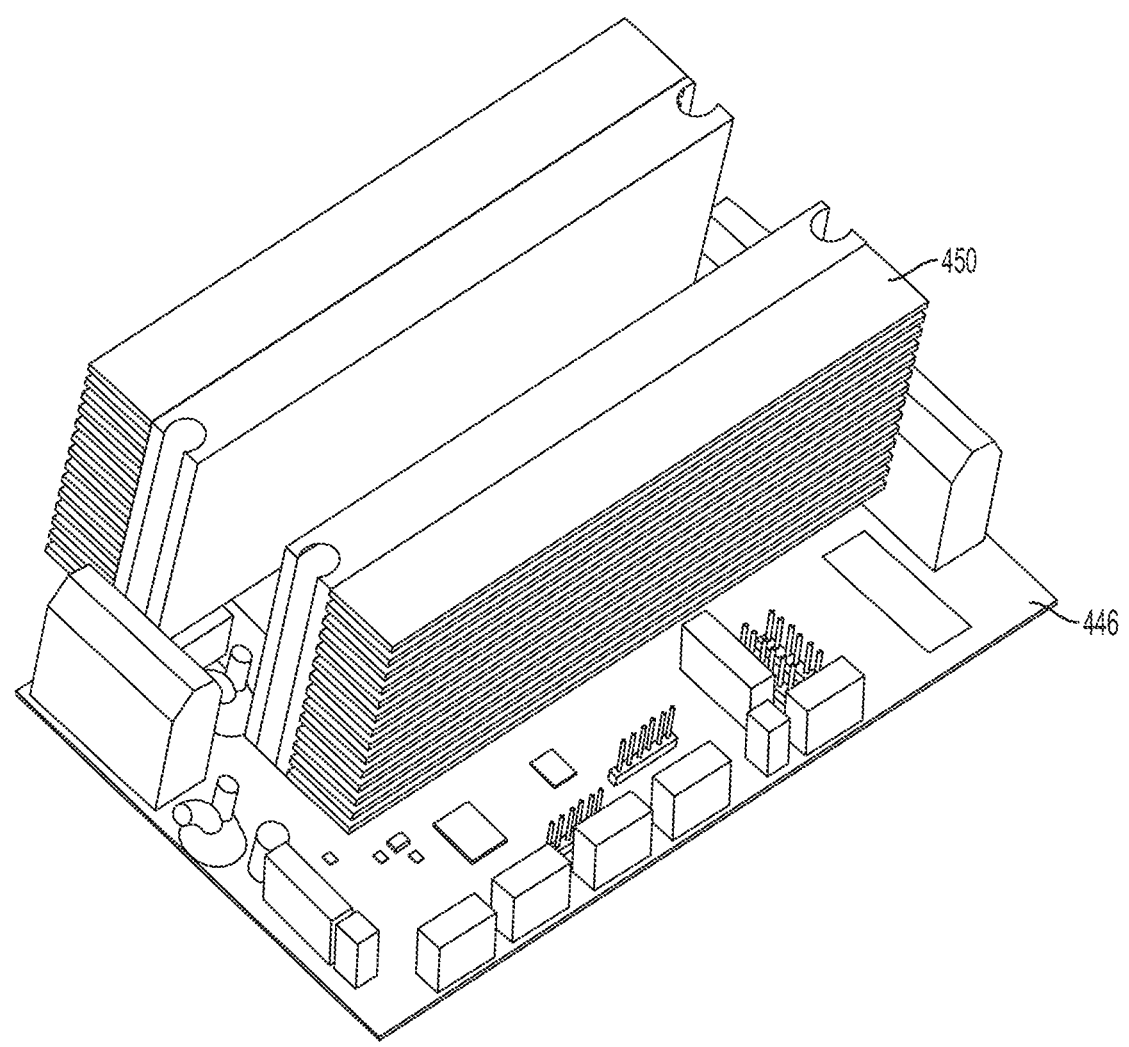
FIG. 30 is a perspective view of a printed circuit board of the power tool of FIG. 1.

FIG. 30 illustrates a printed circuit board (PCB) assembly 446 of the power tool 10 that includes the electronics assembly 22. A heat sink 450 is provided on the PCB assembly 446 to absorb any heat dissipated by the electronics assembly 22.

The first controller 402, the second controller 406, the inverter bridge 410, the discharge controller 442 define power electronics of the combination 10. The power electronics may be distributed within the device housing. Put together, the power electronics define a length within a range of approximately 120 mm to approximately 220 mm, a width within a range of approximately 65 mm to approximately 120 mm, and a height within a range of approximately 35 mm to approximately 65 mm. Put together, the power electronics have an area within the range of approximately 7,800 mm$^2$ to approximately 26,400 mm$^2$ and a volume within the range of approximately 273,000 mm$^3$ to approximately 1,716,000 mm$^3$.

Figure 31:
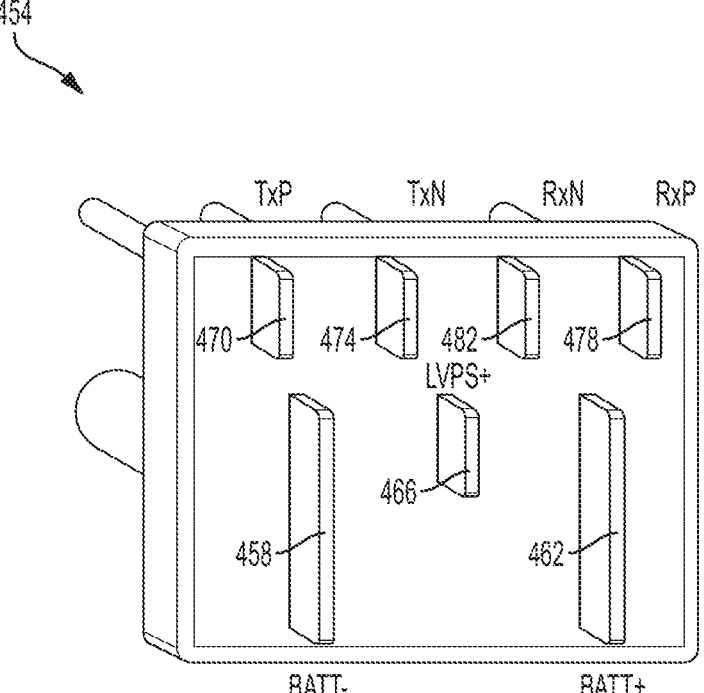
FIG. 31 is a plan view of a terminal block of the power tool of FIG. 1.

With reference to FIG. 31, a tool terminal block 454 includes a positive power terminal 458, a ground terminal 462, a low-power terminal 466, a positive transmission terminal 470, a negative transmission terminal 474, a positive receiver terminal 478, and a negative receiver terminal 482. The positive power terminal 458 and the ground terminal 462 are connected to power terminals (i.e., a positive battery terminal and a ground terminal) of the battery pack 18 to receive a main discharging current for the operation of the combination 10. The low-power terminal 466 receives a low-power voltage supply from a low-power terminal of the battery pack 18 to power certain functions of the tool. A similar terminal arrangement is described and illustrated in U.S. Provisional Patent Application No. 62/475,951, filed Mar. 24, 2017, and in U.S. patent application Ser. No. 15/934,798, filed Mar. 23, 2018, the entire contents of both of which are hereby incorporated by reference.

The positive transmission terminal 470, the negative transmission terminal 474, the positive receiver terminal 478, the negative receiver terminal 482 may together be referred to as "communication terminals" of the combination 10. The communication terminals allow for differential communication between the battery pack 18 and the power tool 14. In other embodiments, the tool communication terminals follow a full-duplex standard (for example, RS485 standard).

Referring back to FIG. 28, the positive power terminal 458 and the ground terminal 462 are electrically coupled to the inverter bridge 410 and provide a current path to operate the motor 34. The communication terminal (i.e., the positive transmission terminal 470, the negative transmission terminal 474, the positive receiver terminal 478, and the negative receiver terminal 470) may be coupled to first controller 402, for example, through a power tool transceiver (not shown). The communication terminal provides the communication link 422 between the first controller 402 and a battery pack controller.

Figure 74:
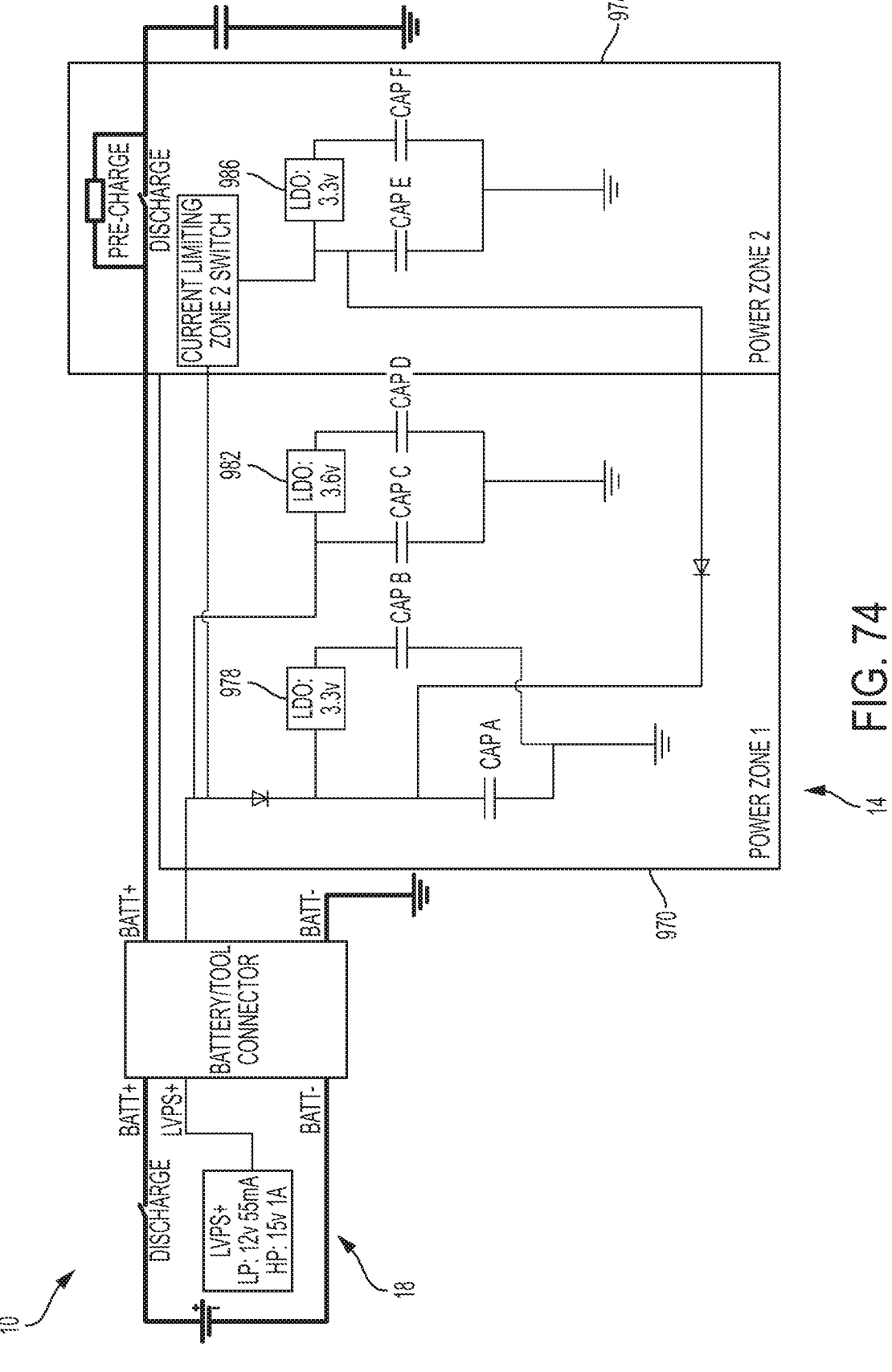
FIG. 74 is a simplified schematic of power zones within the electrical combination of FIG. 1.

FIG. 74 illustrates a simplified schematic of power zones of the high power DC tool system 14. The high power DC tool system 14 includes, for example, a first power zone 970 and a second power zone 974.

The first power zone 970 may be an idle power zone including a first low-dropout (LDO) regulator 978, a second LDO regulator 982, and a first plurality of capacitors. The first LDO regulator 978, the second LDO regulator 982, and the first plurality of capacitors provide power supply to components in the first power zone 970. The first power zone 970 may include only components that generally need to be always on. For example, the first power zone 970 may include the first controller 402 and a Bluetooth® Low-Energy (BLE) module. The first power zone 970 has a low current rating and draws low amounts of quiescent current (Iq) during idle periods of the high power DC tool system 14.

The second power zone 974 may be an active power zone including a third LDO regulator 986 and a second plurality of capacitors. The third LDO regulator 986 and the second plurality of capacitors provide a power supply to the remaining components of the high power DC tool system 14 that are powered by the low-power voltage supply during the active periods of the high power DC tool system 14. Accordingly, the second power zone 974 may include the second controller 406, the trigger assembly 414, the user interface, etc. The second power zone 974 is focused on high performance required during the operation of the power tool. During a loss of power event, the first power zone may be powered by the second plurality of capacitors.

FIGS. 32-51 illustrate several embodiments of the battery pack 18, 18A. The battery pack 18 may include one or more cell strings, each having a number (e.g., 10) of battery cells connected in series to provide a desired discharge output (e.g., nominal voltage (e.g., 20 V, 40 V, 60 V, 80 V, 120 V) and current capacity). Accordingly, the battery pack 18, 18A may include "20S1P" (see FIGS. 32-41), "20S2P" (see FIGS. 42-51), etc., configurations. In other embodiments, other combinations of battery cells are also possible.

Each battery cell may have a nominal voltage between 3 V and 5 V and may have a nominal capacity between 3 Ah and 5 Ah. Each battery cell has a diameter of up to about 21 mm and a length of up to about 71 mm. The battery cells may be any rechargeable battery cell chemistry type, such as, for example, lithium (Li), lithium-ion (Li-ion), other lithium-based chemistry, nickel-cadmium (NiCd), nickel-metal hydride (NiMH), etc.

With reference to FIGS. 32-41, a battery pack 18 having a 20S1P configuration is illustrated in accordance with some embodiments. The battery pack 18 includes a battery pack housing 486 with a support portion 490 and a battery terminal block 494. The battery pack housing 486 encloses components of the battery pack 18 including the battery cells, a battery controller, etc. The support portion 490 provides a slide-on arrangement with a projection/recess 498 cooperating with a complementary projection/recess 492 (shown in FIG. 73) of the combination 10.

Figure 34:
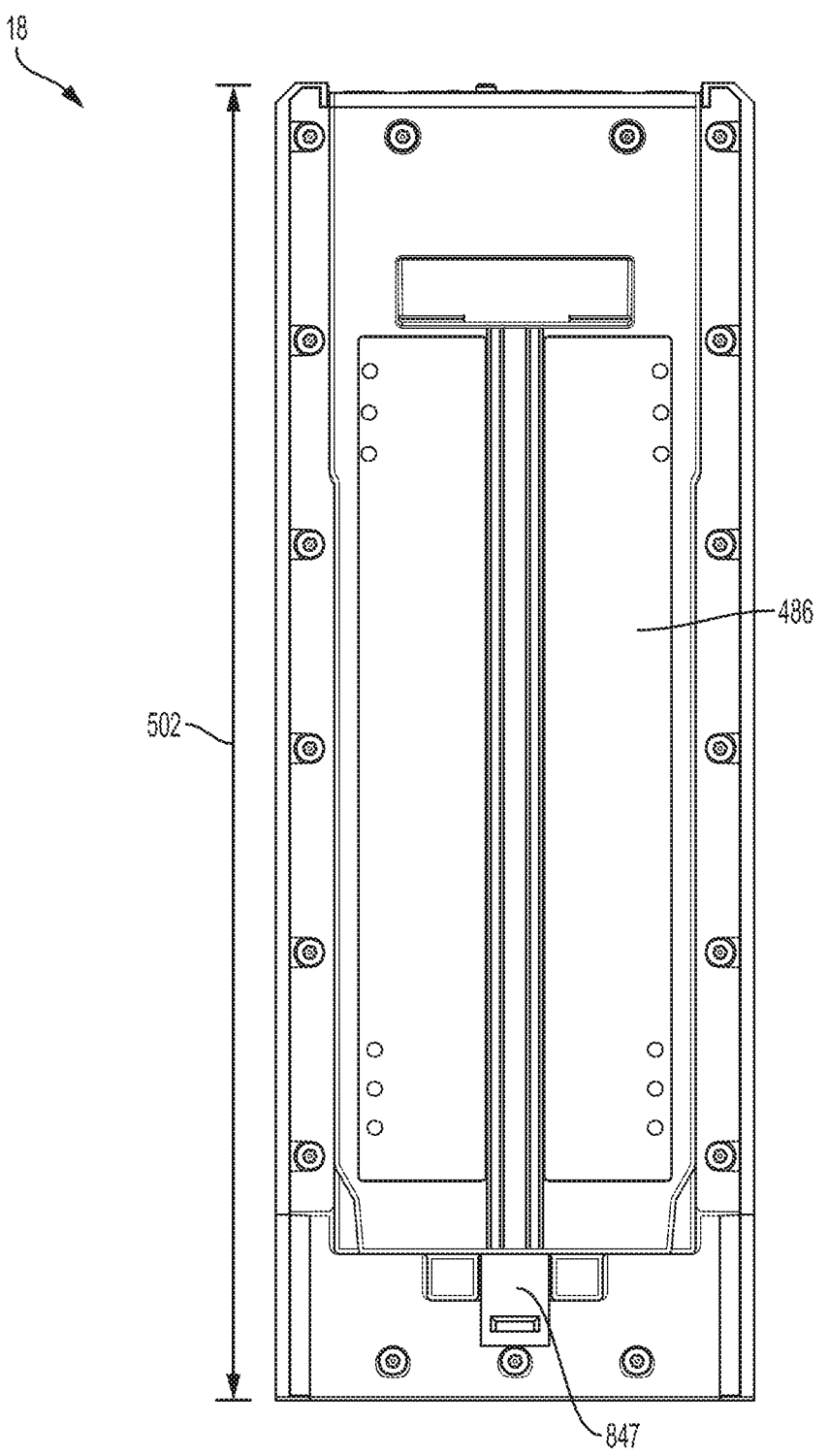
FIG. 34 is a top plan view of the battery pack of FIG. 32.
Figure 35:
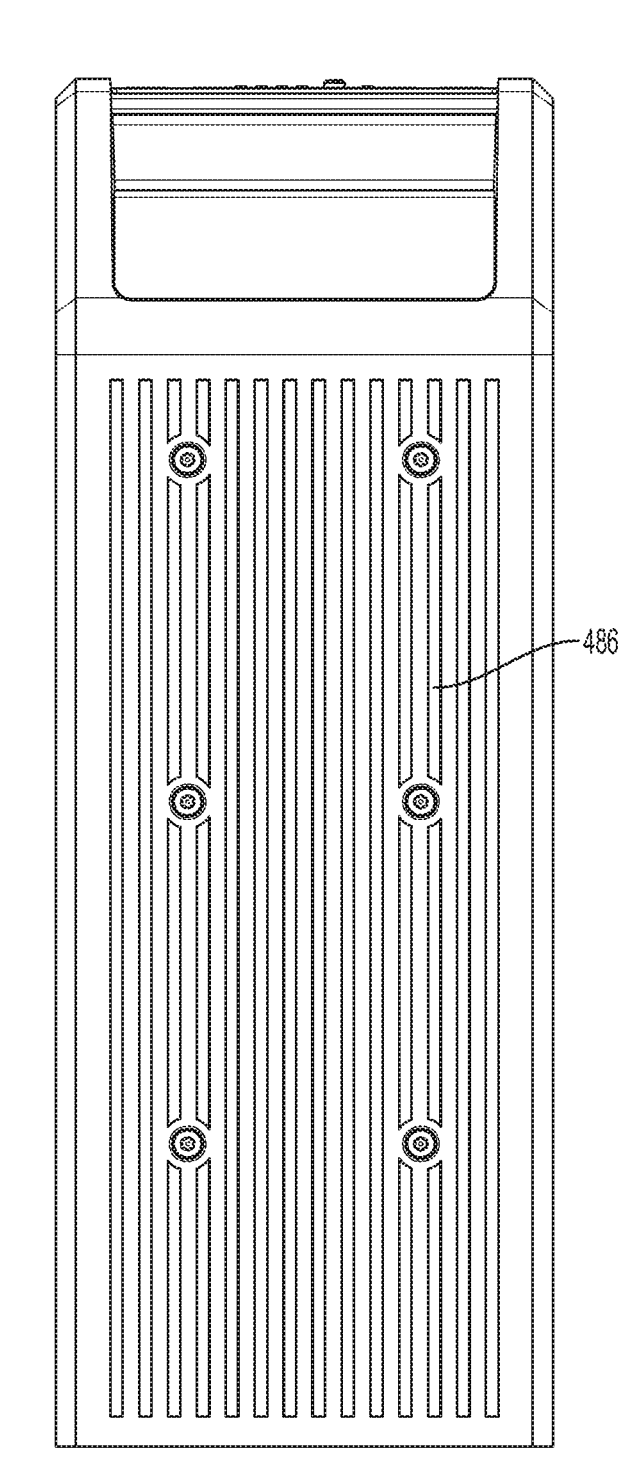
FIG. 35 is a bottom plan view of the battery pack of FIG. 32.
Figure 36:
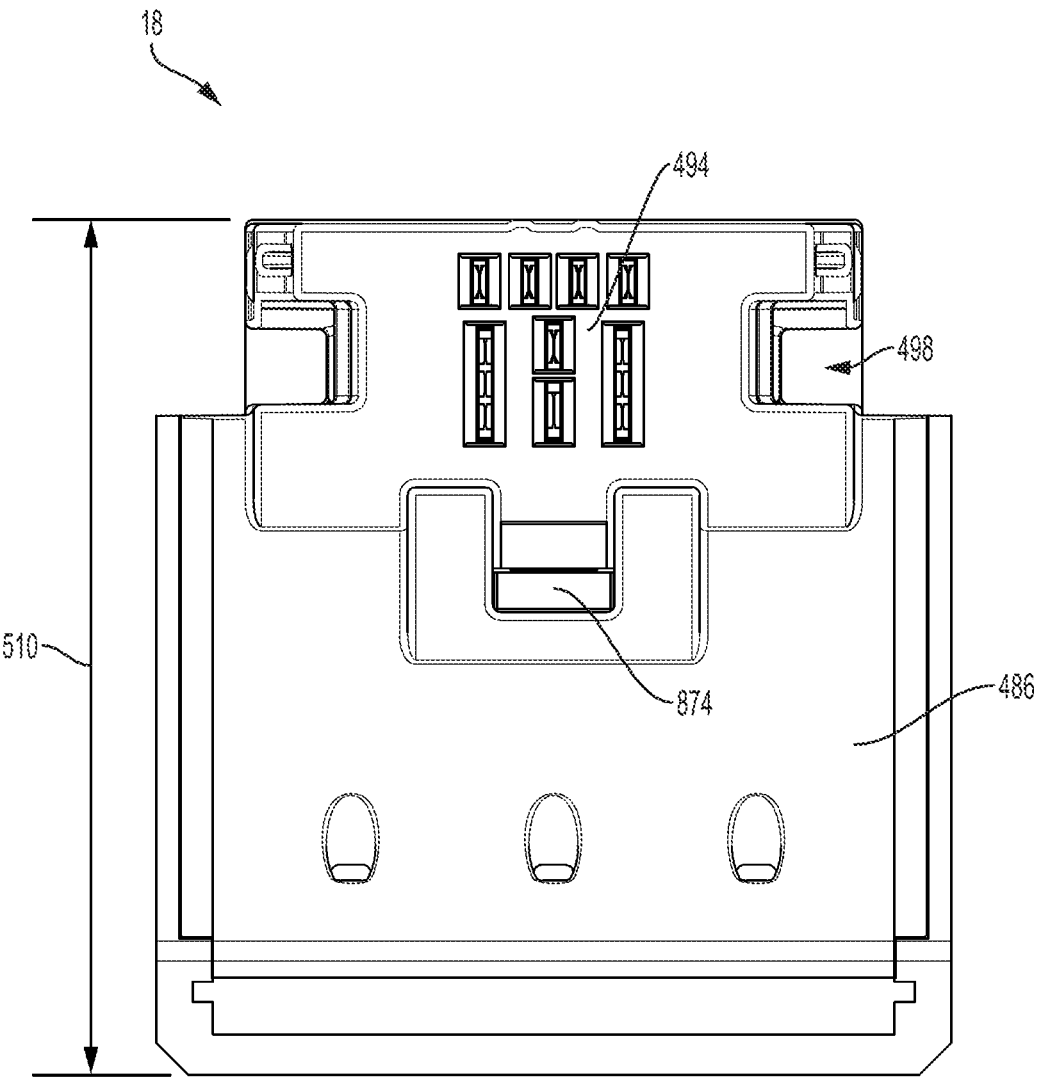
FIG. 36 is a front plan view of the battery pack of FIG. 32.
Figure 37:
FIG. 37 is a rear plan view of the battery pack of FIG. 32.
Figure 37:
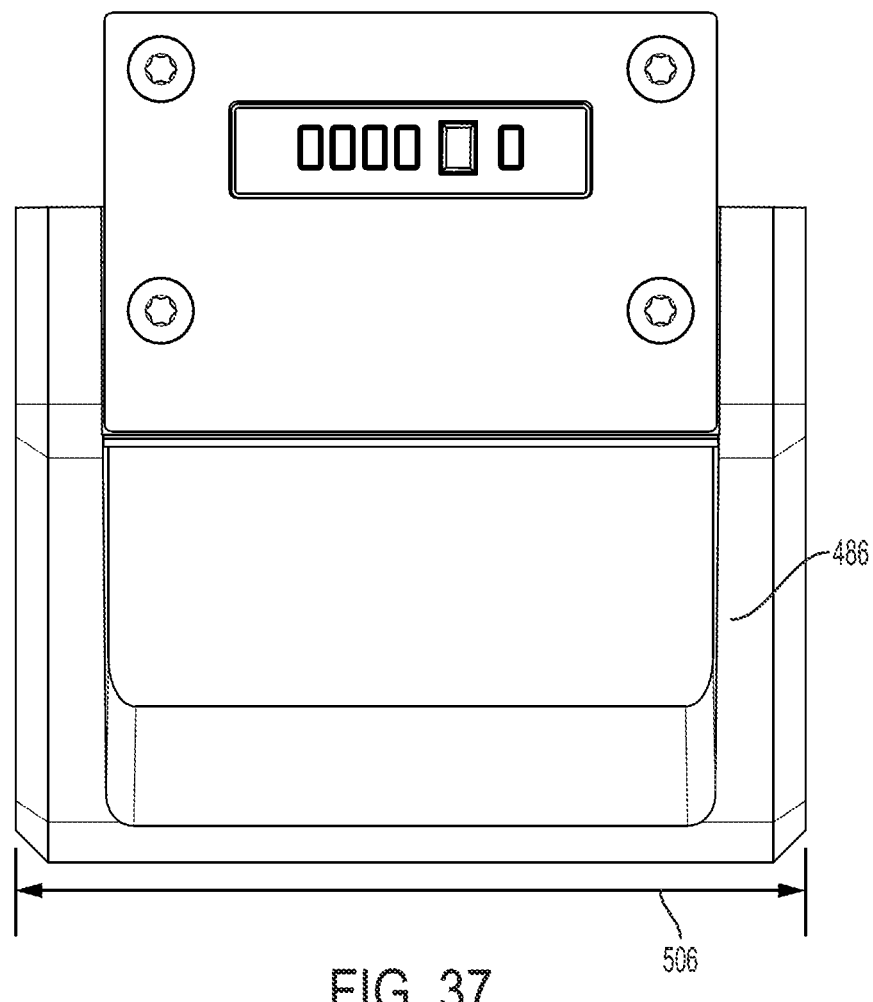
Figure 38:
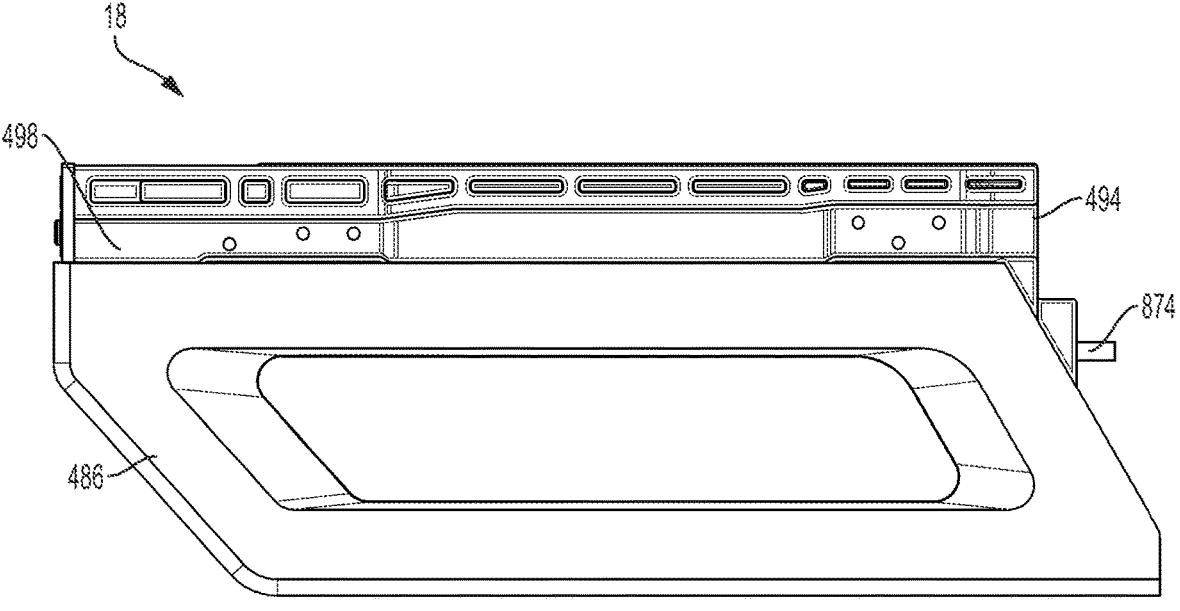
FIG. 38 is a side plan view of the battery pack of FIG. 32.
Figure 39:
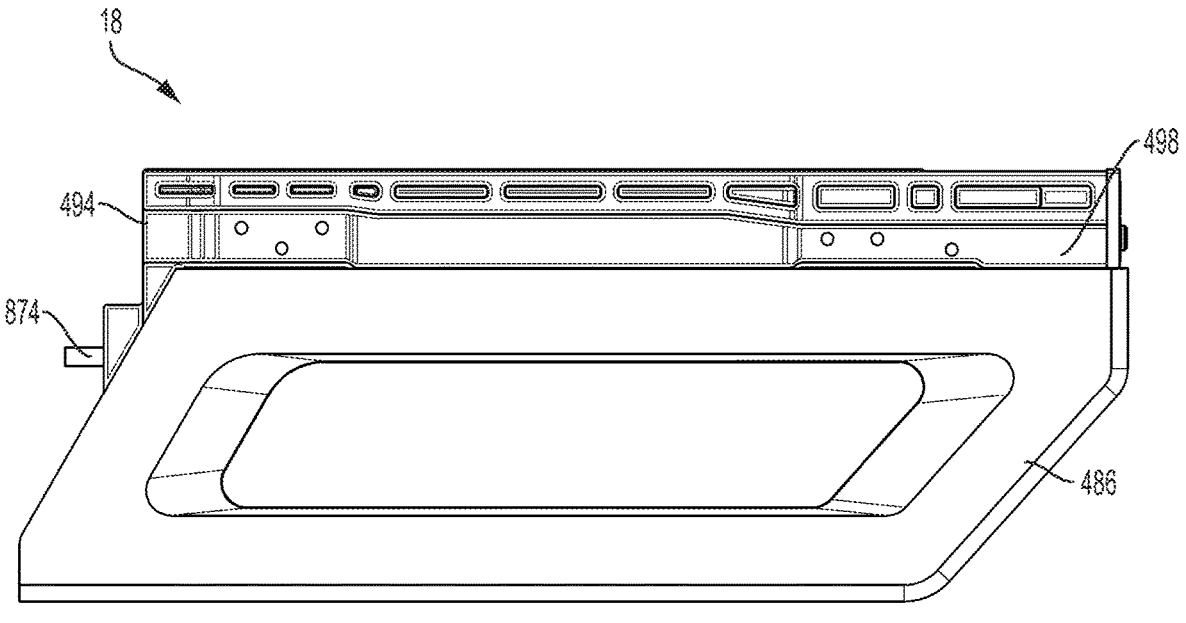
FIG. 39 is a side plan view of the battery pack of FIG. 32.
Figure 40:
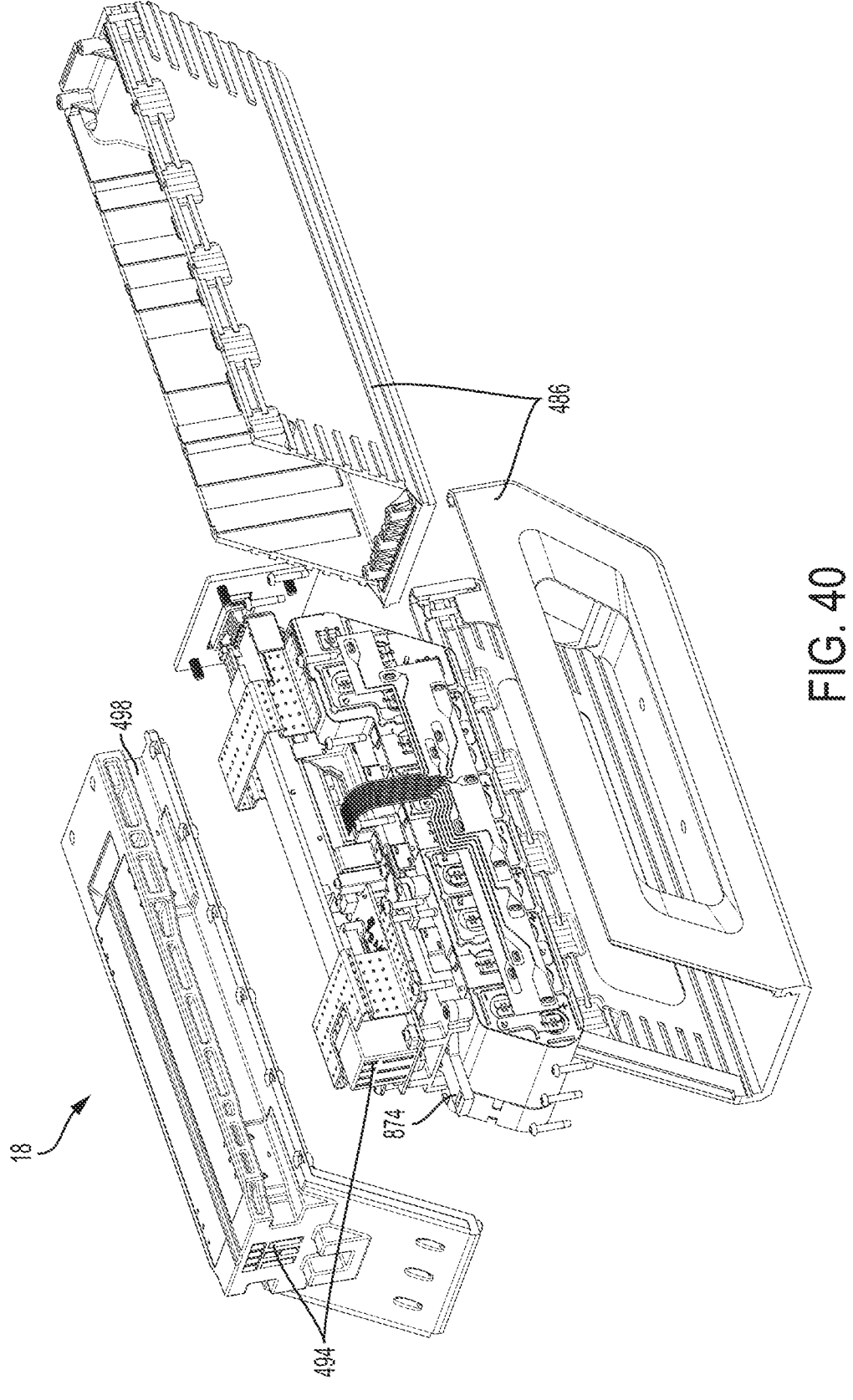
FIG. 40 is an exploded view of the battery pack of FIG. 32.
Figure 41:
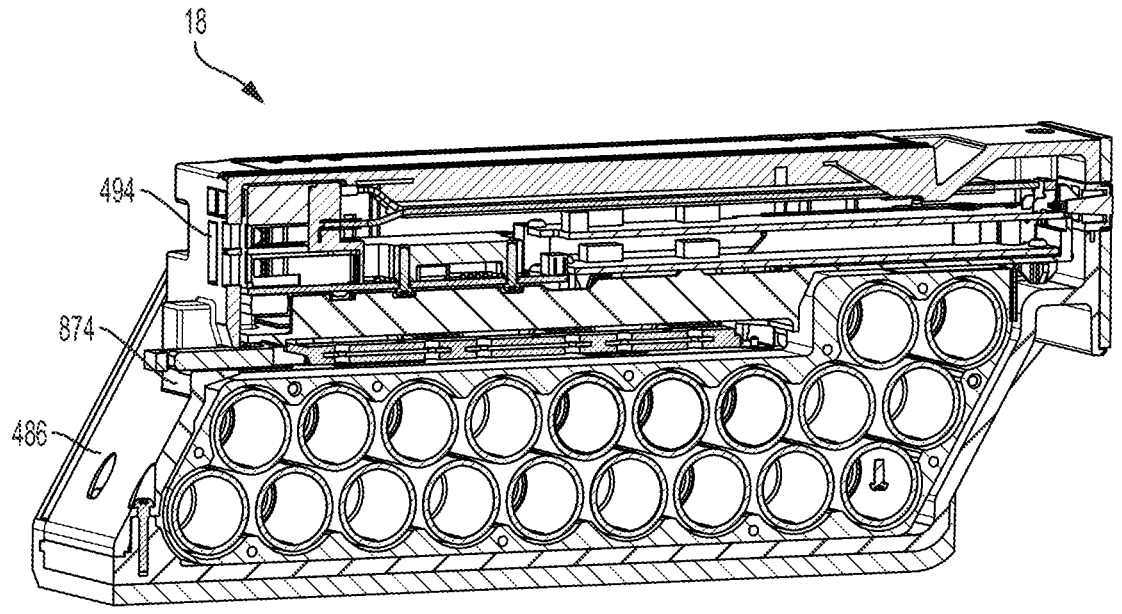
FIG. 41 is a cross-sectional view of the battery pack of FIG. 32.

With reference to FIG. 34, the battery pack 18 defines a length 502 within a range of approximately 260 mm to approximately 280 mm. In some embodiments, the length 502 is approximately 270 mm. With reference to FIG. 37, the battery pack 18 defines a width 506 within a range of approximately 90 mm to approximately 110 mm. In some embodiments, the width 506 is approximately 100 mm. With reference to FIG. 36, the battery pack 18 defines a height 510 within a range of approximately 96 mm to approximately 116 mm. In some embodiments, the height 510 is approximately 106 mm. The total weight of the battery pack 18 is within a range of approximately 5.5 lbs. to 6.5 lbs. In some embodiments, the total weight of the battery pack 18 is approximately 6 lbs.

With reference to FIGS. 32-41, the battery pack 18 has an AC internal resistance (ACIR) within a range of approximately 150 mΩ to approximately 160 mΩ. The battery pack 18 has a DC internal resistance within a range of approximately 220 mΩ to approximately 260 mΩ.

Figure 51:
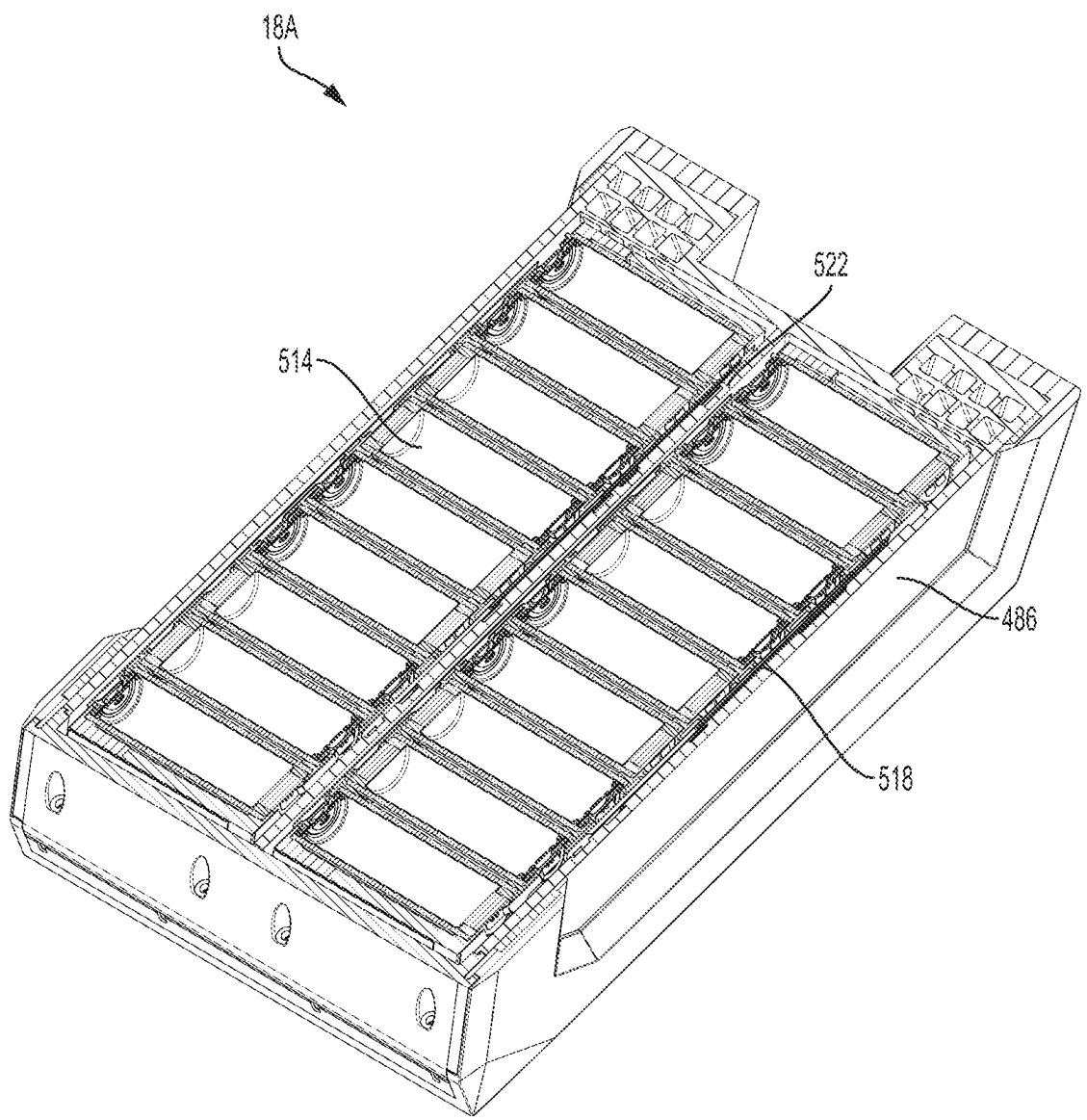
FIG. 51 is a cross-sectional view of the battery pack of FIG. 42.

With reference to FIGS. 42-51, a battery pack 18A having a 20S2P configuration is illustrated in accordance with some embodiments. The battery pack 18A includes two cell strings of twenty series connected cells, the cell strings being connected in parallel. FIG. 51 is a cross-section of the battery pack 18A and illustrates a first cell string 514 and a second cell string 518 separated by a partition 522 of the battery pack housing 486.

Figure 44:
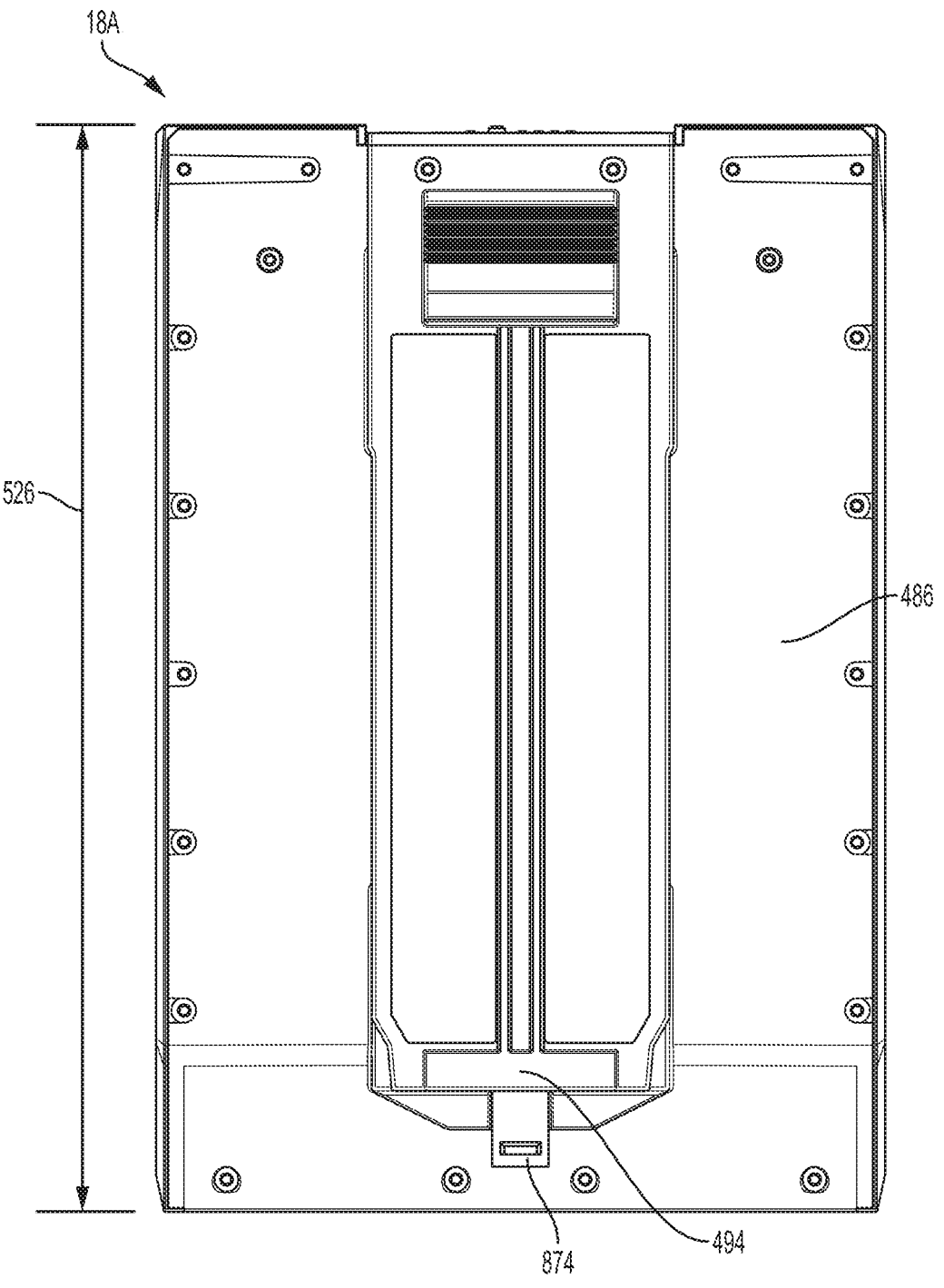
FIG. 44 is a top plan view of the battery pack of FIG. 42.
Figure 45:
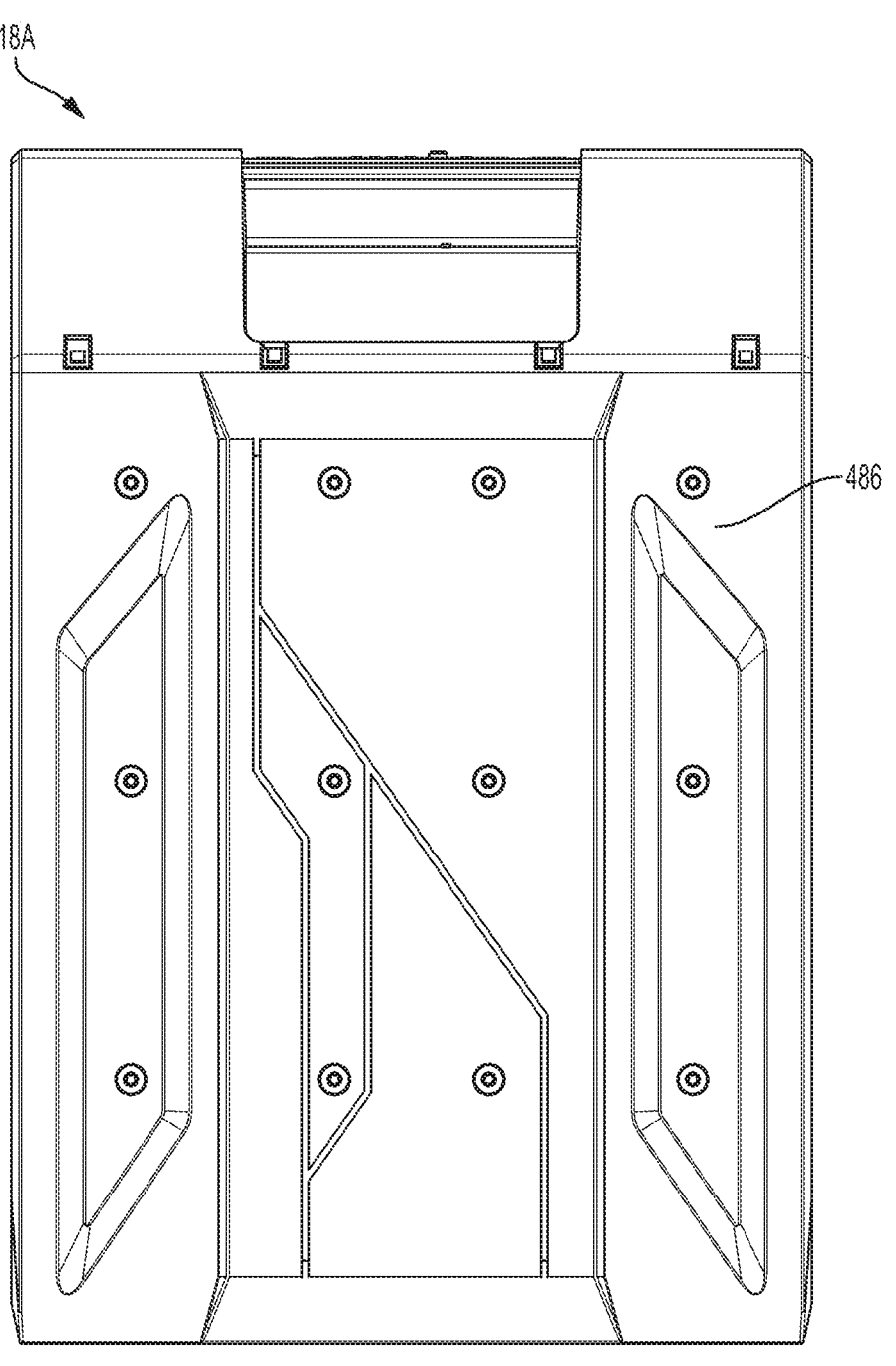
FIG. 45 is a bottom plan view of the battery pack of FIG. 42.
Figure 46:
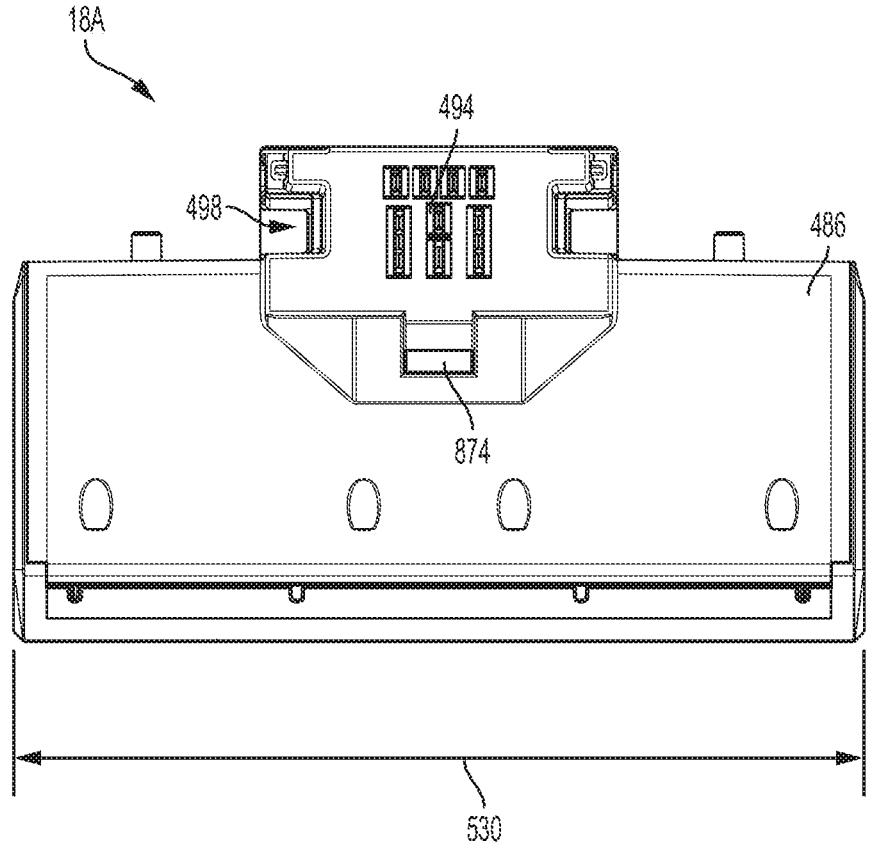
FIG. 46 is a front plan view of the battery pack of FIG. 42.
Figure 47:
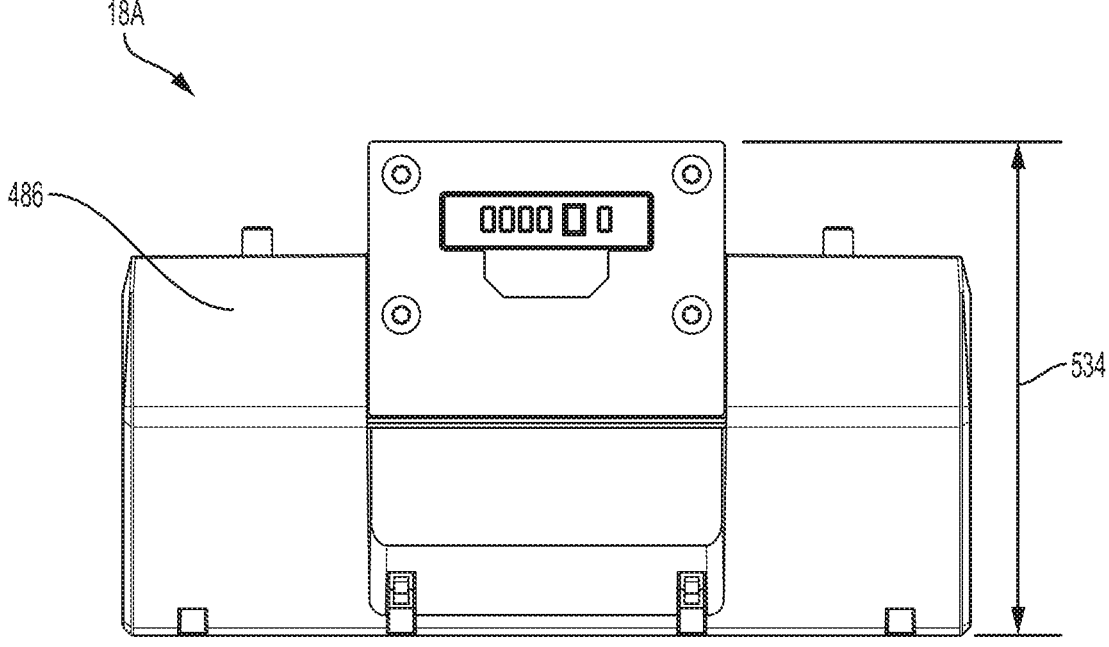
FIG. 47 is a rear plan view of the battery pack of FIG. 42.
Figure 48:
FIG. 48 is a side plan view of the battery pack of FIG. 42.
Figure 48:
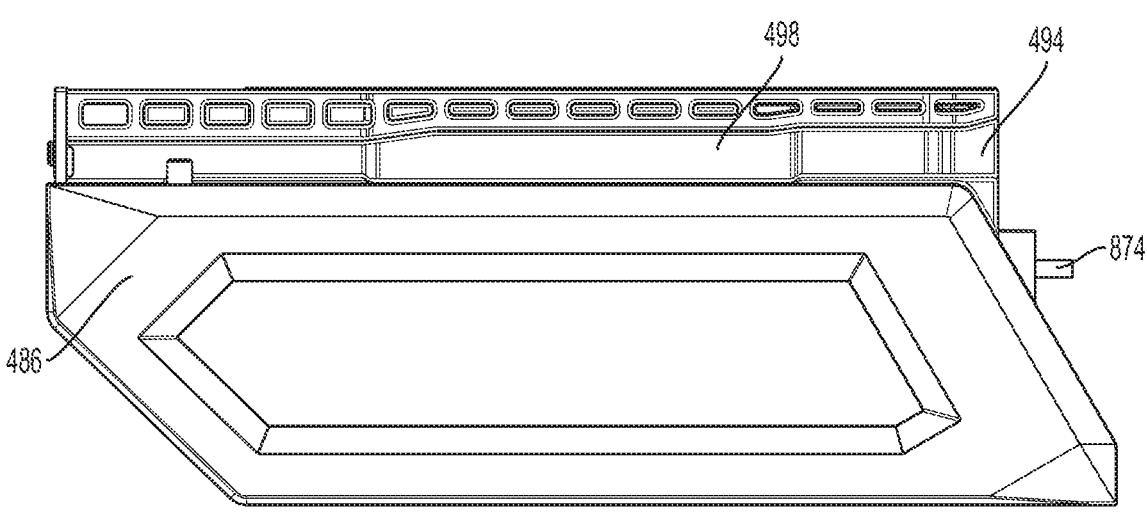
Figure 49:
FIG. 49 is a side plan view of the battery pack of FIG. 42.
Figure 49:
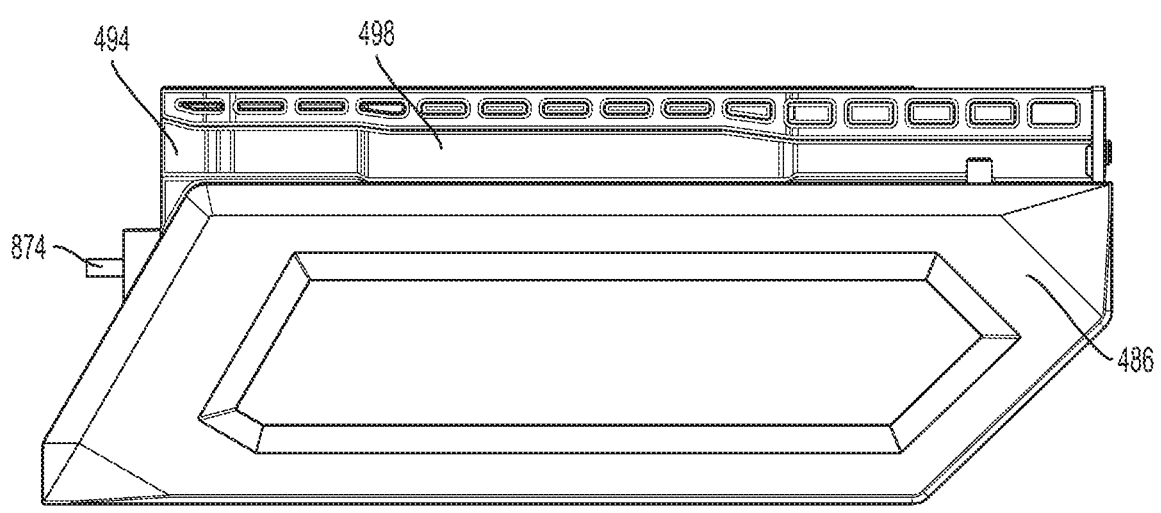
Figure 50:
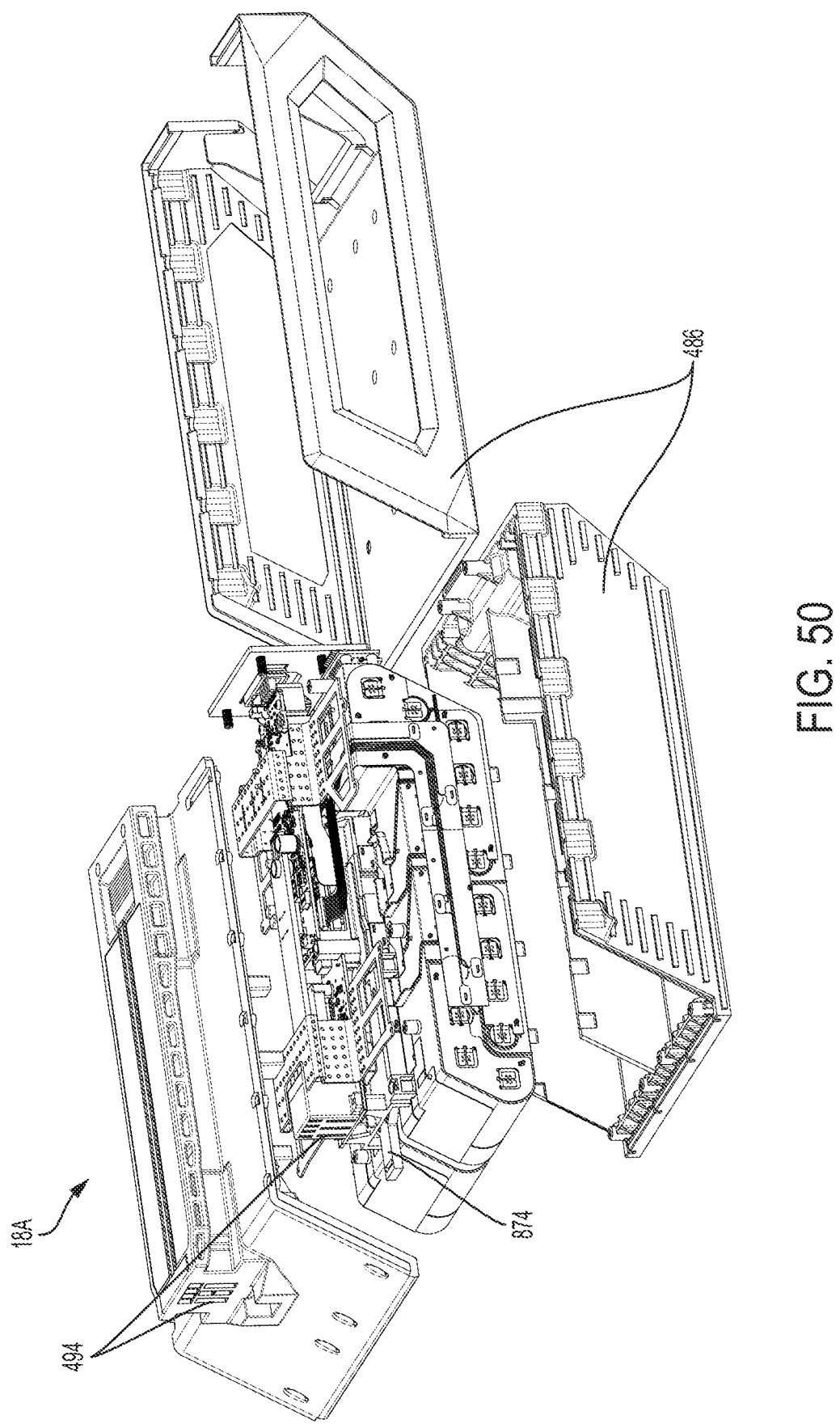
FIG. 50 is an exploded view of the battery pack of FIG. 42.

With reference to FIG. 44, the battery pack 18A defines a length 526 within a range of approximately 260 mm to approximately 280 mm. In some embodiments, the length 526 is approximately 270 mm. With reference to FIG. 46, the battery pack 18A defines a width 530 within a range of approximately 171 mm to approximately 191 mm. In some embodiments, the width 530 is approximately 181 mm. With reference to FIG. 47, the battery pack 18A defines a height 534 within a range of approximately 96 mm to approximately 116 mm. In some embodiments, the height 534 is approximately 106 mm. The total weight of the battery pack 18A is within a range of approximately 10.25 lbs. to 11.25 lbs. In some embodiments, the total weight of the battery pack 18A is approximately 10.75 lbs.

With reference to FIGS. 42-51, the battery pack 18A has an AC internal resistance (ACIR) within a range of approximately 75 mΩ to approximately 80 mΩ. The battery pack 18A has a DC internal resistance within a range of approximately 130 mΩ to approximately 170 mΩ.

Figure 52:
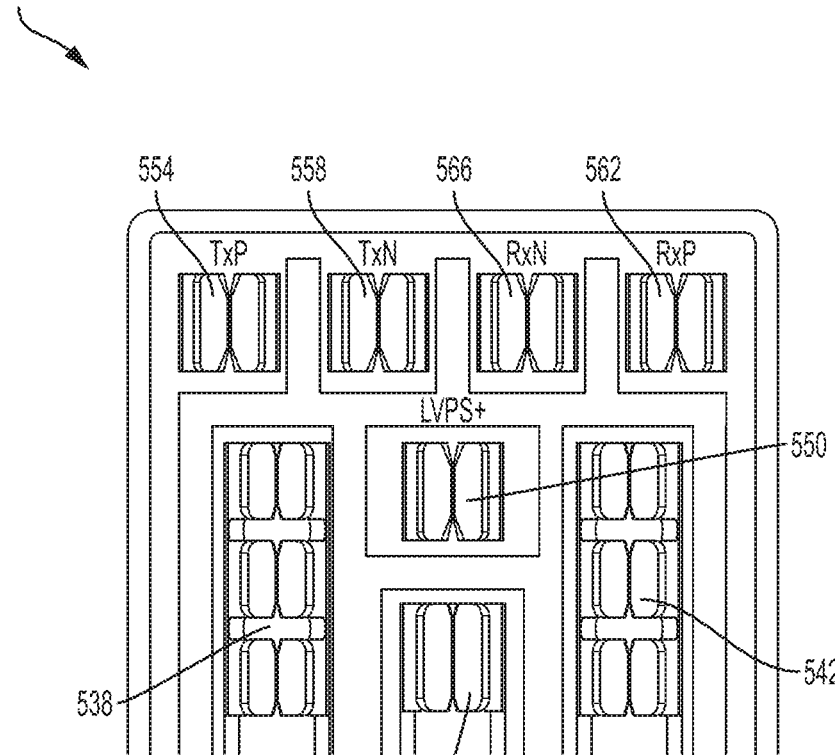
FIG. 52 is a plan view of a terminal block of the battery pack of FIG. 1.

With reference to FIG. 52, the battery terminal block 494 is operable to electrically connect the battery pack 18 and the power tool 14 and, as illustrated, includes a positive battery terminal 538, a ground terminal 542, a charger terminal 546, a low-power terminal 550, a positive transmission terminal 554, a negative transmission terminal 558, a positive receiver terminal 562, and a negative receiver terminal 566. The positive battery terminal 538 and the ground terminal 542 are connectable to power terminals (i.e., positive power terminal 458 and ground terminal 462) of the power tool 14, and provide a main discharging current for the operation of the power tool 14. The charger terminal 546 and the ground terminal 542 are connected to charging terminals of a charger and receive charging current to charge the battery cells of the battery pack 18. In some embodiments, the battery pack terminals 538, 542 may be made of F-Tec material (a copper, phosphorus material) to offer better thermal distribution capabilities and durability.

The ground terminal 542 may form a common reference between the battery pack 18 and the power tool 14. The low-power terminal 550 provides a low-power voltage supply to the power tool 14 to power certain functions of the power tool 14. For example, the low-power voltage supply may be used to power the first controller 402, the second controller 406, the gate drivers 426, indicators (e.g., LEDs), a communication module, etc. of the power tool 14.

The positive transmission terminal 554, the negative transmission terminal 558, the positive receiver terminal 562, and the negative receiver terminal 566 may together be referred to as "battery communication terminals" of the battery pack 18. The battery communication terminals allow for differential communication between the battery pack 18 and the power tool 10 or charger. The battery communication terminals and the communication terminals of the power tool 14 together may be referred to as the communication link 422. In other embodiments, the communication terminals follow a full-duplex standard (for example, RS485 standard).

Figure 53:
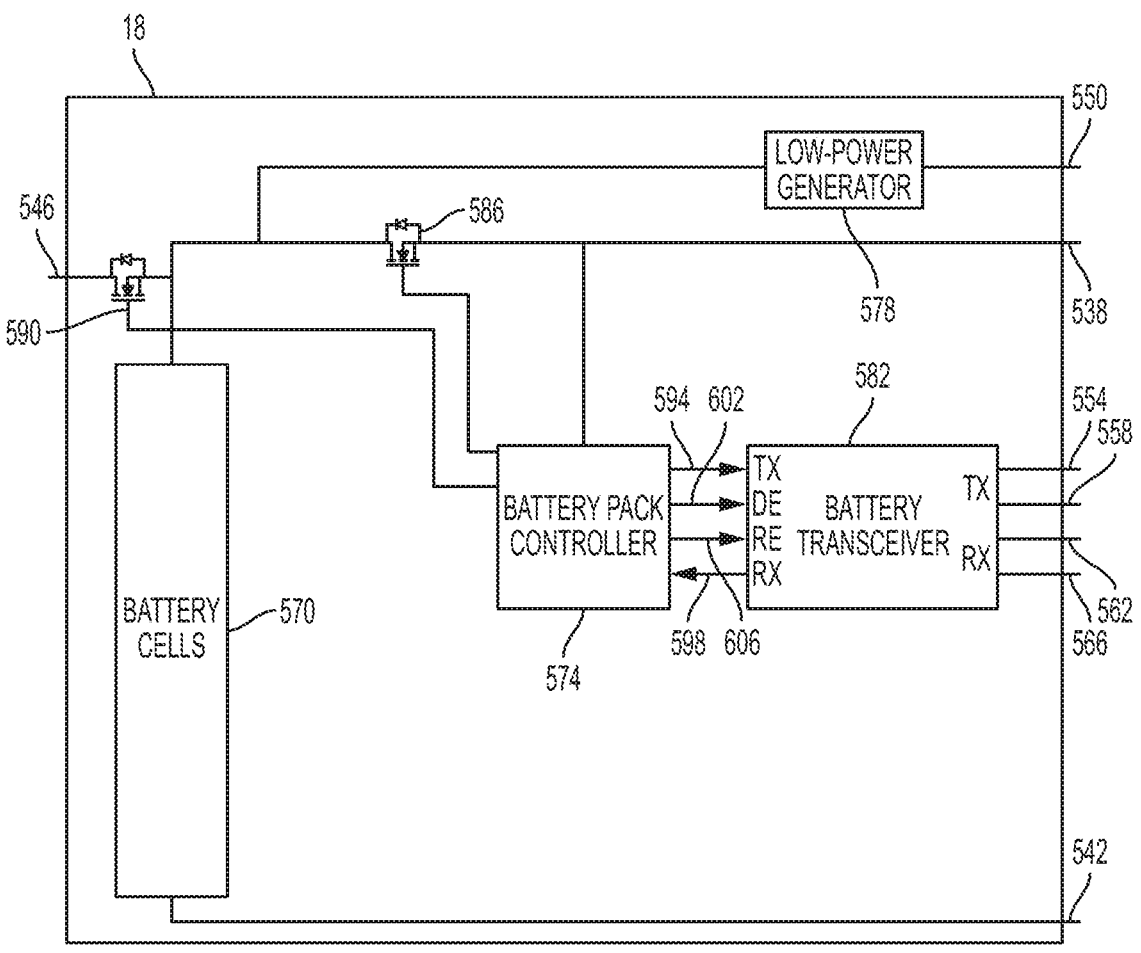
FIG. 53 is a block diagram of the battery pack of FIG. 1.

FIG. 53 is a simplified block diagram of the battery pack 18. The battery pack 18 includes the battery cells 570, a battery controller 574, a low-power generator 578, and a battery transceiver 582. The battery controller 574 may be implemented in ways similar to the first controller 402 and the second controller 406.

In some embodiments, a battery discharging switch 586 is connected between the battery cells 570 and the positive battery terminal 538. The battery controller 574 is operable to control (e.g., open and close) the discharging switch 586 to control discharge of the battery cells 570. In some embodiments, a charging switch 590 may also be connected between the battery cells 570 and the charger terminal 546. The battery controller 574 is operable to control (e.g., open and close) the charging switch 590 to control charging of the battery cells 570. In some embodiments, when the discharging switch 586 and the charging switch 590 are implemented using MOSFETs, two MOSFETS, in series, may be used as the discharging switch 586 and the charging switch 590. This allows the discharging switch 586 and the charging switch 590 to prevent any current flow in either direction when the discharging switch 586 and the charging switch 590 are open.

The discharging switch 586 and the charging switch 590 may be implemented using bi-polar junction transistors, field-effect transistors (FETs), etc. In some embodiments (not shown), the discharging switch 586 and the charging switch 590 may be connected on the ground-side of the battery cells 570 between the battery cells 570 and the ground terminal 542. In some embodiments (not shown), the ground terminal 542 may be split into a charging path ground terminal and a discharging path ground terminal.

The low-power generator 578 is connected between the battery cells 570 and the low-power terminal 550. The low-power generator 578 provides a low-power voltage supply at the low-power terminal 550 to the power tool 14. In some embodiments, the battery controller 574 may provide control signals to the low-power generator 578 to control the operation of the low-power generator 578. The low-power generator 578 will be described in more detail below with reference to FIGS. 56-58.

In the illustrated example, the battery transceiver 582 is implemented as a differential communication transceiver (e.g., Texas Instruments SN65HVD7 Full Duplex RS-485 Transceiver). The battery transceiver 582 receives a transmission signal 594 from the battery controller 574 and sends a receiver signal 598 to the battery controller 574.

The battery transceiver 582 is also connected to the communication terminals (554, 558, 562, and 566). When the battery pack 18 transmits a communication signal to the power tool 14 or charger, the battery controller 574 sends the transmission signal 602 in addition to a transmission enable signal 606 to the battery transceiver 582. When the battery transceiver 582 receives the transmission enable signal 602, the battery transceiver 582 converts the transmission signal 594 to complementary transmission signals at the positive transmission terminal 554 and the negative transmission terminal 558. When the battery transceiver 582 receives a receiver enable signal 606 from the battery controller 574, the battery transceiver 582 receives complementary signals from the positive receiver terminal 562 and the negative receiver terminal 566, converts the complementary signals to a single receiver signal 598, and sends the receiver signal 598 to the battery controller 574. The power tool 14 may similarly include a power tool transceiver (not shown) that interacts with the first controller 402 in a similar way to provide communications with the battery controller 574.

In other embodiments, rather than the battery transceiver 582, the battery pack 18 may include separate transmitting and receiving components, for example, a transmitter and a receiver.

The battery controller 574 communicates with the first controller 402 through the battery terminals via the communication link 422 (e.g., an RS-485 link). The communication link 422 between the battery controller 574 and the first controller 402 may be used for battery pack 18 and power tool 14 authentication or to exchange other information (e.g., discharge capabilities of the battery pack 18). The first controller 402 and the battery controller 574 may be configured such that the first controller 402 and the battery controller 438 exchange communications at a certain time interval. The time interval may be, for example, between 3 ms to 15 ms.

The battery controller 574 and the first controller 402 exchange information as "grouped reads". "Grouped reads" include exchanging several bits of data containing information regarding different groups of measurements, states, etc. of the battery pack 18 and/or the power tool 14. The controllers 402, 574 may exchange different grouped reads containing varying types of data based on requirements of the system (e.g., of the electrical device or power tool 14).

For example, in a first group, the battery controller 574 may send simple communications, a thermistor reading, and a general conditions register to the first controller 402. Simple communications includes, for example, battery pack current, battery pack state, an "imminent shutdown" bit, and battery pack conditions. The "imminent shutdown" bit provides a true or false signal regarding whether the battery pack 18 is in a near failure state. The general conditions register includes, for example, errors and warnings concerning temperature, state of charge, etc.

In a second group, the battery controller 574 may send simple communications, a general conditions register, a battery pack voltage, a battery pack voltage post discharge switch 438, and daughterboard information. The daughterboard information may include information concerning communication states, communication retries, and board interface retries between the controllers 402, 574 or between the controller 402, 574, and any attached daughterboard.

In a third group, the battery controller 574 may send simple communications, a general conditions register, and a dynamic load request. The dynamic load request includes, for example, a target current, diagnostics information, and voltage and current information. The target current is the amount of current the battery pack 18 can currently support. The voltage and current information may include voltage and current in a different format than that provided in the simple communications. Additional performance indicators can also be exchanged between the controllers 402, 574.

Figure 54:
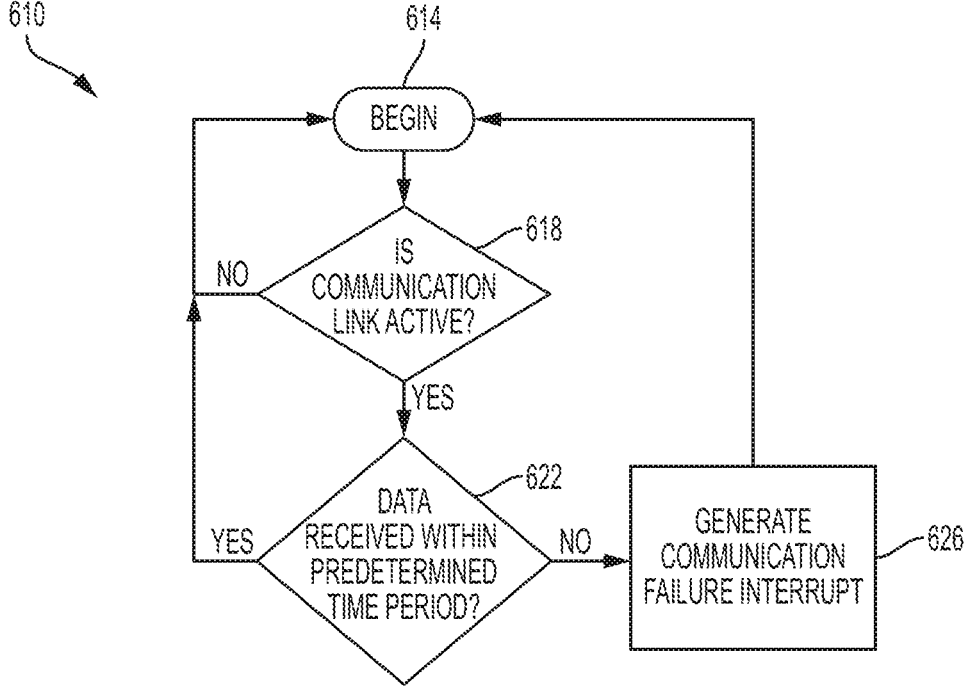
FIG. 54 is a flowchart of a method of communication protocol in accordance with some embodiments.

FIG. 54 is a flowchart illustrating one example method 610 of communication protocol implemented by the battery controller 574, the first controller 402, and/or the second controller 406. The method 610 begins at block 614 and determines whether the communication link 422 is active (at block 618). The communication link 422 is active when the battery pack 18 is coupled to the power tool 14 and when the power tool 14 is not in an idle state. The communication link 422 is inactive when the battery pack 18 is detached from the power tool 14 or when the power tool 14 is idle. When the communication link 422 is inactive, the battery controller 574 continues to check the status of the communication link 422 after every time period, for example, every 4 ms.

When the communication link 422 is active, the battery controller 574 and/or the first controller 402 determines whether any data (for example, a grouped read) was received within a predetermined time period (at block 622). For example, the battery controller 574 determines whether any data was received within the last 10 ms. When the battery controller 574 and/or the first controller 402 determines that no data was received within the last 10 ms, the battery controller 574 and/or the first controller 402 generate a communication failure interrupt (at block 626). When the communication failure interrupt is generated, the battery controller 574 and/or the first controller 402 cease the functions of the battery pack 18 and the power tool 10 respectively. The method 610 continues to check whether the communication link 422 is active and whether data is received within the time period when the communication link 422 is active.

Figure 55:
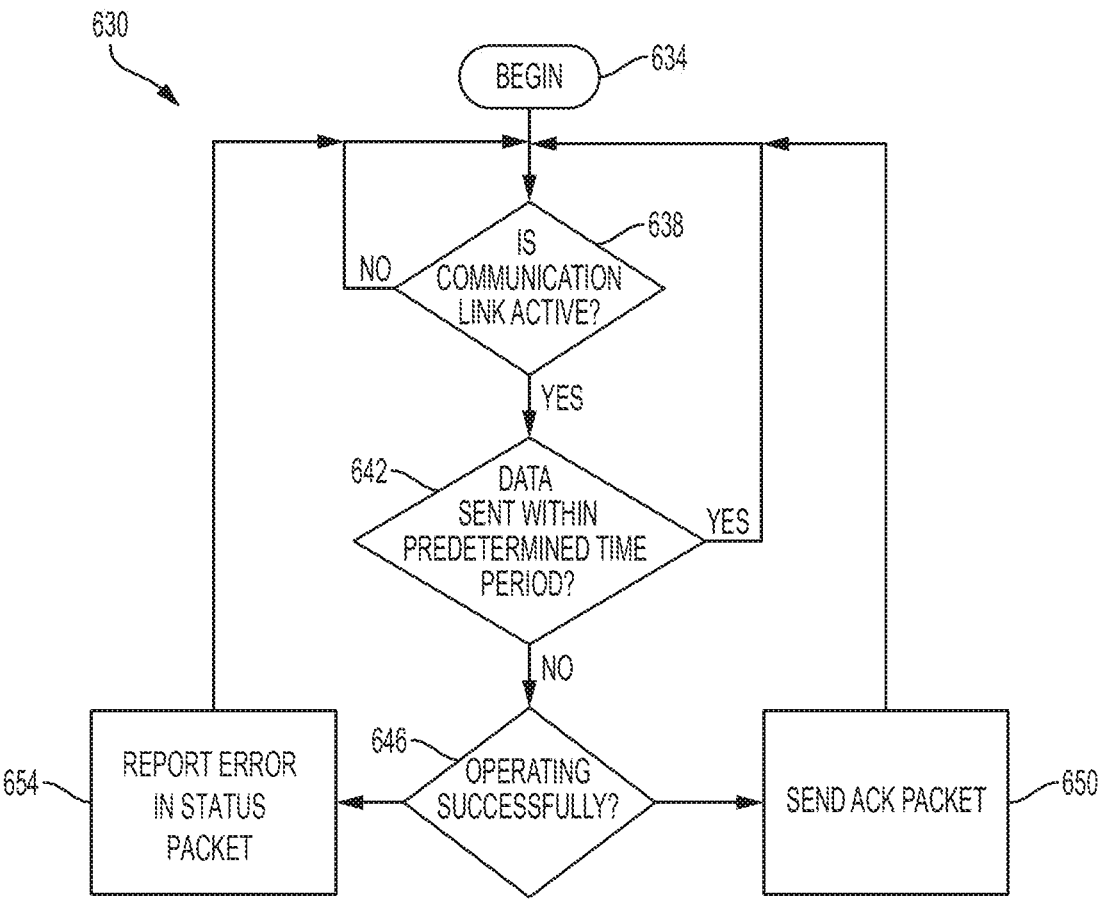
FIG. 55 is a flowchart of a method of communication protocol in accordance with some embodiments.

FIG. 55 is a flowchart illustrating one example method 630 of communication protocol implemented by the battery controller 574, the first controller 402, and/or the second controller 406. The method 630 begins at block 634 and determines whether the communication link 422 is active (at block 638). The communication link 422 is active when the battery pack 18 is coupled to the power tool 14 and when the power tool 14 is not in an idle state. The communication link 422 is inactive when the battery pack 18 is detached from the power tool or when the power tool 14 is idle.

When the communication link 422 is active, the method 630 determines whether data (for example, a grouped read) was sent within a predetermined time period (at block 642). For example, the first controller 402 determines whether any data was sent in the last 4 ms. When the first controller 402 determines that data was sent in the last 4 ms, the method 630 returns to block 638 to continuously determine the status of the communication link 422.

When the battery controller 574 and/or the first controller 402 determine that no data was sent in the time period, the method determines whether the controllers 402, 578 are operating successfully. For example, the battery controller 574 and/or the first controller 402 check for errors or other interrupts. When the controllers 402, 574 are operating successfully, the method 630 includes sending an acknowledgement packet or a grouped read (at block 650). For example, when the first controller 402 determines that the first controller 402 is operating successfully, the first controller 402 sends the acknowledgement packet or the grouped read to the battery controller 574.

When the controller 402, 574 are not operating successfully, the method 630 includes reporting an error in status packet (at block 654; e.g., as a grouped read). For example, when the battery controller 574 determines that the battery controller 574 is not operating successfully, the battery controller 574 sends the error status packet to the first controller 402. In other embodiments, the battery controller 574 may send an error packet.

A purpose of the low-power terminal 550 is to provide an independent, current limited, low-power path from which the tool electronics may power up. Accordingly, the tool electronics may power up in a controlled fashion. In addition, the illustrated low-power generator 578 consists of a low-power mode and a high-power mode. The low-power mode provides a minimum amount of quiescent current when both the power tool 14 and the battery pack 18 are in a sleep state. During normal discharge operations, the high power mode is enabled such that all tool electronics may be operational.

Figure 56:
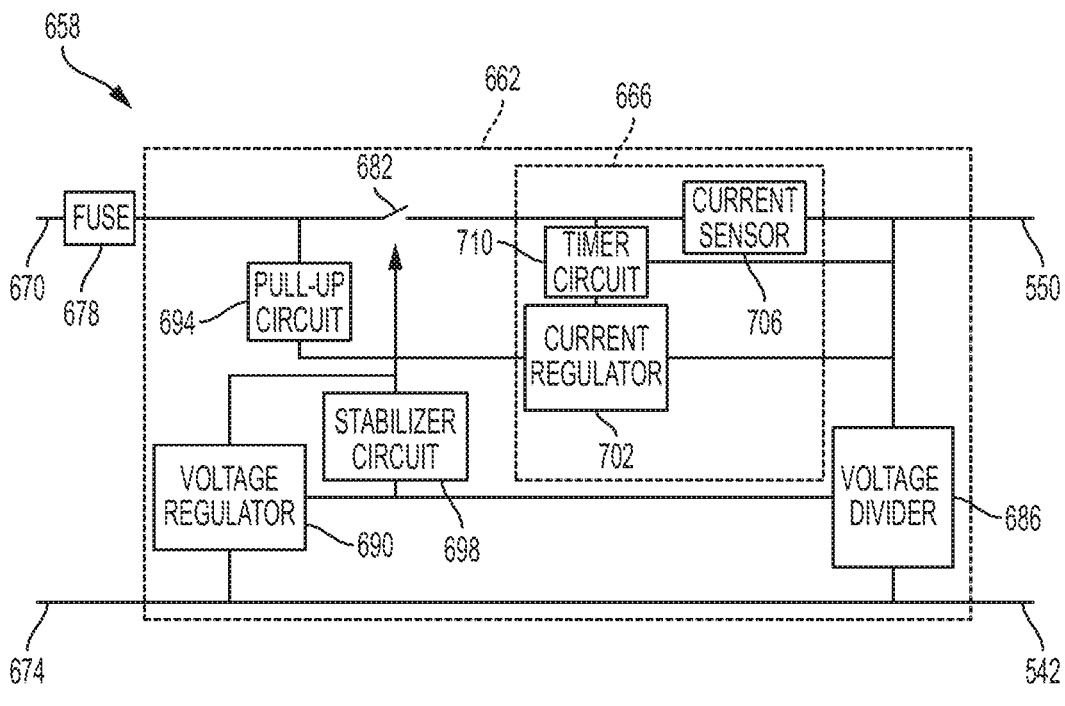
FIG. 56 is a simplified block diagram of a low-current supply circuit of a low-power generator of FIG. 53.

FIG. 56 is a simplified block diagram of one embodiment of a low-current supply circuit 658 of the low-power generator 578. The low-current supply circuit 658 includes a voltage loop 662 and a current loop 666 within the voltage loop 662. The low-current supply circuit 658 receives input power from the battery cells 570 over a positive terminal 670 and a negative terminal 674. The nominal voltage range of the input power received over the terminals 586 and 590 may be between, for example, 40 Volts (V) to 80 V.

A fuse 718 is connected to the positive terminal 670 to act as a circuit breaker when an excess current flows through the low-current supply circuit 658. The fuse 718 may be rated for a current higher than a current output of the low-current supply circuit 658 to allow the low-current supply circuit 658 to momentarily allow higher current without nuisance tripping. In one example, the fuse 718 may be rated for 200 mA at 125 V to allow an output current of 100 mA without nuisance tripping of the fuse 718.

The voltage loop 662 includes a switch 682, a voltage divider 686, and a voltage regulator 690. The switch 682 is connected between the battery cells 570 and the low-power terminal 550. In the illustrated embodiment, an input of the switch 682 is connected to the output of the fuse 718, and an output of the switch 682 is connected to the low-power terminal 550. A pull-up circuit 694 is connected between the input and a control input of the switch 682 to keep the switch 682 biased in a manner to allow the switch 682 to conduct current between the battery cells 570 and the low-power terminal 550. The control input of the SWITCH 682 is modulated by the voltage regulator 690.

The voltage divider 686 is connected between the low-power terminal 550 and the ground terminal 542. The voltage divider 686 may include resistors, whose resistance values may be selected based on the desired reference voltages that may be provided to the voltage regulator 690. The voltage regulator 690 may be a micro-power voltage regulator.

The voltage loop 662 operates to keep the voltage constant at the low-power terminal 550. When the load at the low-power terminal 550 is increased, the voltage across the voltage divider 686 decreases. As a result, the reference voltage provided to the voltage regulator 690 decreases, which, in turn, reduces the current at the control input of the switch 682. The current at the control input is also the current through the pull-up circuit 694. As such, the input-output voltage of the switch 682 increases, which then conducts more current and increases the voltage provided at the low-power terminal 550, which is also the voltage across the voltage divider 686. A stabilizer circuit 698 may be used to form a compensation network to stabilize the voltage loop 662.

The current loop 666 protects the low-current supply circuit 658 in the event of excess current or a short circuit condition. The current loop 666 may be designed to have a fold-back feature which allows a first load current (e.g., 180 mA) for a pre-defined time period (e.g., time) before reducing the current output to a constant second load current (e.g., 60 mA). The current loop 666 includes a current regulator 702, a current sensor 706 (e.g., current sense resistors), and a timer circuit 710.

The current regulator 702 modulates the voltage at the control input of the switch 682 until the current sensor 706 indicates that the low-current supply circuit 658 is outputting a first load current. The timer circuit 710 is connected to the current regulator may be selected based on the desired timing before which the load current drops from the first load current to the second load current.

Approximately at the same time the current regulator is modulating the switch 682, a capacitor of the timer circuit 710 is being charged. For example, the capacitor value of the timer circuit 710 may be selected such that the capacitor of the timer circuit 710 charges in 700 ms. When the capacitor of the timer circuit 710 is charged, the current regulator 702 modulates the voltage at the control input of the switch 682 until the current output reaches the second load current (e.g., 60 mA).

Figure 57:
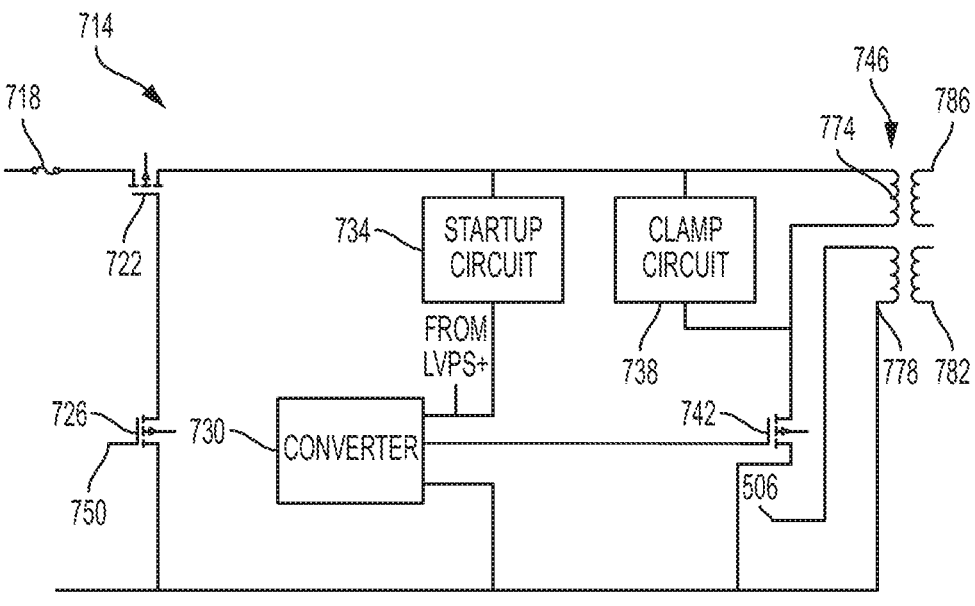
FIG. 57 is a simplified block diagram of a high-current supply circuit of the low-power generator of FIG. 53.

FIG. 57 is a simplified circuit diagram of one embodiment of a high-current supply circuit 714 of the low-power generator 578. In the example illustrated, the high-current supply circuit 714 includes a fuse 718 an input switch 722, an enable switch 726, a flyback converter 730, a startup circuit 734, a clamp circuit 738, a primary switch 742, and a transformer circuit 746. The fuse 718 protects the high-current supply circuit 714 from short-circuit faults. The fuse 718 may have a nominal rating of, for example, 500 mA. The fuse 718 may be dimensioned to allow for full power operation at low line input.

When an enable input 750, for example, a wake-up signal, is applied to the enable switch 726, the enable switch 726 closes the input switch 722, thereby allowing current from the battery cells 305 to flow to the high-current supply circuit 714. The startup circuit 734 provides an initial power supply to operate the converter 730.

Figure 58:
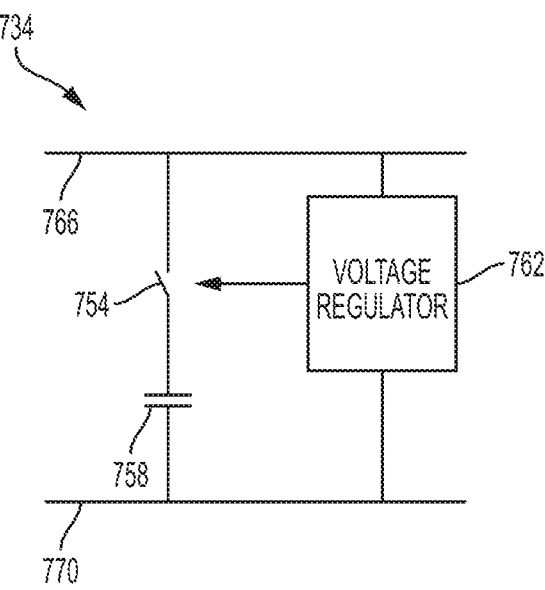
FIG. 58 is a simplified block diagram of a start-up circuit of the high-current supply circuit of FIG. 57.

FIG. 58 illustrates one example embodiment of the startup circuit 734. In the example illustrated, the startup circuit 734 includes a switch 754, a capacitor 758, and a voltage regulator 762. The switch 754 and the capacitor 758 are connected in series between the positive power supply 766 and ground 770. The voltage regulator 762 is connected between the positive power supply 766 and ground 770 and in parallel to the switch 754 and the capacitor 758.

Initially, the voltage across the capacitor 758 may be zero. The voltage regulator 762 provides, for example, 15 V reference on a gate of the switch 754. As power is applied to the startup circuit 734, the switch 754 is turned on. The capacitor 758 is then charged up by the drain current of the switch 754. When the voltage across the capacitor 758 is, for example, approximately 8 V, the startup circuit 734 powers the converter 730.

Returning to FIG. 57, when the converter 730 receives the startup power, the converter 730 starts switching and modulating a gate of the primary switch 742. Eventually, the converter 730 starts up and regulates to, for example, approximately 15 V. At this point, the startup circuit 734 may be turned off and the converter 730 may be powered by the output of the high-current supply circuit 714.

The clamp circuit 738 manages energy in the leakage inductance of the transformer circuit 746. The transformer circuit 746 includes a primary winding 774, and three secondary windings 778, 782, and 786. When the primary switch 742 is closed, the voltage drawn across the primary winding 774 is stepped down and provided to the secondary windings 778, 782, and 786. The secondary winding 778 provides the low-power voltage supply at the low-power voltage supply terminal 550. The secondary windings 782 and 786 provide power to the discharging switch 586 and the charging switch 590 of the battery pack 18.

When there is an activity that enables the high-current supply circuit 714 of the low-power generator 578, the high-current supply circuit 714 may remain enabled, for example, for 100 ms from last known activity before disabling the high-current supply circuit 714 and enabling the low-current supply circuit 658. This may, for example, allow the battery pack 18 sufficient time for an orderly shutdown, to attempt a communications restart in the event of a fault.

Figure 59:
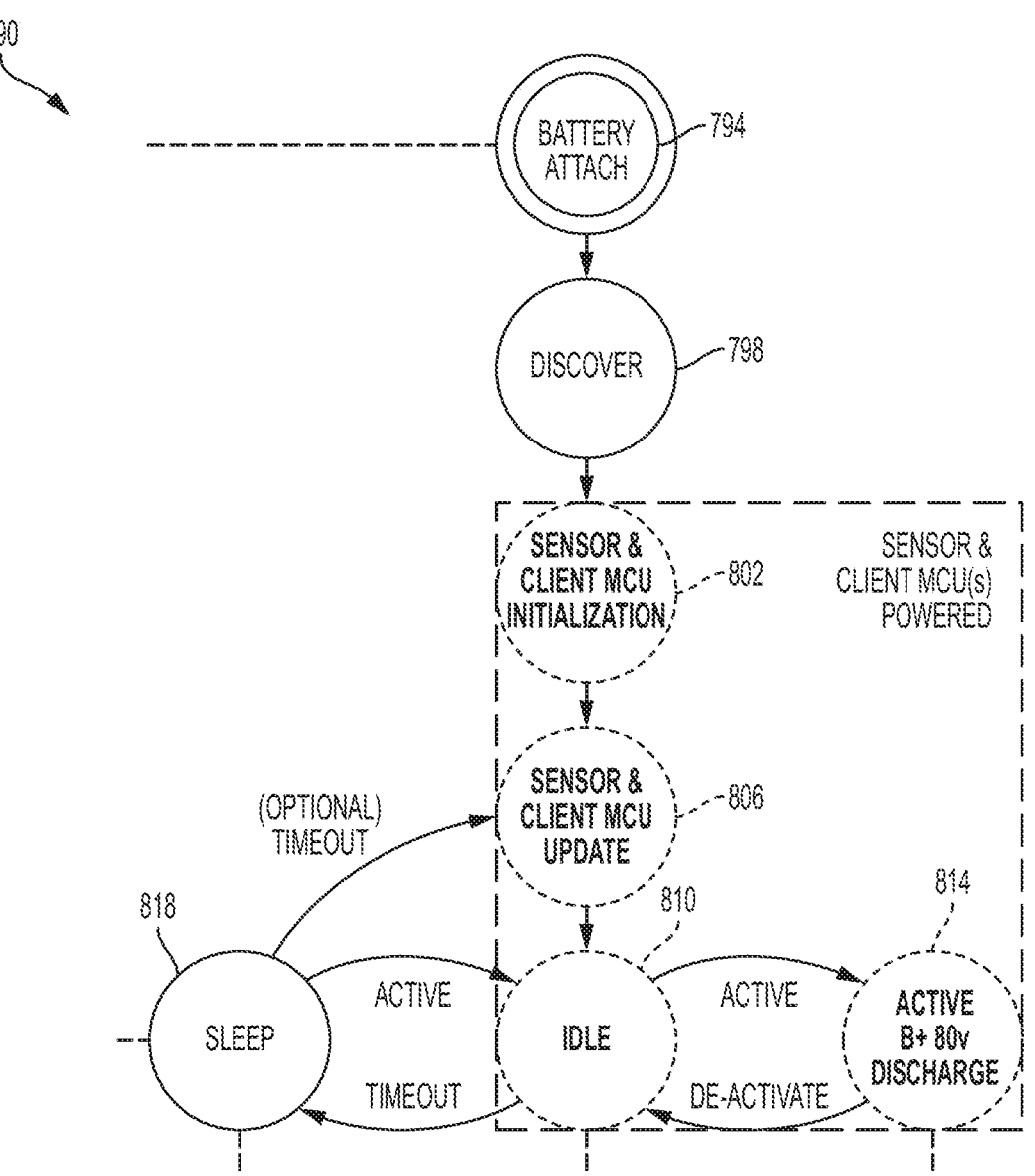
FIG. 59 is a state diagram of a method of managing power tool states.

FIG. 59 is a state diagram illustrating one example method 790 of managing the state of the power tool 14. The method 790 begins when the battery pack 18 is attached to the power tool 14 (at state 794). The method 790 includes determining that the battery pack 18 is attached to the power tool 14 (at state 798). For example, the first controller 402 determines that the battery pack 18 is attached to the power tool 14.

The method 790 also includes sensor and controller initialization (at state 802). When the battery pack 18 is attached, the first controller 402 enters an initialization mode and initializes the sensors and other electronics of the power tool 10. The first controller 402 may then update the sensors and the first controller 402 (at state 806). Updating may include providing initial values to the sensors and the first controller 402. The first controller 402 then enters the idle state (at state (810)).

When in the idle state, the first controller 402 may look for an activation signal or may initiate a timeout sequence. When the first controller 402 receives an activation signal, for example, a trigger pull, the first controller 402 enters the active mode (at state 814) and requests an active discharge voltage from the battery controller 574. In the idle mode (state 810) and the active mode (state 814), the battery controller 574 controls the low-power generator 578 to provide a high-current supply at the low-power terminal 550. When the first controller 402 receives a de-activation signal, for example, trigger deactivation, the power controller 402 enters the idle mode (state 810). The battery controller 574 may then stop active discharge.

When the first controller 402 times out before an activation signal is received, the first controller 402 enters a sleep mode (at state 818). When the first controller 402 enters the sleep mode (state 818), the battery controller 574 controls the low-power generator 578 to generate a low-current supply at the low-power terminal 550.

Figure 60:
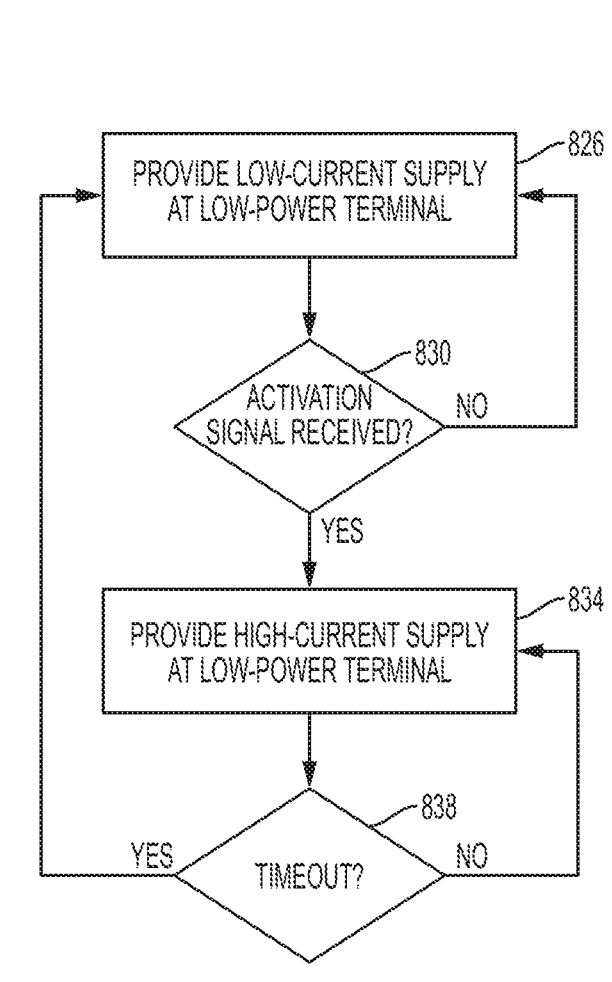
FIG. 60 is a flowchart of a method of operating the low-power generator of FIG. 53.

FIG. 60 is a flowchart illustrating one example method 822 of operating the low-power generator 578. The method 822 includes providing a low-current supply at the low-power terminal 550 (at block 826). The battery controller 574 may control the low-power generator 578 to output a low-current supply at the low-power terminal 550 when the battery pack 18 is inserted in the power tool 10 or when the power tool has been idle. The low-power generator 578 operates the low-current supply circuit to provide minimum amount of quiescent current.

The method 822 also includes determining whether an activation signal is received (at block 830). The activation signal may be received at the battery controller 574 or at the low-power generator 578. The activation signal is received when the power tool 10 is ready to be operated, for example, when a user activates the trigger. When no activation signal is received, the low-power generator 578 continues to provide the low-current supply at the low-power terminal 550.

When an activation signal is received, the method 822 includes providing a high-current supply at the low-power terminal 550 (at block 834). The battery controller 574 may control the low-power generator 578 to switch from the low-current supply circuit 658 to the high-current supply circuit 714 and provide the high-current supply at the low-power terminal 550.

The method 822 further includes determining whether a predetermined amount of time has elapsed since last activation signal (at block 838). The battery controller 574 may detect the amount of time since last activation. When the amount of time since last activation does not exceeds the predetermined amount of time (e.g., 100 ms), the low-power generator 578 continues to provide high-current supply at the low-power terminal 550. In some embodiments, the battery controller 574 may receive a timeout signal from the first controller 402.

When the amount of time since last activation exceeds the predetermined amount of time, the battery controller 574 may control the low-power generator 578 to switch from the high-current supply circuit 714 to the low-current supply circuit 658 and provide the low-current supply at the low-power terminal 550. The method 822 continuously determines whether an activation signal has been received or whether a predetermined amount of time has elapsed since the last activation signal to switch between the high-current supply circuit 714 and the low current supply circuit 658.

Figure 61:
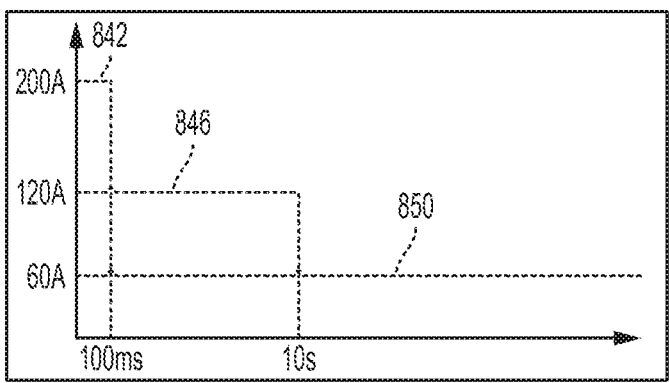
FIG. 61 is a graph of discharge capabilities of the battery pack of FIG. 1.

The battery pack 18 has different discharge capabilities based on the conditions of the battery pack 18. With reference to FIG. 61, the battery pack 18 discharge capabilities may include an instantaneous discharge current 842, a short term discharge current 846, and a sustained discharge current 860. The discharge capabilities may change constantly based on the conditions of the battery pack 18. For example, the battery pack 18 may have reduced capabilities during start-up, based on cell/pack temperature, voltage, etc., or as the battery pack ages. The illustrated discharge thresholds are exemplary and may also change based on conditions of the battery pack.

The battery controller 574 communicates the discharge capabilities at each time interval to the first controller 402, which, in turn, provides the discharge capabilities to the second controller 406. The second controller 406 further controls the motor based on the discharge capabilities provided by the battery controller 574. The controllers 578, 402, 406 thus provide dynamic battery output limiting based on battery pack conditions.

By controlling the motor 34 in accordance with the discharge capabilities of the battery pack 18, the power tool 14 reduces any harmful or over-conditions on the power tool 14 or the battery pack 18. In addition, by controlling the motor 34 in accordance with the discharge capabilities, the power tool 14 also reduces the thermal load on the battery pack 18.

Figure 62:
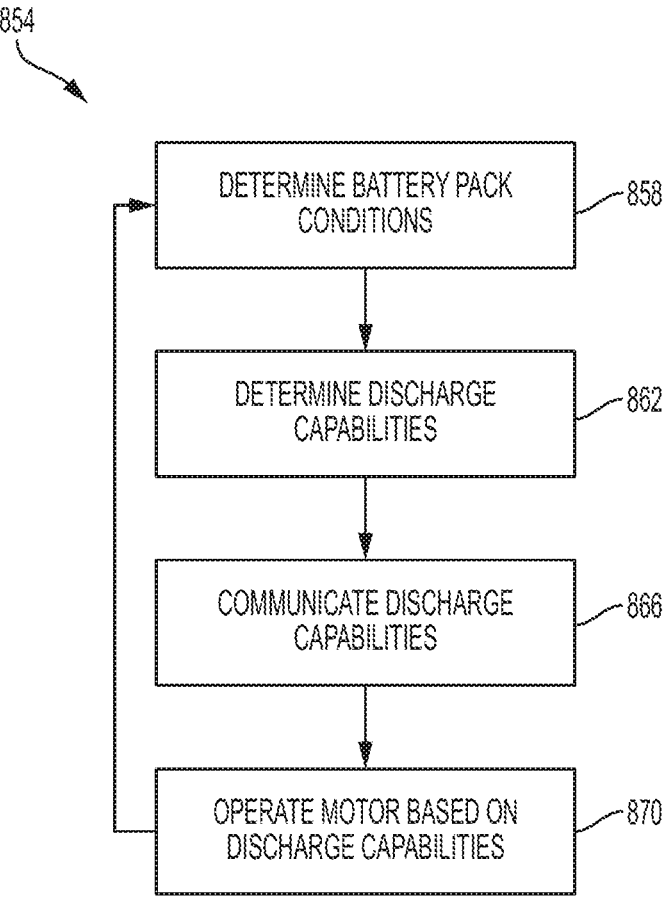
FIG. 62 is a flowchart of a method of operating the motor of FIG. 1 based on discharge information.

FIG. 62 is a flowchart illustrating one example method 854 of operating the motor 34 based on discharge information. The method 854 includes determining battery pack conditions (at block 858). For example, the battery controller 574 may determine a state of charge, a temperature, age, etc., of the battery pack 18 that have an impact on the discharge capabilities of the battery pack 18. The battery pack 18 may include several sensors (e.g., voltage sensor, temperature sensor, etc.) that detect conditions of the battery cells and the battery pack and provide an indication to the battery controller 574 regarding the state of the conditions.

The method 854 also includes determining discharge capabilities of the battery pack 18 based on the conditions of the battery pack 18 (at block 862). In some embodiments, the battery pack 18 may store a look-up table including a mapping between the battery pack 18 conditions and the discharge capabilities. The battery controller 574 may determine the discharge capabilities based on the look-up table. In other embodiments, the battery controller 574 may be programmed to calculate the discharge capabilities as a function of the conditions of the battery pack 18.

The method 854 further includes communicating the discharge capabilities to the second controller 406 (at block 866). The battery controller 574 transmits the discharge capabilities (for example, through grouped reads) over the communication link 422 to the first controller 402. For example, the battery controller 574 may transmit discharge capabilities every 10 ms. The first controller 402 in turn transmits the discharge capabilities to the second controller 406, for example, every 4 ms.

The method 854 also includes operating the motor 34 based on the received discharge capabilities. The second controller 406 may operate the motor 34 based on the most recently received discharge capabilities. For example, the second controller 406 may limit the instantaneous torque, the average torque, and the sustained torque output of the motor 34 to coincide with the discharge capabilities of the battery pack 18. The method 854 then returns to block 858 to continuously monitor the battery conditions and update the discharge capabilities. For example, the method 854 may repeat every 10 ms to update the discharge capabilities.

Battery packs having cells with lithium-ion chemistry may be subject to shipping regulations. Such shipping regulations may limit the voltage and/or power capacity of the battery pack being shipped. In order to comply with such regulations, battery packs 18 may be shipped with subcores of the battery cells 570 disconnected from each other. The battery pack 18 may include a switch, as described below, which connects the subcores together when the battery pack 18 is in use. A similar switch and switching arrangement is described and illustrated in U.S. Provisional Patent Application No. 62/435,453, filed Dec. 16, 2016, and in U.S. patent application Ser. No. 15/845,068, filed Dec. 18, 2017, the entire contents of both of which are hereby incorporated by reference.

Figure 32:
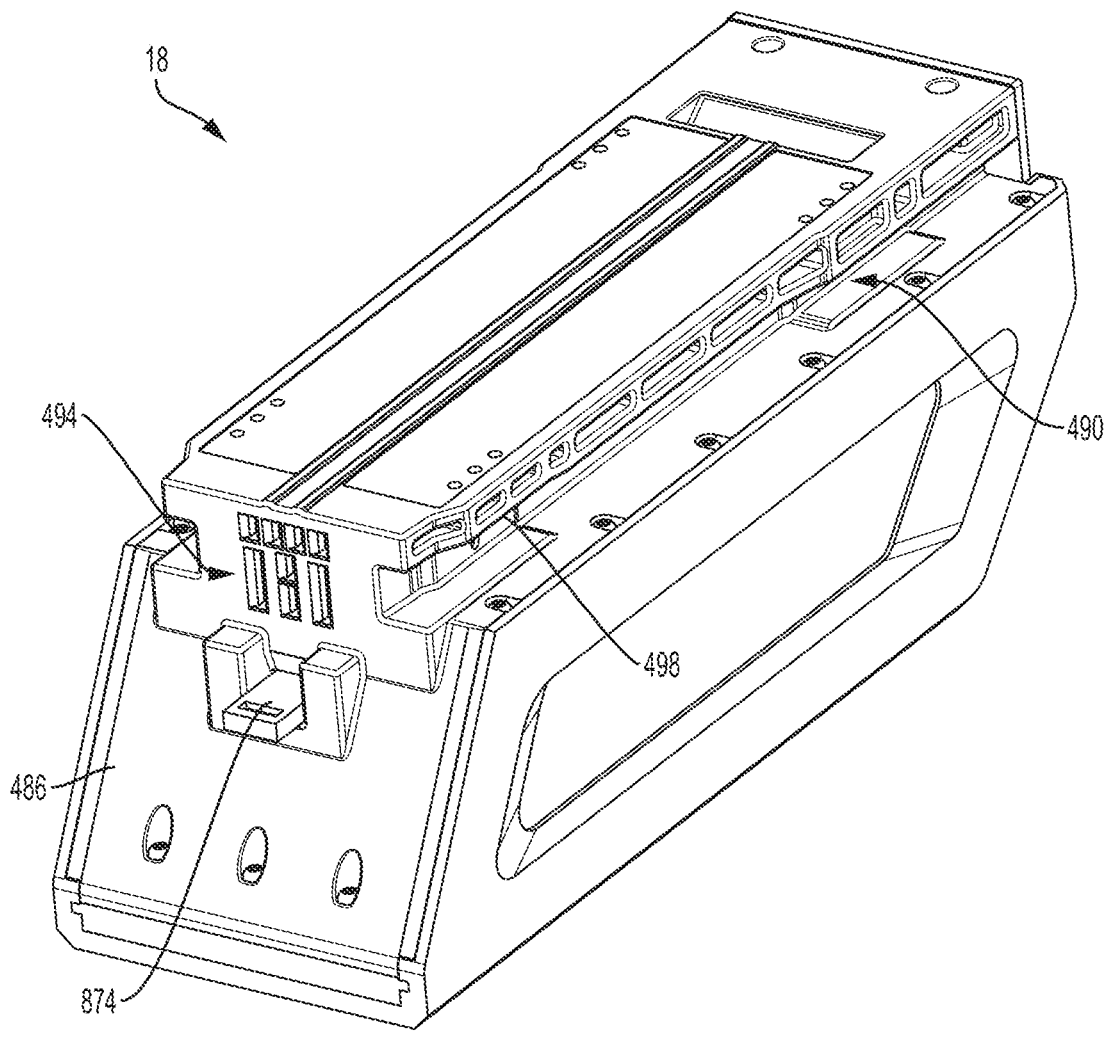
FIG. 32 is a top perspective view of the battery pack of FIG. 1 according to some embodiments.
Figure 33:
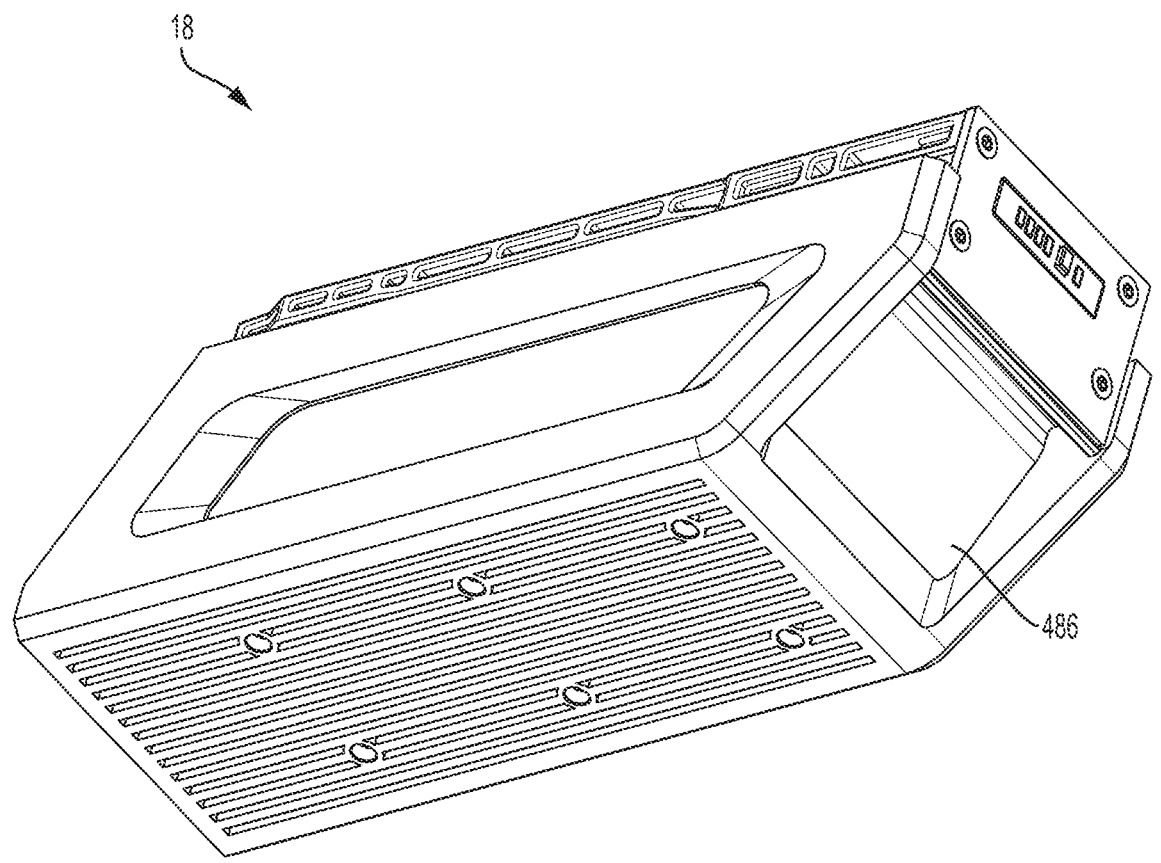
FIG. 33 is a bottom perspective view of the battery pack of FIG. 32.
Figure 42:
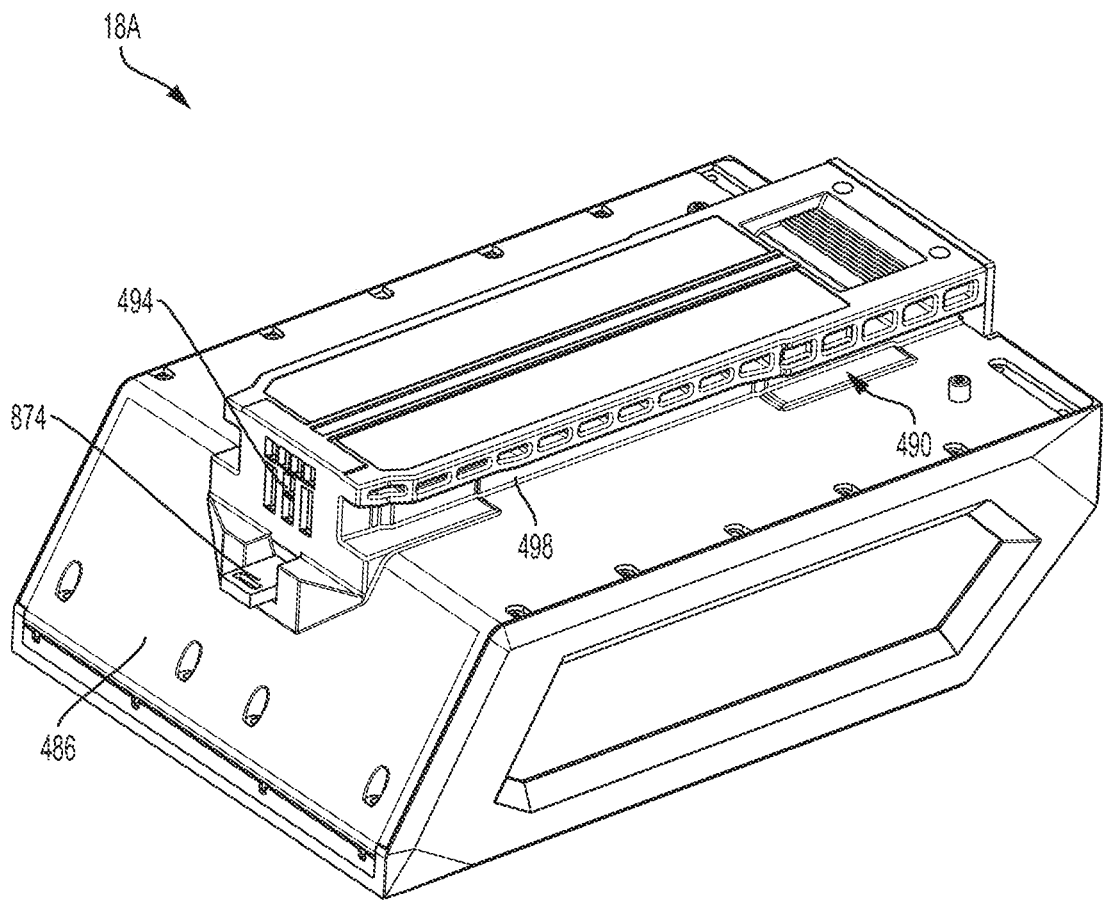
FIG. 42 is a top perspective view of the battery pack of FIG. 1 according to some embodiments.
Figure 43:
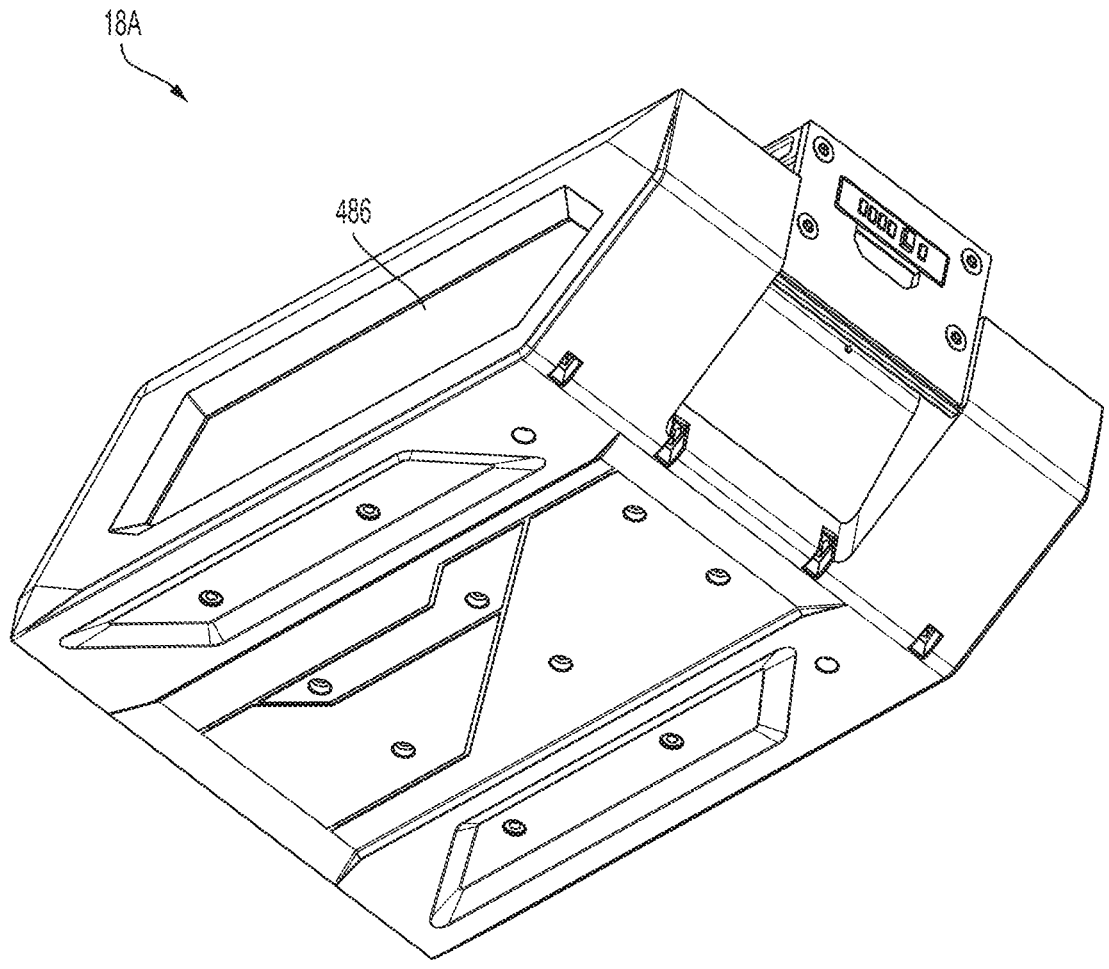
FIG. 43 is a bottom perspective view of the battery pack of FIG. 42.
Figure 63A:
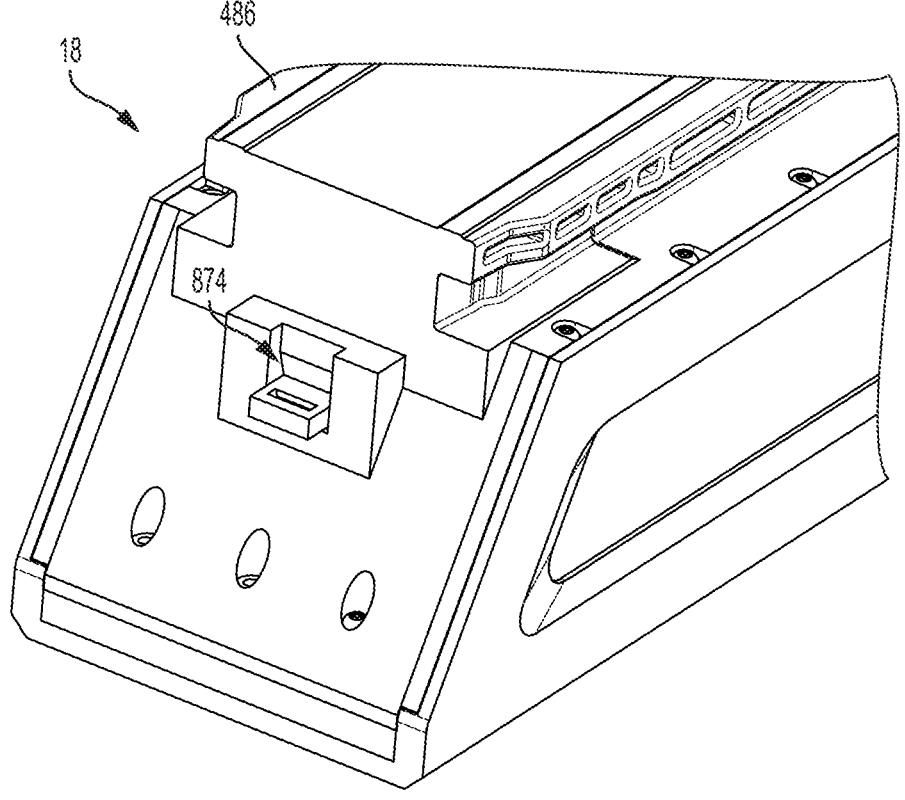
FIGS. 63A-63B are perspective views of the battery pack of FIG. 1 showing a switch.
Figure 63B:
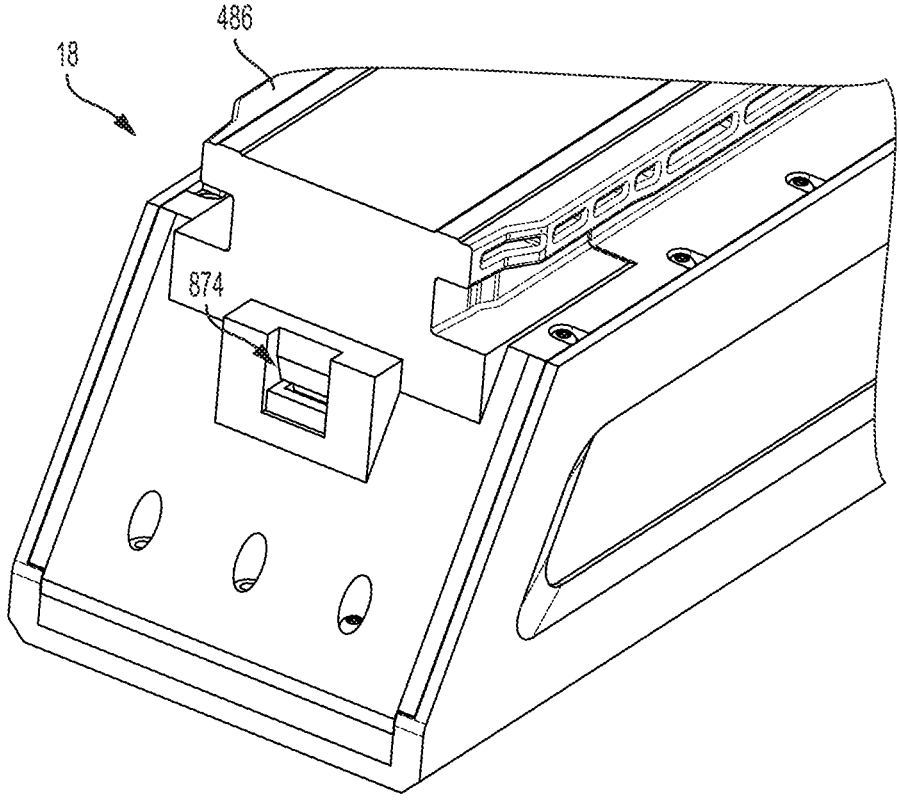

With reference to FIGS. 32 and 42, the battery pack 18 includes a switch 874 extending from the housing 486. The switch 874 is configured to be in a first position (FIG. 63A) and a second position (FIG. 63B). When in the first (e.g., "OFF") position, electrical components (for example, the subcores) of the battery pack 18 contained within the housing 486 are electrically disconnected from each other. When in the second (e.g., "ON") position, electrical components (for example, the subcores) are electrically connected to each other. The switch 874 may be manipulated by a user from the first position to a second position by pressing or sliding the switch 874.

Figure 64A:
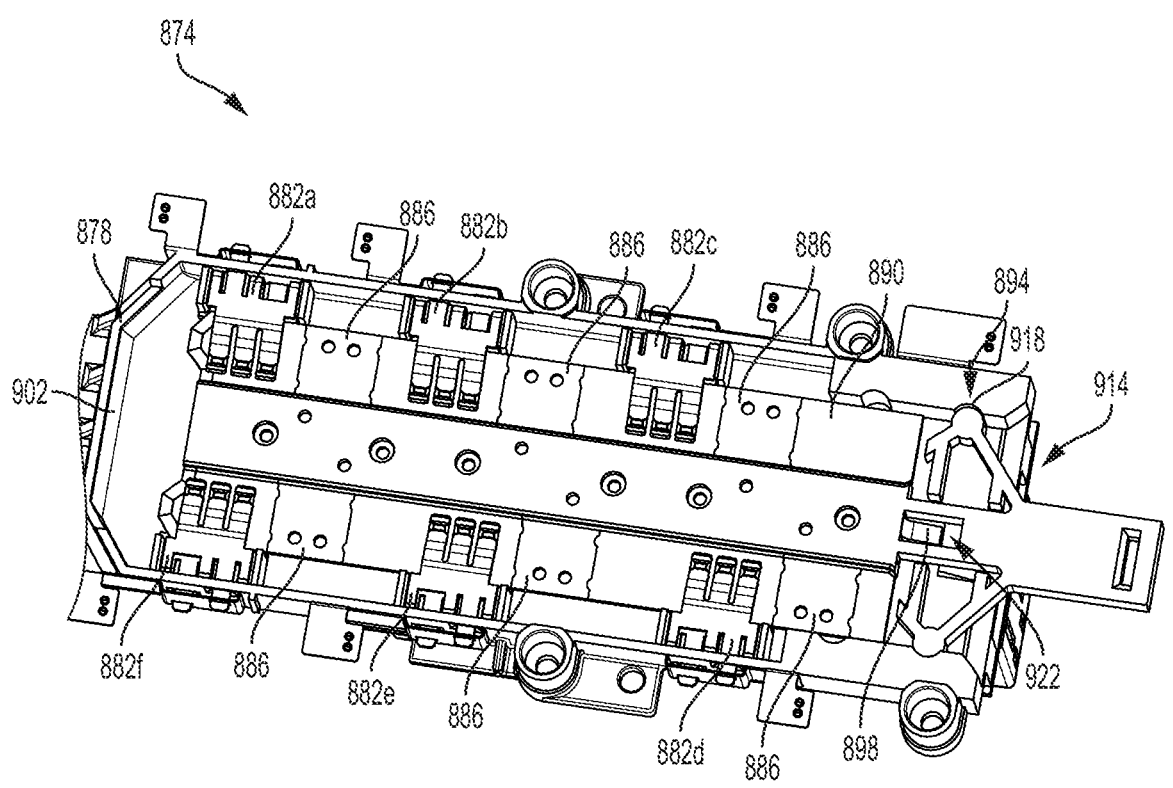
FIGS. 64A-64B are perspective view of the switch of FIGS. 63A-64B.
Figure 64B:
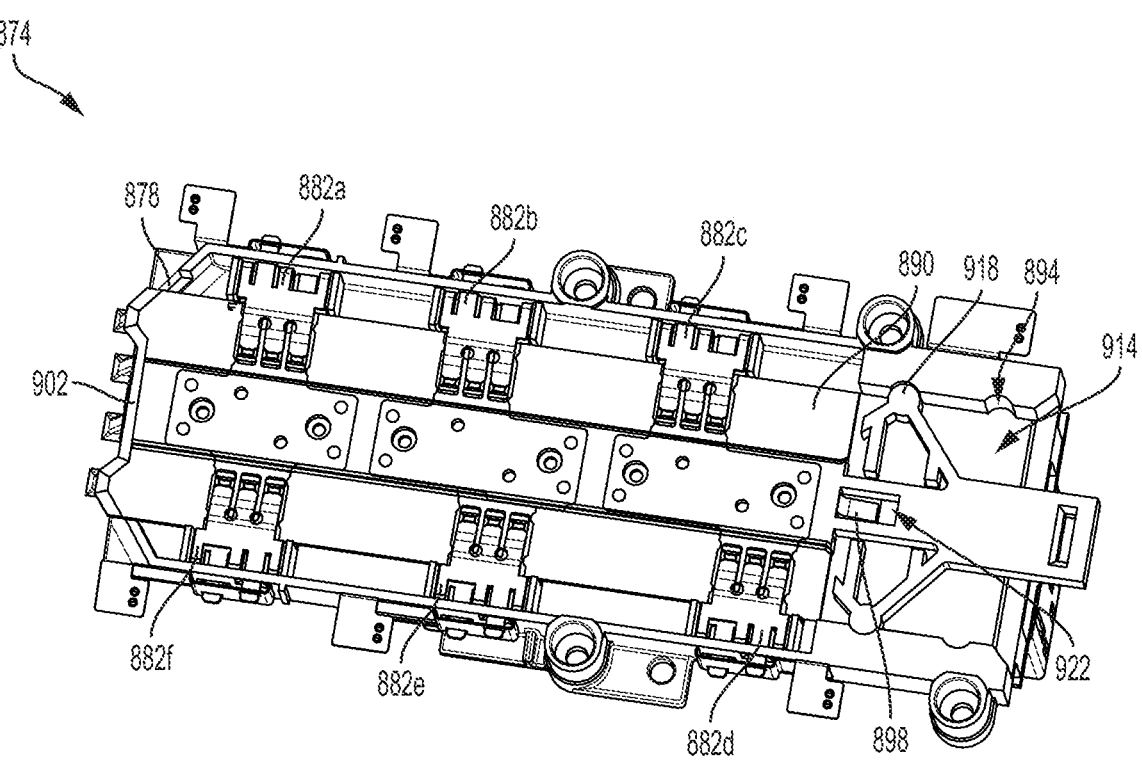
Figure 65:
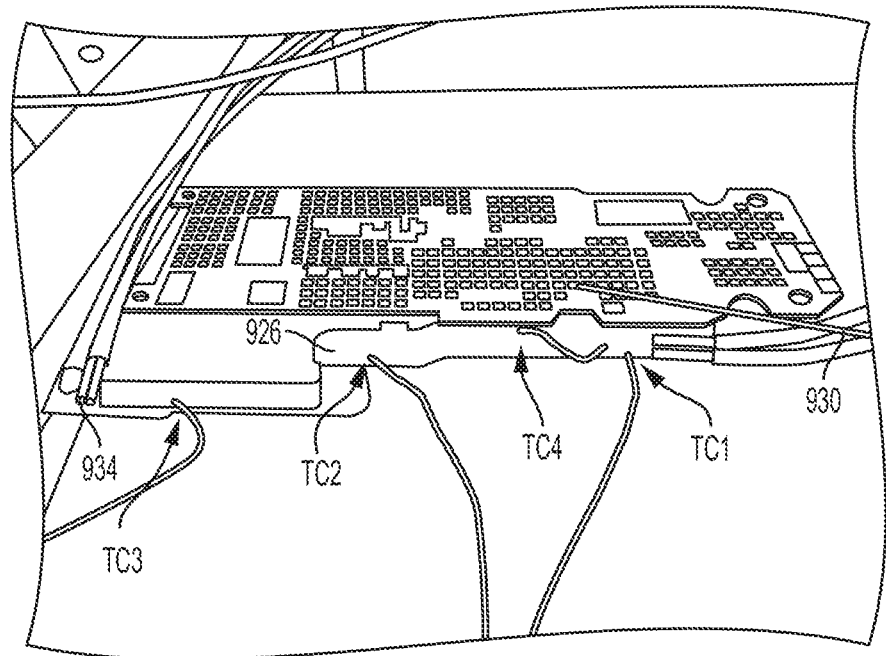
FIG. 65 is a perspective view of a current sense resistor of the battery pack of FIG. 1.

FIGS. 64A-64B illustrate the switch 874 in accordance with some embodiments. As discussed above, the switch 874 is configured to be in the first position (FIGS. 63A and 64A) and the second position (FIGS. 60B and 64B). The switch 874 includes a shell 878, terminals 882a, 882b . . . , 882n, a conductive bus 886, and a non-conductive layer 890. The shell 878 may be formed of plastic or a similar material. The shell 878 is slidingly coupled to the housing 486, while the conductive bus 886 and the non-conductive layer 890 are coupled, or integral to, the housing 486, such that the shell 878 is slidingly coupled to the conductive bus 886 and the non-conductive layer 890. The shell 878 may include one or more recesses 894, a front stop member 898, and a rear stop member 902.

Although illustrated as having six terminals 882a-882f, in other embodiments (not shown), the battery pack 18 may have fewer or more terminals 882. Each terminal 882 has a first end coupled to the shell 878 and electrically coupled to the subcores (for example, via subcore terminals). Each terminal 882 has a second end configured to slidingly contact, when the switch 874 is in the off position, the non-conductive layer 890 and, when the switch 874 is in the on position, the conductive bus 886.

As illustrated in FIGS. 64A-64B, in some embodiments, the conductive bus 886 and the non-conductive layer 890 are coupled to a user-interface (e.g., a portion projecting out of the housing and configured to be operable by the user) via a protective member 914 having one or more projections 918 and forming an aperture 922. The projections 918 engage with the one or more recesses 894 of the shell 878 to prevent unwanted movement between the first position and the second position. The front stop member 898 is positioned within the aperture 922 and engages the protective member 914 to prevent the conductive bus 886 and non-conductive layer 890 from surpassing the first position, when moving from the second position to the first position. The rear stop member 902 prevents the conductive bus 886 and non-conductive layer 890 from surpassing the second position, when moving from the first position to the second position.

The battery pack 18 includes a current sense resistor 926 connecting the battery cells 570 to the battery pack terminals 538, 542. The current sense resistor 926 acts as a current sensor of the battery pack 18. The current sense resistor 926 includes two terminals tapped by the battery controller 574 to detect the current flowing through the battery pack 18. The current sense resistor 926 extends from the rear end 930 of the battery pack 18 to the terminals 538, 542 of the battery pack 18. In order to accommodate the switch 874, the battery pack 18 includes the most positive terminal on the rear end 930 of the battery pack 18. The current sense resistor 926, accordingly, connects the most positive terminal located at the rear end 930 of the battery pack 18 to the battery pack terminals 538, 548 located at the front end 934 of the battery pack 18.

Current sensor resistors used in existing battery packs did not extend through the length of the battery pack. The battery cells were provided closer to the battery terminals and the current sense resistor was relatively smaller in length and area of cross section and connected the battery cells to the battery terminals.

In the illustrated constructions, the current sense resistor 926 extends across the length of the battery pack 18 and a larger cross-sectional area compared to existing current sense resistors. The illustrated current sense resistor 926 thereby offers lower resistance than the existing current sense resistors. Accordingly, the heat dissipated by the current sense resistor 926 is significantly lower.

In addition, the current sense resistor 926 is made of a high thermal conductivity material. The extended length and the high thermal conductivity allow the current sense resistor 926 to wick heat away from any higher temperature areas to reduce the overall heat dissipated. The current sense resistor 926, therefore, contributes to reducing the amount of heat generated by the battery pack 18.

Figure 66:
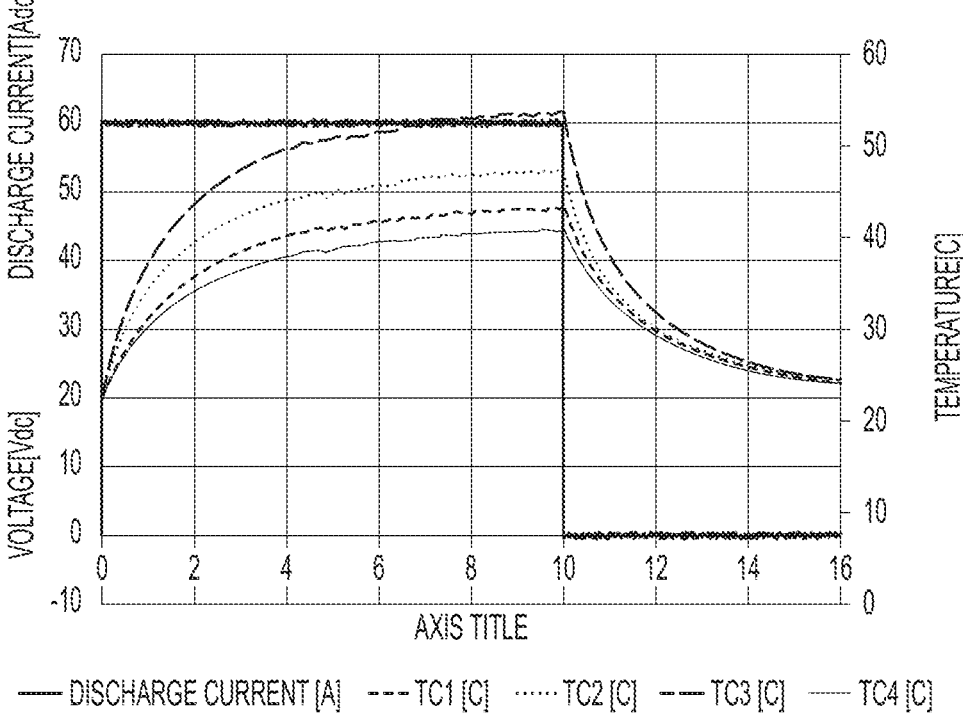
FIG. 66 is a graph of temperature of the current sense resistor of FIG. 42 as a function of discharge time of the battery pack of FIG. 1 according to one independent embodiment.

With reference to FIG. 66, experimental results of temperature are illustrated for the current sense resistor 926 of the battery pack 18. The battery pack 18 is discharged at 60 A for 10 minutes and measurements are taken at points TC1, TC2, TC3, and TC4 of the current sense resistor 926 (shown in FIG. 42) during and after the discharge. As illustrated, the temperature does not exceed 65° C. for a 60 A discharge up to 10 minutes.

In some embodiments of the battery pack 18, the battery cells 570 may be monitored by one or more monitoring integrated circuits (ICs) to, for example, protect and extend the life of the cells 570 and of the battery pack 18. The cells 570 may be monitored to, for example, prevent or inhibit overvoltage, undervoltage, overcurrent in discharge, imbalance, etc. of the cells 570.

When a complete block of cells 570 is monitored by connecting a monitoring device between the most positive terminal and the most negative terminal of the block 20, a total voltage of the block is monitored but not the individual cells 570. In such embodiments, the monitoring device may detect a reasonable value for the voltage of the block but may not detect undesirable conditions of the cells 570 (e.g., cell imbalances) within the block. Hence, monitoring ICs capable of monitoring individual cells in a block may be advantageous.

Individual cell monitoring may be implemented to balance the cells during charging and discharging. For example, during charging, one cell may reach a threshold of approximately 4.2 V before others cells 570, the monitoring IC may cut off charging of that cell, but charging of other cells 570 will continue, for example, with a slightly higher current to reach the same threshold.

Figure 67:
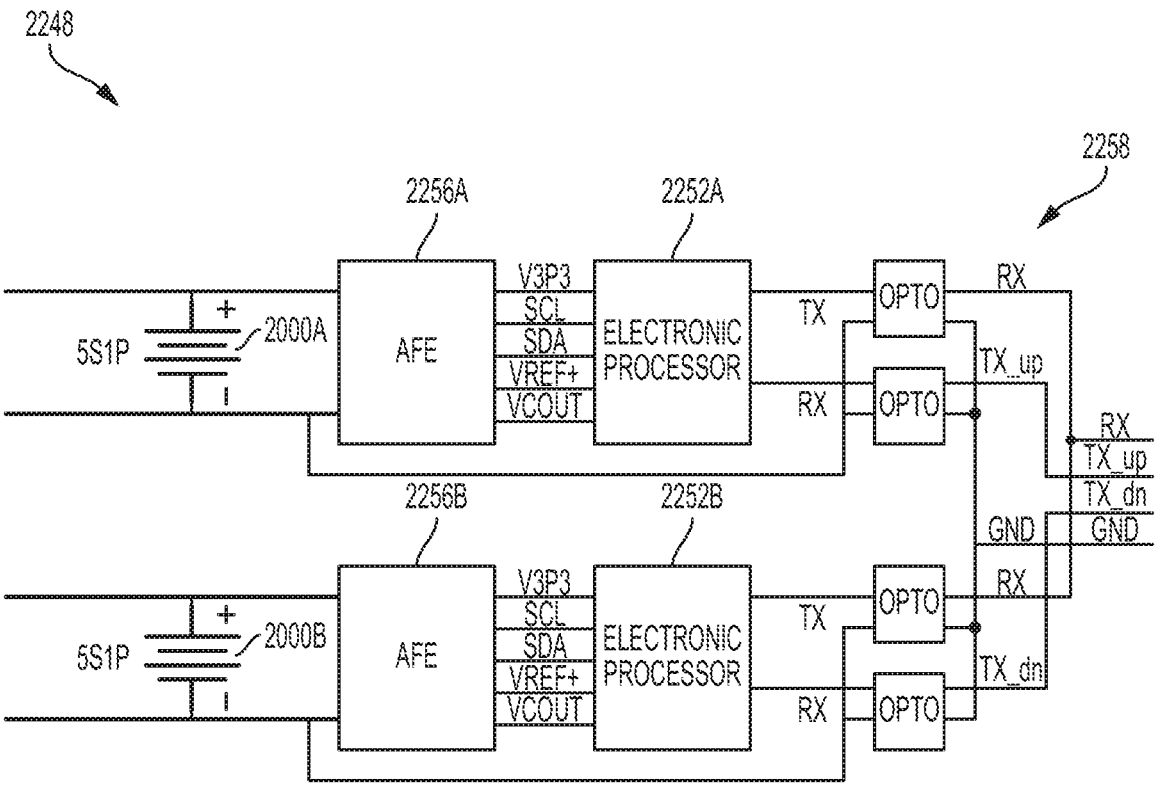
FIG. 67 is a block diagram of a battery monitoring circuit.

FIG. 67 illustrates an exemplary battery monitoring circuit 2248 of the battery pack 18. As illustrated, the battery monitoring circuit 2248 includes two 5S1P cell blocks 2000A and 2000B. Cell blocks 2000 may be substantially similar to subcores 300, discussed above. The cell block 2000A is monitored by an electronic processor 2252A using an analog front end (AFE) 2256A. The cell block 2000B is monitored by an electronic processor 2252B using an AFE 2256B. The battery cells 570 which include 20S1P packs may be divided into individual 5S1P packs for monitoring according to the present disclosure.

The AFEs 2256A-2256B are capable of monitoring individual cells in the cell blocks 2000A-2000B. The AFEs 2256A-2256B may be implemented using, for example, BQ76925 host-controlled analog front end designed by Texas Instruments. The AFEs 2256A-2256B may be referred to singularly as the AFE 2256, and the processors 2252A-2256B may be referred to singularly as the processor 2252. In other embodiments, the battery monitoring circuit 2248 may include more or fewer cell blocks 2000 monitored by more or fewer processors 2252 and AFEs 2256.

The AFE 2256 provides operating power to the processor 2252 over the V3P3 line. The processor 2252 provides serial clock (SCL) to the AFE 2256 over the SCL line. The processor 2252 and the AFE 2256 exchange serial data over the SDA line. For example, the processor 2252 may write an address of an individual cell to be monitored at a given time to a register of the AFE 2256 over the SDA line. The AFE 2256 provides a reference voltage used to measure individual voltages of the cells 570 over the VREF+ line to the processor 2252. The AFE 2256 provides individual states (for example, voltages of individual cells 570) over the VCOUT line to the processor 2252. The AFE 2256 may provide a voltage of a particular cell 570 at the VCOUT line based on request written to the AFE 2256 over the SDA line. The battery monitoring circuit 2248 may additionally include a coupling circuit, for example, an opto-coupling circuit 2258 that facilitates communication between the processors 2252A-2252B and an electronic processor of a tool.

Figure 68:
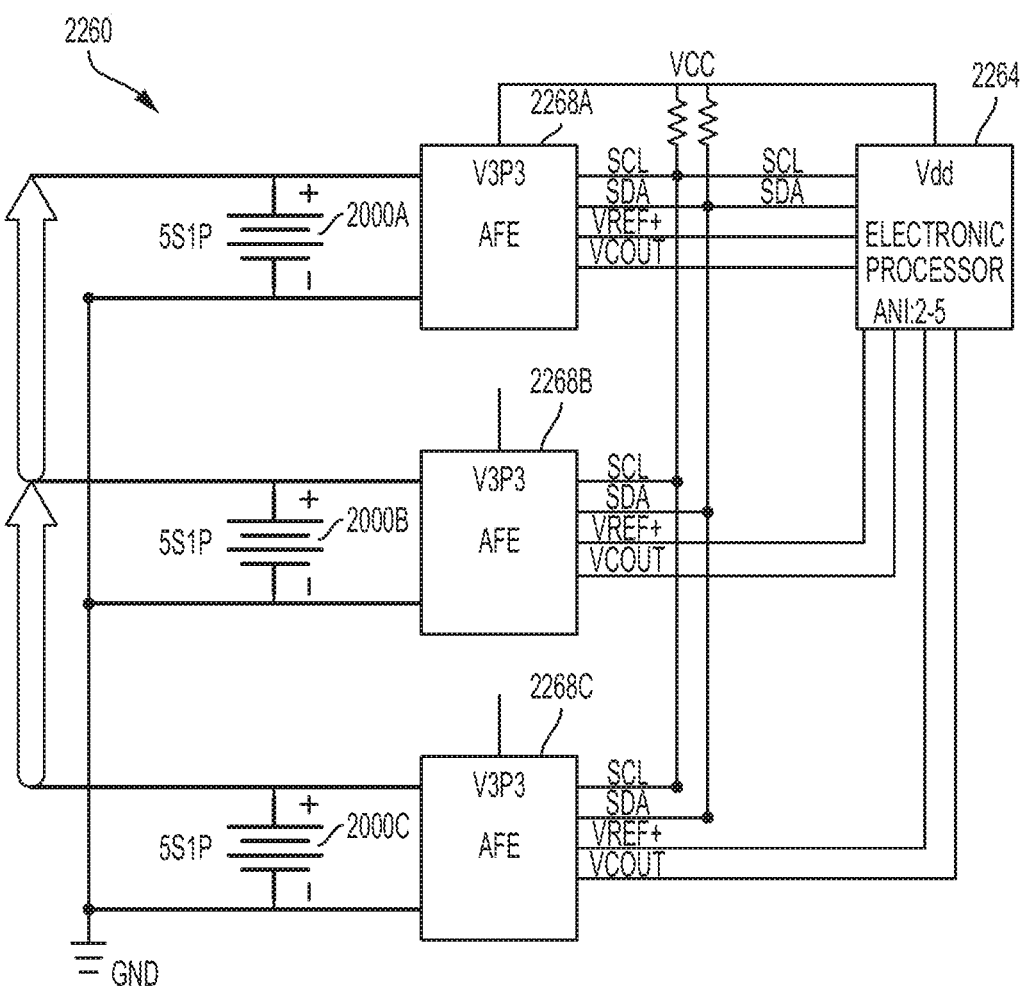
FIG. 68 is a block diagram of an alternative battery monitoring circuit.

FIG. 68 illustrates a further alternative battery monitoring circuit 2260. As illustrated, the battery monitoring circuit 2260 includes three 5S1P cell blocks 2000A-2000C. Each cell block 2000A-2000C is monitored by a single electronic processor 2264 using AFEs 2268A-2268C, respectively. As described above, the AFEs 2268A-2268C are capable of monitoring individual cells 570 in the cell blocks 2000A-2000C. The AFEs 2268A-2268C may be referred to singularly as the AFE 2268. In other embodiments, the battery monitoring circuit 2248 may include more or fewer cell blocks 2000 monitored by the processor 2264 using more or fewer AFEs 2268.

The processor 2264 may receive operating power from one of the AFEs 2268. The processor 2264 provides a serial clock over the SCL lines to the AFEs 2268A-2268C. In addition, the processor 2264 and the AFEs 2268A-2268C exchange serial data over the SDA lines. The processor 2264 may receive reference voltages (VREF+) and individual cell states (VCOUT) at analog inputs ANI0-5. In the illustrated example, analog inputs ANI0-1 are connected to AFE 2268A, analog inputs ANI2-3 are connected to AFE 2268B, and analog inputs ANI4-5 are connected to AFE 2268C.

Figure 69:
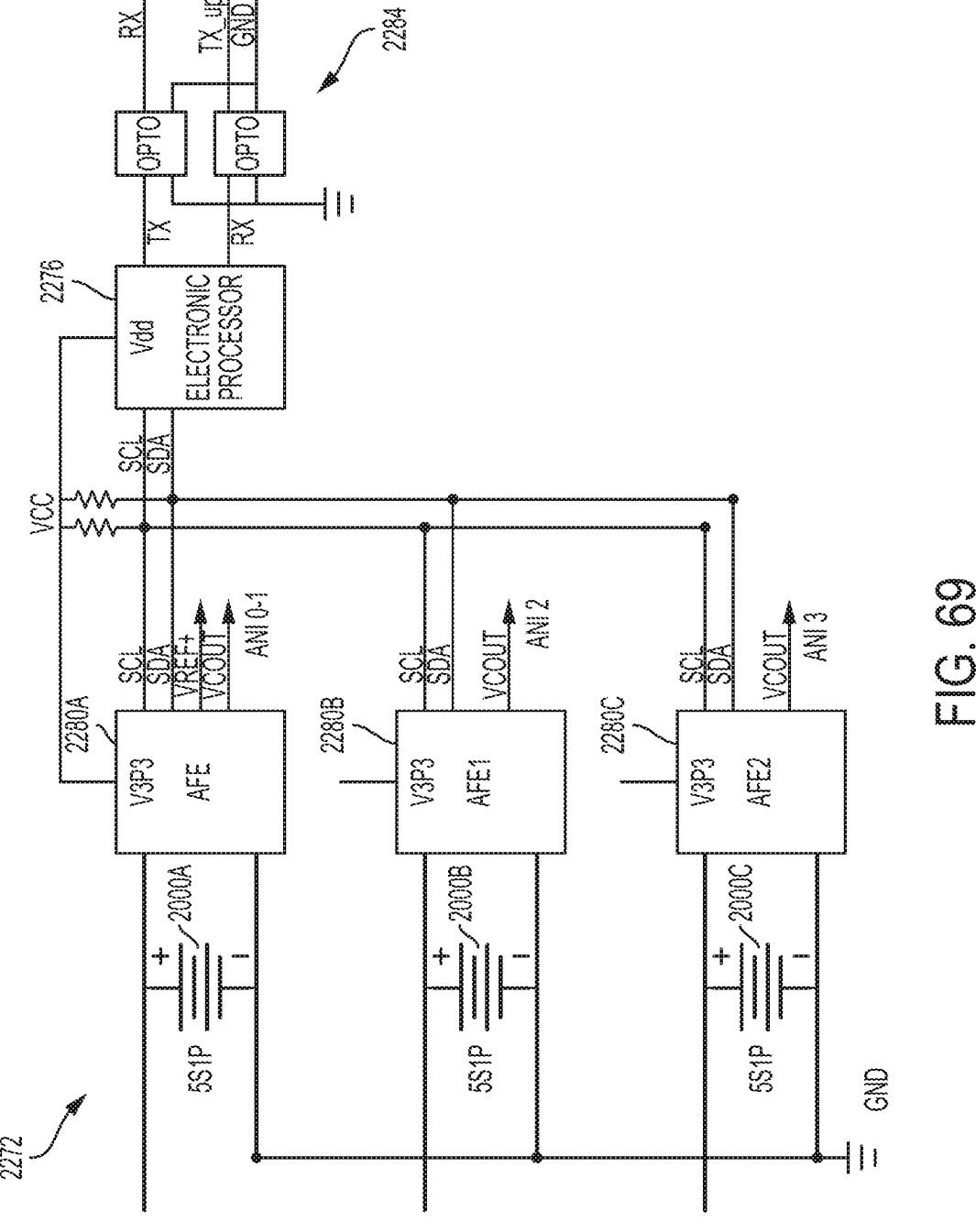
FIG. 69 is a block diagram of a battery monitoring circuit using shared inter-integrated circuit bus.

FIG. 69 illustrates another alternative battery monitoring circuit 2272 using shared inter-integrated circuit (I2C) bus.

As illustrated, the battery monitoring circuit 2272 includes three 5S1P cell blocks 2000A-2000C monitored by a single electronic processor 2276 using AFEs 2280A-2280C, respectively. The battery monitoring circuit 2272 operates in a similar manner to the battery monitoring circuit 2260 of FIG. 68.

The AFEs 2280A-2280C communicate with the processor 2276 over a shared I2C channel. Outputs of the AFEs 2280A-2280C are provided at analog inputs ANI0-3 of the processor 2276. Because all cells 570 in the cell blocks 2000A-2000C operate at similar voltage levels, the processor 2276 may be provided with a single reference voltage (VREF+) from the AFE 2280A. The reference voltage VREF+ is provided at the analog input ANI0. States of individual cells (VCOUT) are provided at analog inputs ANI1-3 from the AFEs 2280A-2280C, respectively. The battery monitoring circuit 2272 may include more or fewer cell blocks 2000 monitored by the processor 2276 using more of fewer AFEs 2280 over the shared I2C channel. The battery monitoring circuit 2272 may also include an opto-coupling circuit 2284.

Figure 70A:
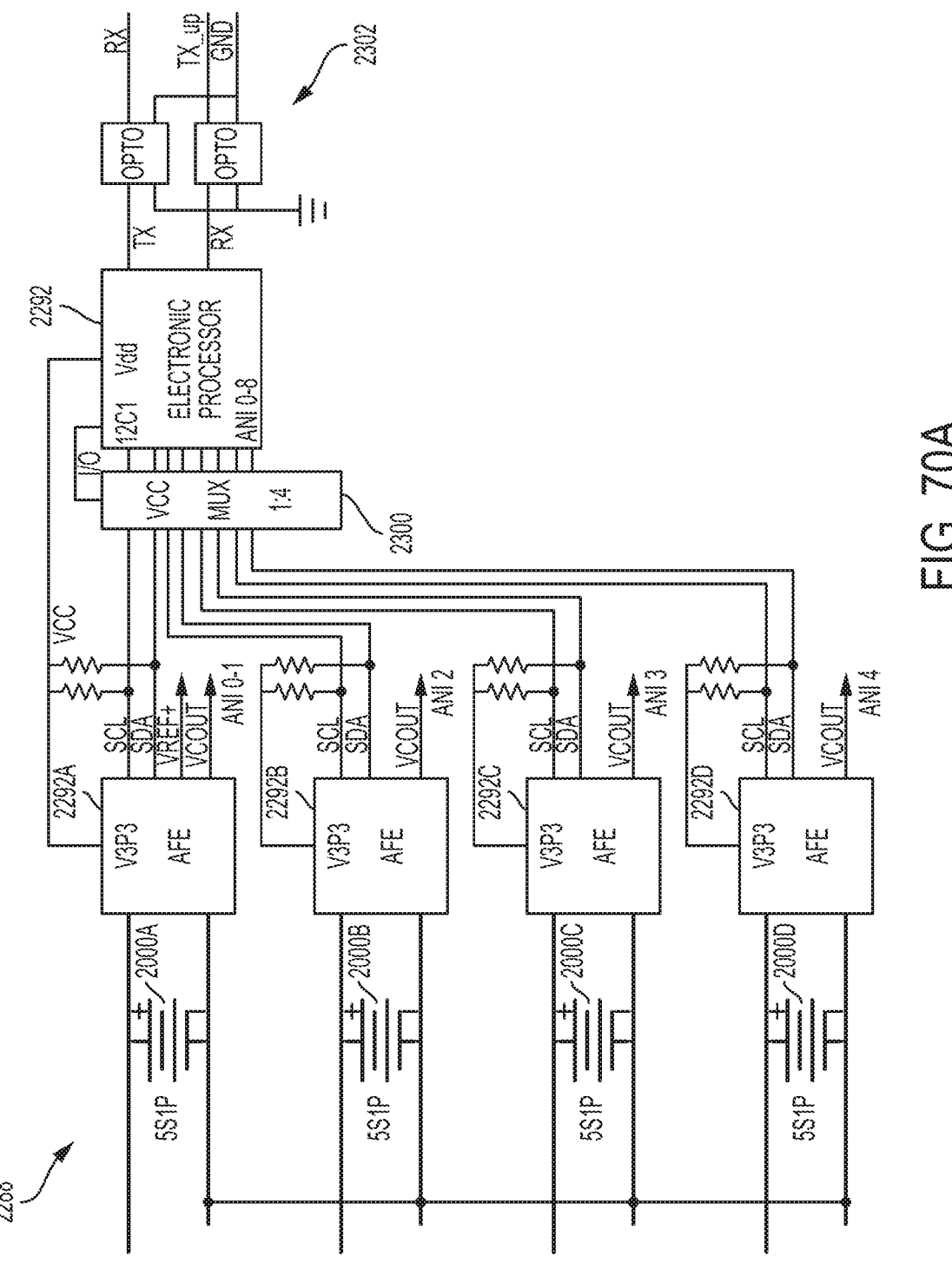
FIGS. 70A-70B are block diagrams of a battery monitoring circuit using multiplexors and a shared inter-integrated circuit bus.
Figure 70B:
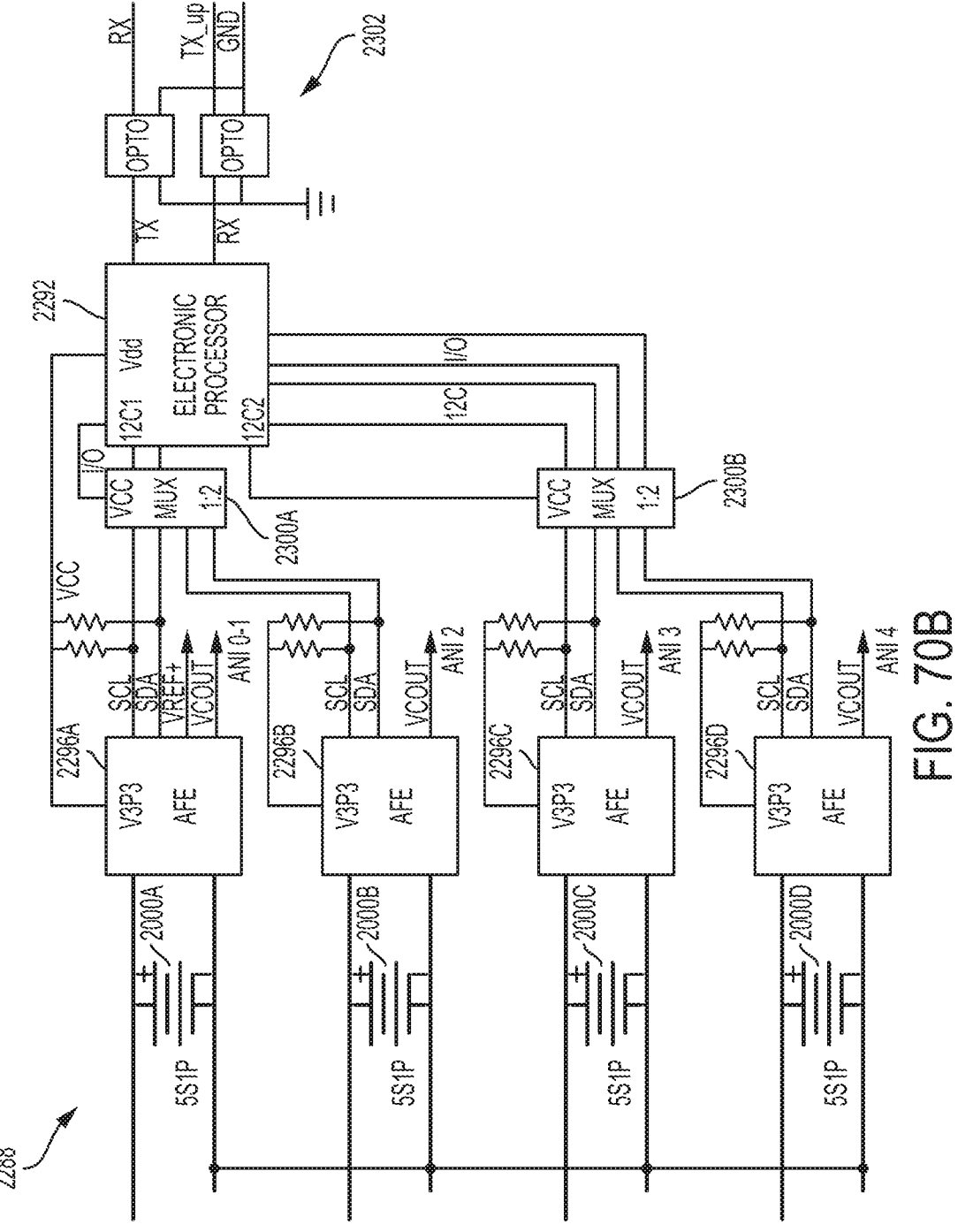

FIGS. 70A-70B illustrate yet another alternative battery monitoring circuit 2288 using multiplexors. As illustrated, the battery monitoring circuit 2288 includes four 5S1P cell blocks 2000A-2000D monitored by a single electronic processor 2292 using AFEs 2296A-2296D. The battery monitoring circuit 2288 operates in a manner similar to the battery monitoring circuit 2272 of FIG. 69.

The AFEs 2296A-2296D communicate with the processor 2292 over a shared I2C channel. As shown in FIG. 70A, a multiplexor 2300 is connected between the processor 2292 and the AFEs 2296A-2296D on the shared I2C channel. The processor 2292 provides selection inputs to the multiplexor 2300 in order to select an AFE 2296 between the 2296A-2296D with which the processor 2292 exchanges communications at a particular time. As shown in FIG. 70B, multiple multiplexors 2300A-2300B may also be used over multiple I2C channels to facilitate communications between the processor 2292 and the AFEs 2296A-2296D. The battery monitoring circuit 2288 may also include an opto-coupling circuit 2302.

Figure 71:
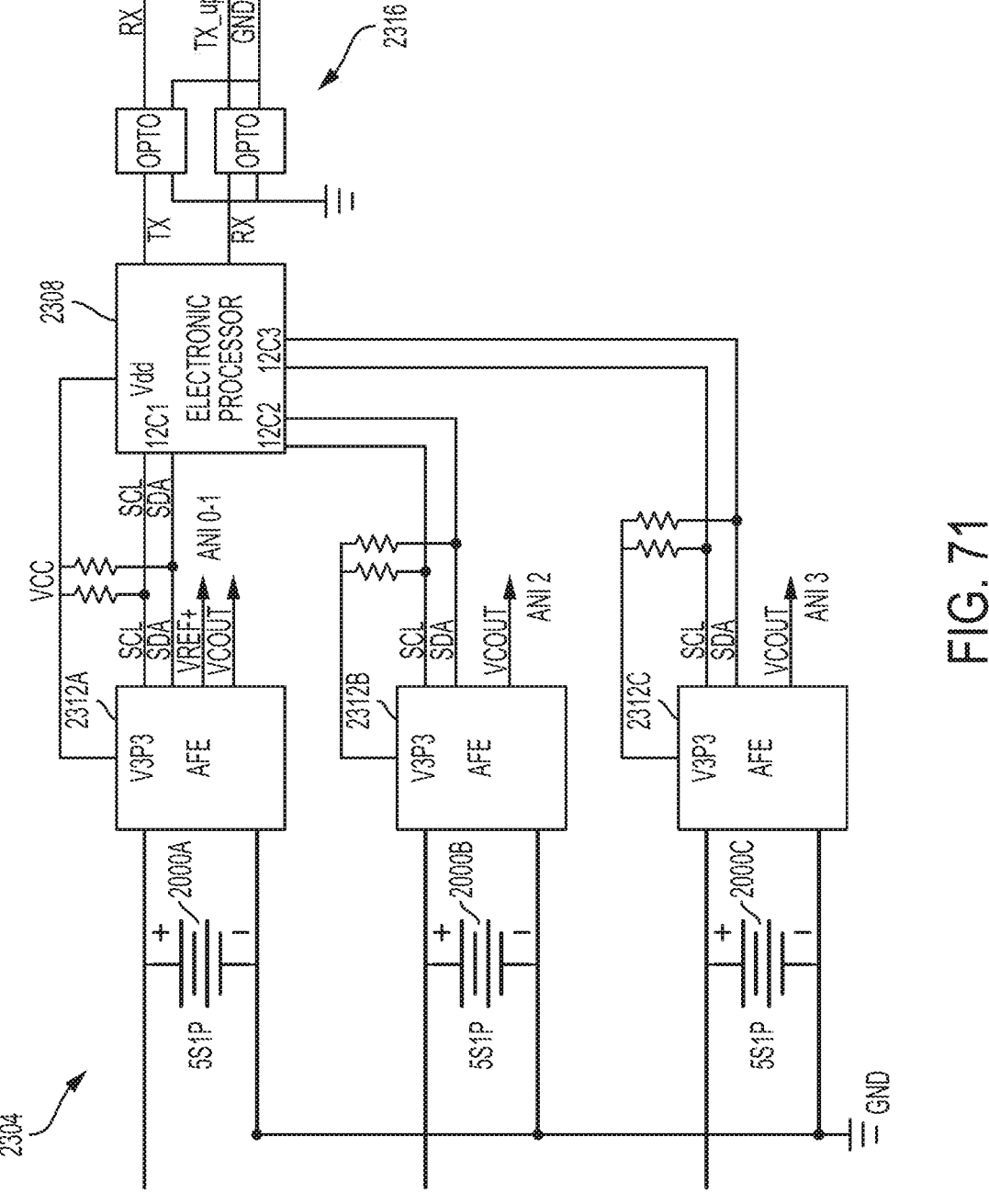
FIG. 71 is a block diagram of a battery monitoring circuit using multiple inter-integrated circuit buses.

FIG. 71 illustrates a further alternative battery monitoring circuit 2304 using multiple inter-integrated circuit (I2C) buses. As illustrated, the battery monitoring circuit 2304 includes three 5S1P cell blocks 2000A-2000C monitored by a single electronic processor 308 using AFEs 2312A-2312C respectively. The battery monitoring circuit 2304 operates in a manner similar to the battery monitoring circuit 2272 of FIG. 20. However, the AFEs 2312A-2312C communicate with the processor 2308 over multiple I2C channels.

For example, the AFE 2312A communicates with the processor 2308 over I2C channel I2C 1, the AFE 2312B communicates with the processor 2308 over I2C channel I2C 2, and so on. Outputs of the AFEs 2312A-2312C are provided at analog inputs ANI0-3 of the processor 2308 similar to the battery monitoring circuit 2272 of FIG. 69. The battery monitoring circuit 2304 may include more or fewer cell blocks 2000 monitored by the processor 2308 using more or fewer AFEs 2312 over multiple I2C channels. The battery monitoring circuit 2304 may also include an opto-coupling circuit 2316.

Figure 72:
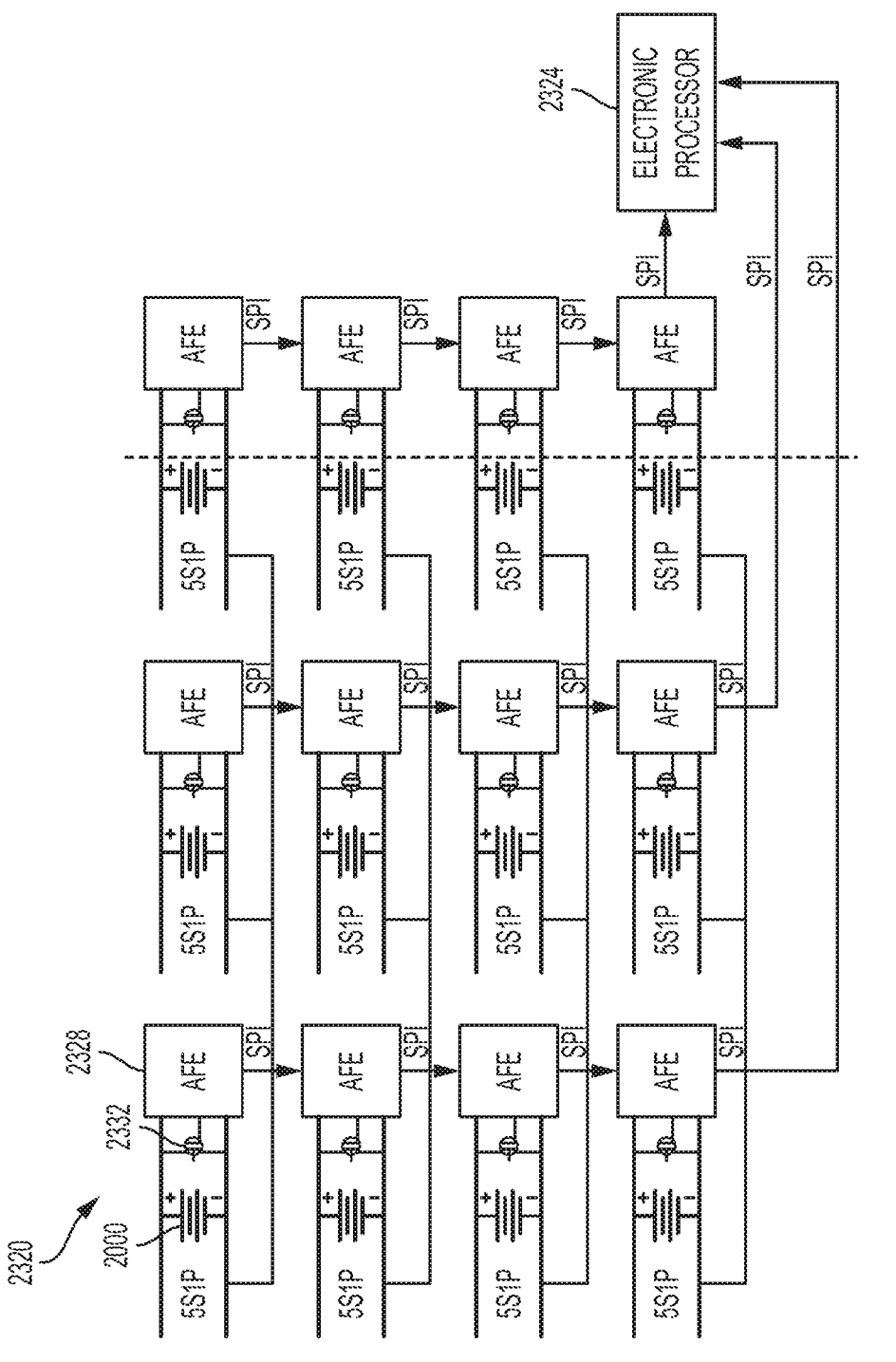
FIG. 72 is a block diagram of a battery monitoring circuit using a serial peripheral interface.

FIG. 72 illustrates another alternative battery monitoring circuit 2320 using serial peripheral interface. As illustrated, several 5S1P block 2000 are monitored by a single electronic processor 2324 using several AFEs 2328. The AFEs 2328 communicate with the processor 2324 using serial peripheral interface bus. The battery monitoring circuit 2320 may also include several switches 2332 with resistors connected across each cell block 2000 to discharge the cell blocks 2000 during cell balancing.

Similar cell monitoring/balancing arrangements are described and illustrated in U.S. patent application Ser. No. 15/376,497, filed Dec. 12, 2016, now U.S. Patent Application Publication No. US 2017/0170671, published Jun. 15, 2017, the entire contents of which is hereby incorporated by reference.

Figure 73:
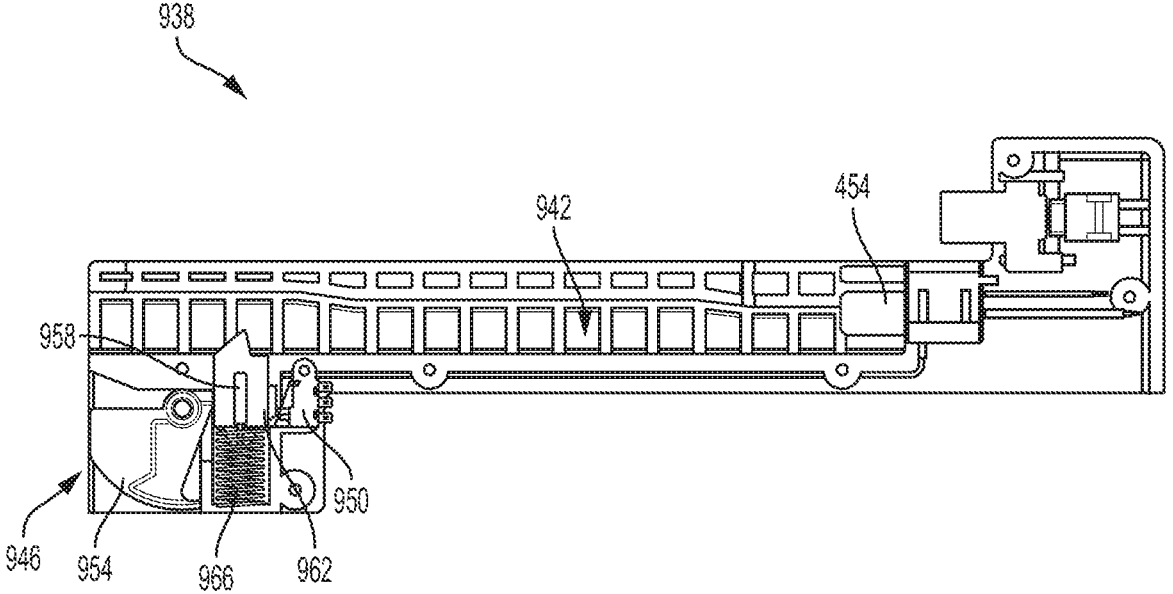
FIG. 73 is a cross-sectional side view of a battery receiving portion of the power tool of FIG. 1.

FIG. 73 illustrates a battery receiving portion 938 of the power tool 14 in accordance with some embodiments. The battery receiving portion 938 includes a projection/recess 942, the tool terminal block 454, a latching mechanism 946, and a power disconnect switch 950. The projection/recess 842 cooperates with the projection/recess 498 of the battery pack 18 to attach the battery pack 18 to the power tool 14. When the battery pack 18 is attached to the power tool 14, the tool terminal block 454 and the battery terminal block 494 are coupled to each other.

The latching mechanism 946 protrudes from a surface of the battery receiving portion 938 and is configured to engage the battery pack 18 to maintain engagement between the battery pack 18 and the battery receiving portion 938. In other embodiments (not shown), the latching mechanism 946 may be disposed at various locations (e.g., on a sidewall, an end wall, an upper end wall etc., of the battery receiving portion 938) such that the latching mechanism 946 engages corresponding structure on the battery pack 18 to maintain engagement between the battery pack 18 and the battery receiving portion 938.

The latching mechanism 946 includes a pivotable actuator or handle 954 operatively engaging a latch member 958. The latch member 958 is slidably disposed in a bore 962 and is biased by one or more biasing member 966 (e.g., a spring) to protrude through a surface of the battery receiving portion 938 into a cavity in the battery pack 18.

The latching mechanism also 946 includes the power disconnect switch 950 (e.g., a micro-switch) facilitating electrical coupling/decoupling of the battery pack 18 from the battery receiving portion 938 during actuation of the handle 954 to withdraw the latch member 958 from the battery pack 18. The power disconnect switch 950 may act to electrically decouple the battery pack 18 from the power tool 10 prior to removal of the battery pack 10 from the battery receiving portion 938.

The power disconnect switch 950 is actuated when the latch member 958 is moved from a latched position (i.e., when the latch member 958 is completely within the cavity of the battery pack 18) to an intermediate position. The power disconnect switch 950 is electrically coupled to the first controller 402 and may generate an interrupt to indicate that the battery pack 18 is being disconnected from the power tool 10. When the first controller 402 receives the interrupt, the first controller 402 begins a power down operation to safely power down the electronics of the power tool 10.

Similar latching mechanisms and disconnect switch arrangements are described and illustrated in U.S. Provisional Patent Application No. 62/435,443, filed Dec. 16, 2016, in U.S. Provisional Patent Application No. 62/463, 427, filed Feb. 24, 2017, and in U.S. patent application Ser. No. 15/845,063, filed Dec. 18, 2017, the entire contents of all of which are hereby incorporated by reference.

Figure 75:
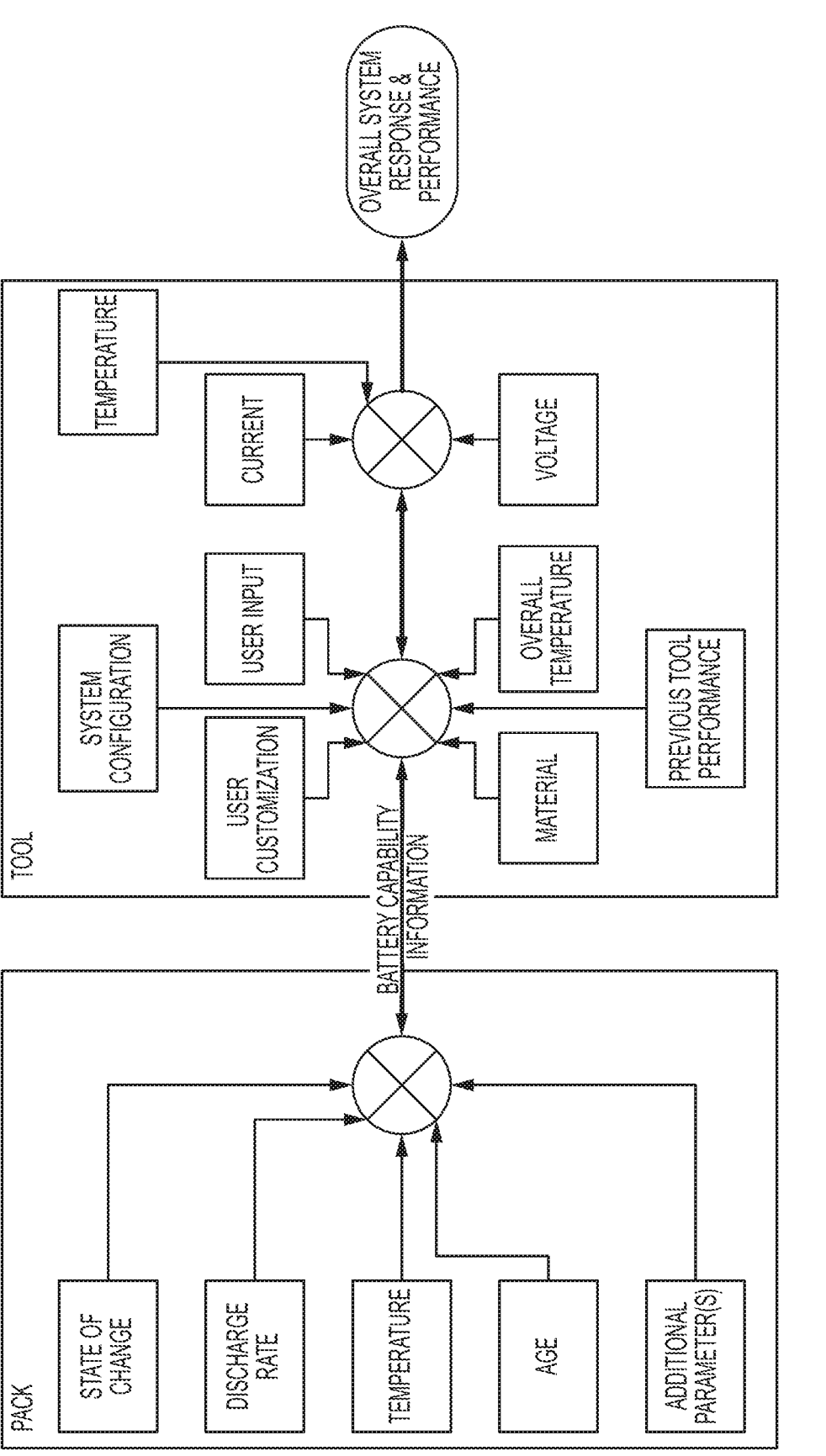
FIG. 75 is schematic illustration of the high power electrical combination.

FIG. 75 schematically illustrates the high power electrical combination. Inputs to and communication to and between the controllers 402, 406, 574 are generally illustrated, as is the output from the electrical combination.

Figure 76:
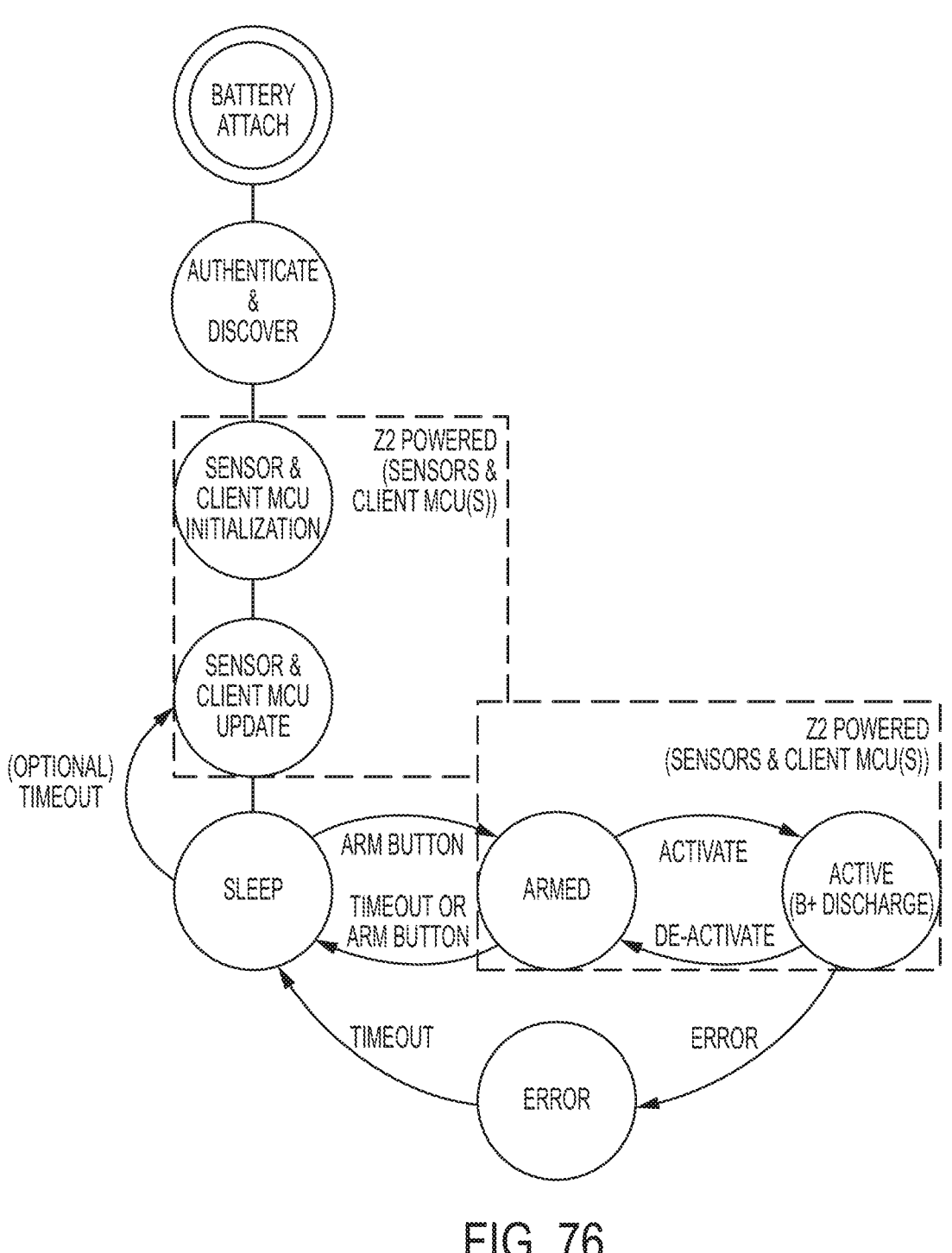
FIG. 76 is a state diagram of a tool or device.

FIG. 76 is a state diagram of the power tool or device. It should be noted that, in the tool or device, there is a potential transition from each state to an "Error" state.

Figure 77:
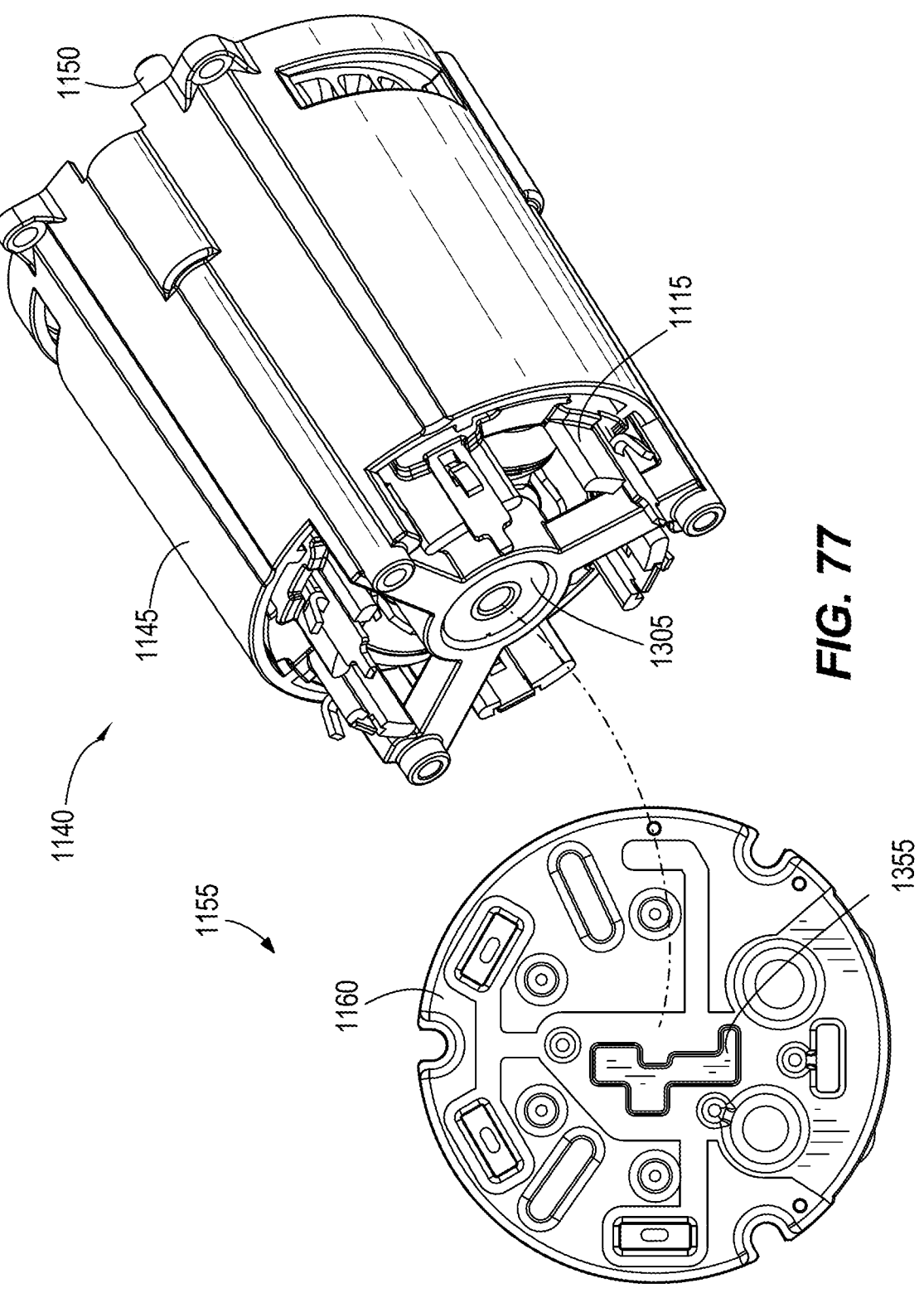
FIG. 77 is a perspective view of a motor assembly in accordance with some embodiments, illustrating a PCB assembly exploded from the remainder of the motor assembly.
Figure 78:
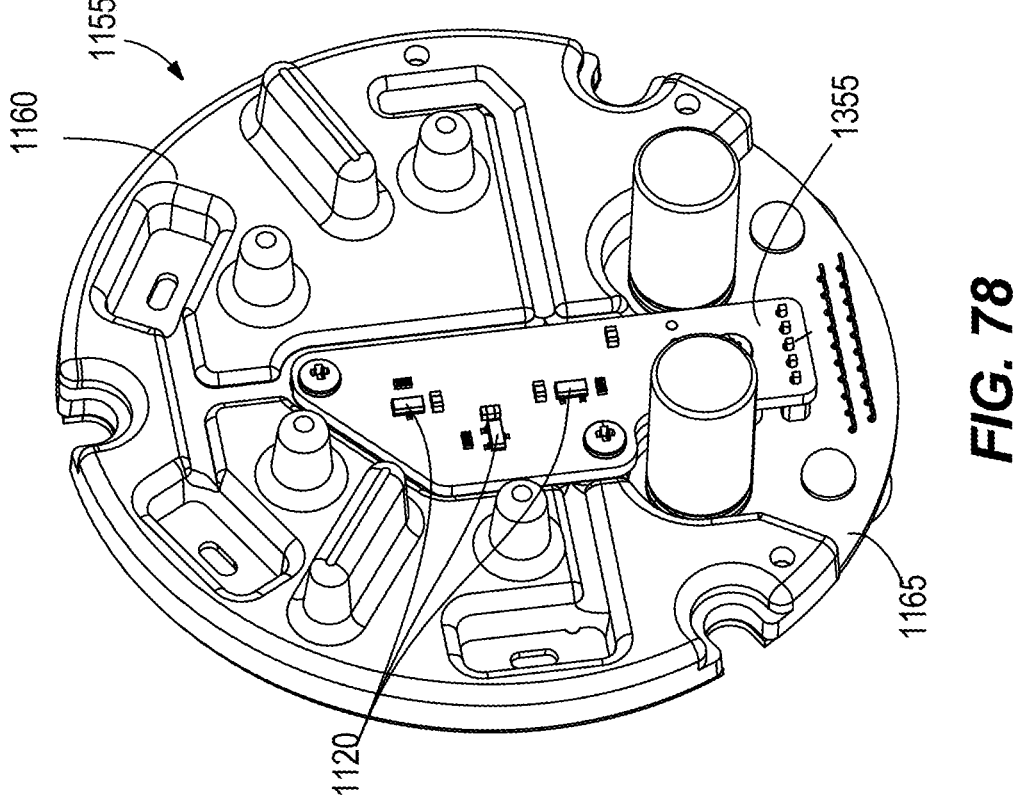
FIG. 78 is a perspective view of the PCB assembly of FIG. 77, with portions removed.

With reference to FIGS. 77-78, a motor assembly 1140 is shown including a motor housing 1145, a motor 1115 positioned within the motor housing 1145, and a PCB assembly 1155 coupled to an end of the motor housing 1145 opposite the end from which a motor shaft 1150 protrudes. The PCB assembly 1155 includes a heat sink 1160, a power PCB 1165 disposed on a rear side of the heat sink 1160, and a position sensor PCB 1355 disposed on an opposite side of the heat sink 1160. The motor 1115 also includes a permanent ring magnet 1305 mounted on the rear of the rotor shaft 1150. The ring magnet 1305 is affixed to the rotor shaft 1150 and co-rotates with the rotor shaft 1150, emanating a rotating magnetic field that is detectable by Hall-effect sensors 1120 (FIG. 78) mounted on the position sensor PCB 1355. In other words, the Hall-effect sensors 1120 on the position sensor PCB 1355 detect the rotating magnetic field emanated by the ring magnet 1305. In some embodiments, the position sensor PCB 355 is at least partially covered by a low-pressure molding.

The Hall-effect sensors 1120 output motor feedback information, such as an indication (e.g., a pulse) when the Hall-effect sensors detect a pole of a magnet 1305 attached to a rotating shaft 1150 of the motor 1115. Based on the motor feedback information from the Hall-effect sensors 1120, the motor controller may determine the rotational position, velocity, and/or acceleration of the shaft 1150. In the illustrated embodiment, there are three Hall-effect sensors 1120 on the position sensor PCB 1355. Alternatively, there may be other numbers of Hall-effect sensors 1120 (e.g., two, four, etc.).

Figure 79:
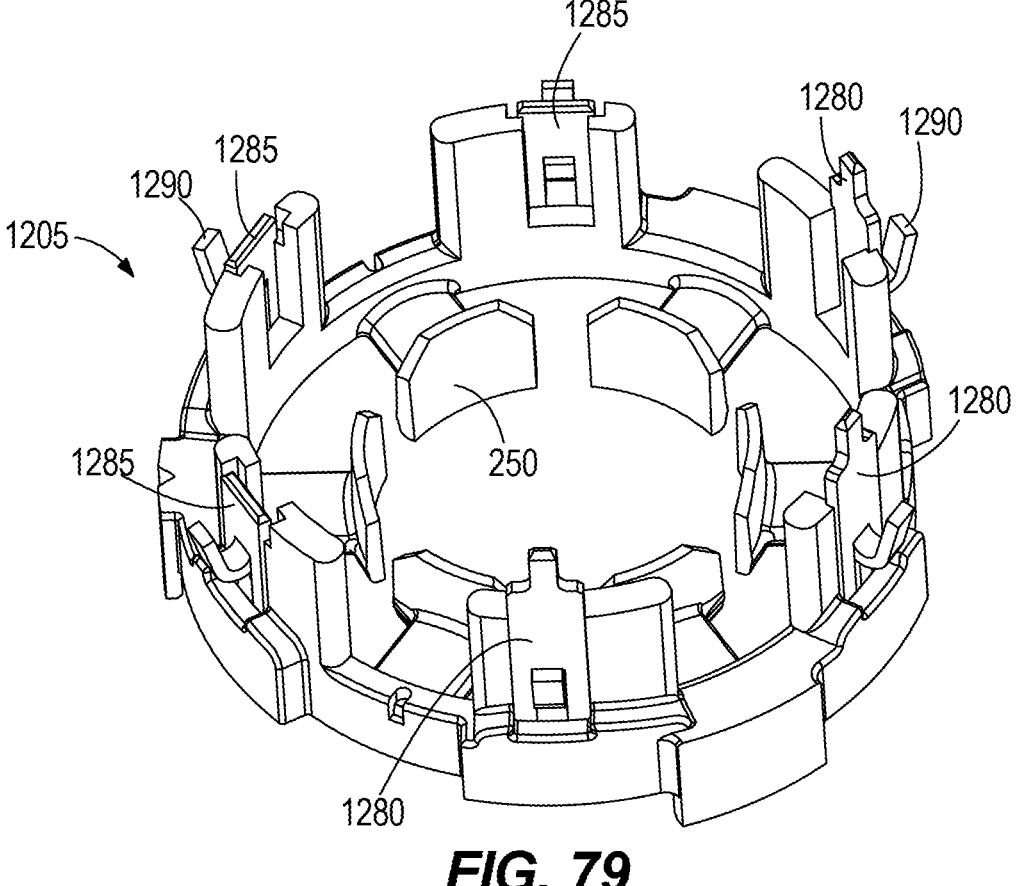
FIG. 79 is a perspective view of an end cap in accordance with some embodiments, with coil contact plates overmolded therein.
Figure 80:
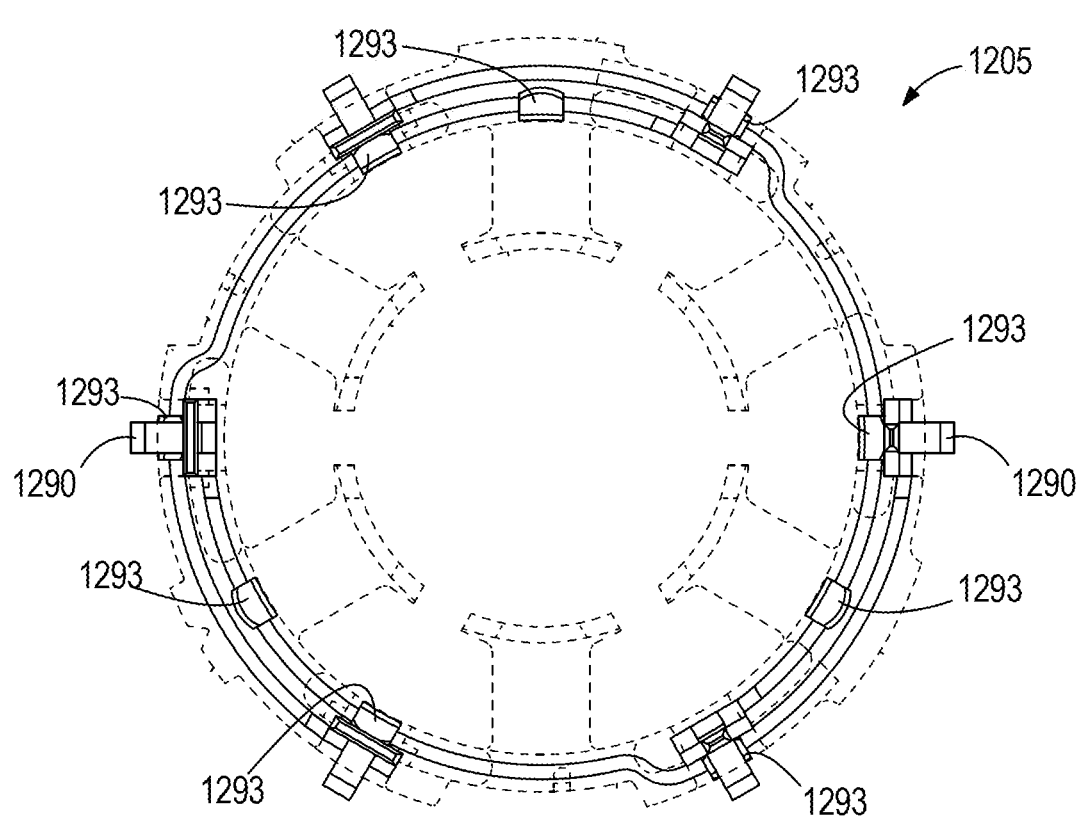
FIG. 80 is a front view of the end cap and coil contact plates of FIG. 79, illustrating the end cap in a transparent state.
Figure 81:
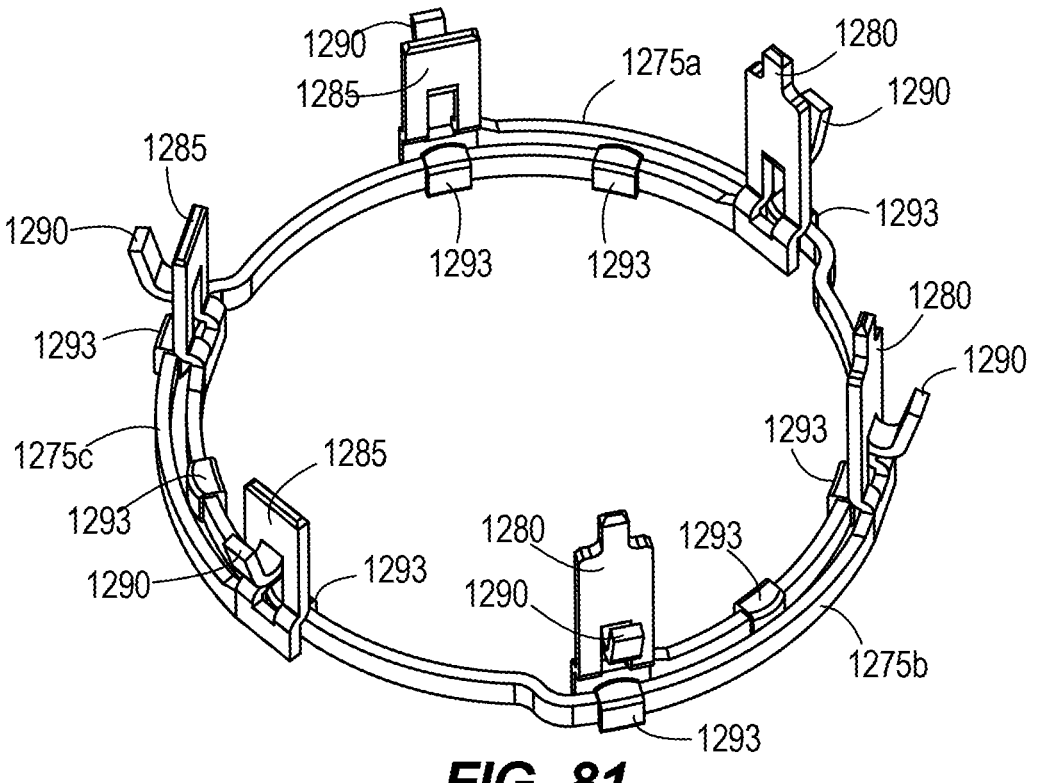
FIG. 81 is perspective view of the coil contact plates of FIG. 79.
Figure 82:
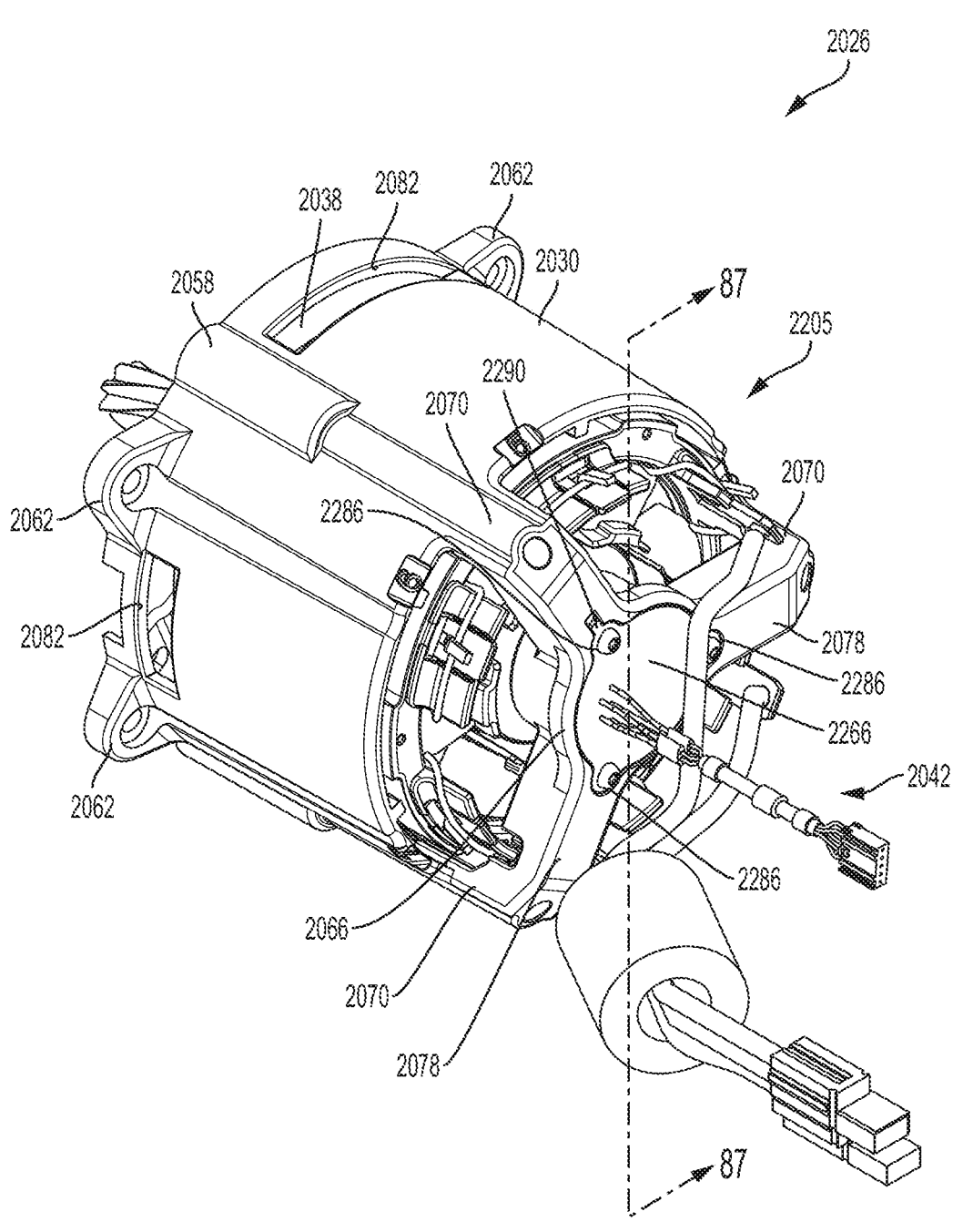
FIG. 82 is a perspective view of a motor assembly in accordance with some embodiments.
Figure 83:
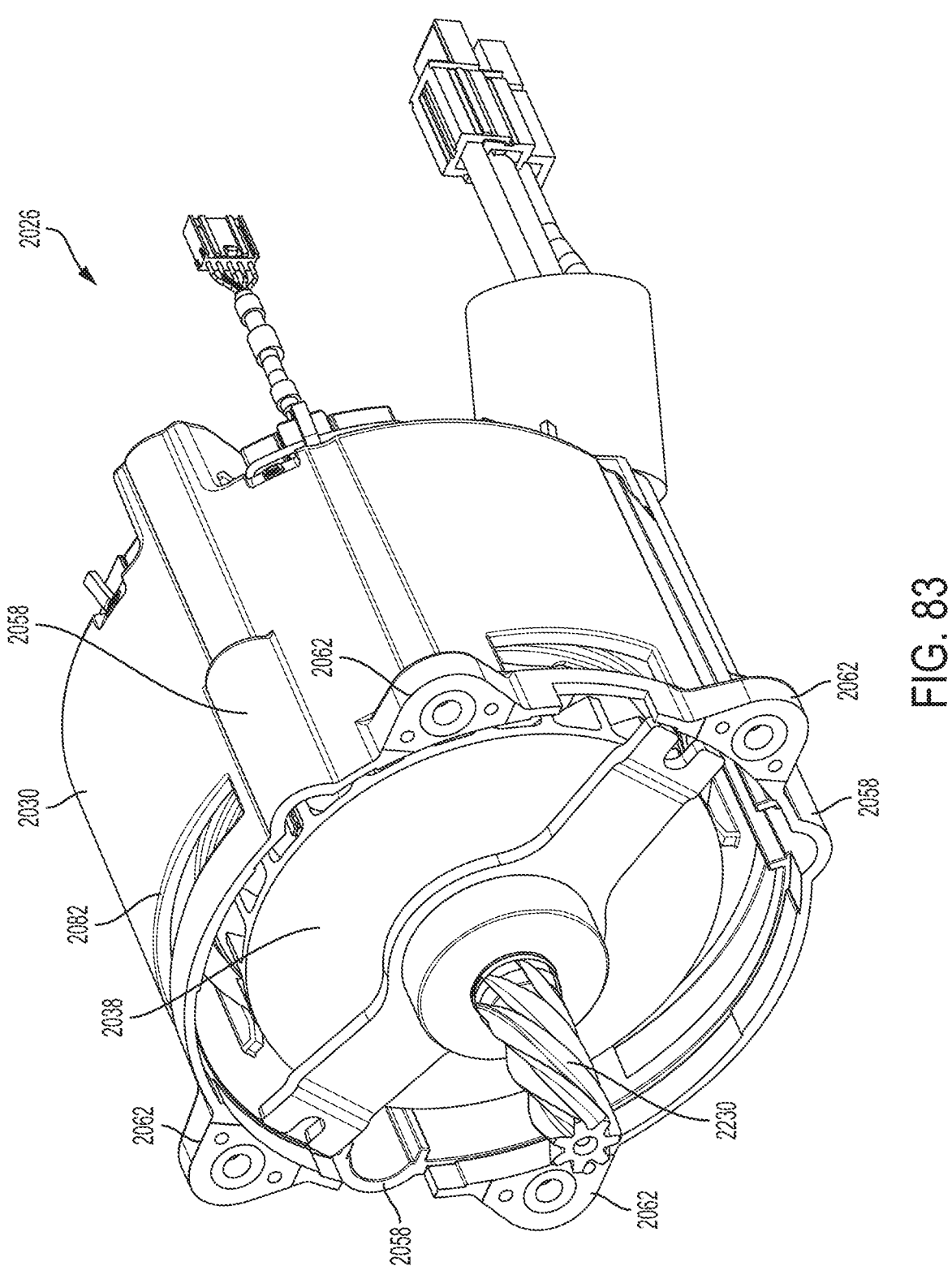
FIG. 83 is another perspective view of the motor assembly of FIG. 82.

With reference to FIG. 79-81, an end cap 1205 is shown with contact plates 1275a, 1275b, and 1275c (also referred interchangeably herein as coil contact plates 1275) that short-circuit diagonally opposite pairs of coil windings. The coil contact plates 1275 are generally semi-circular in shape and staggered to avoid contact between adjacent coil contact plates 1275. In particular, the first coil contact plate 1275a is positioned radially inward of the second coil contact plate 1275b, and the first coil contact plate 1275a is positioned radially outward of the third coil contact plate 1275c. Each of the coil contact plates 1275 includes a first terminal 1280 and a second terminal 1285 diagonally opposite the first terminal 1280. Stator windings are connected to hooks 1290 on the respective terminals 1280, 1285.

With continued reference to FIGS. 80 and 81, a plurality of spacers 1293 are coupled to the coil contact plates 1275. At least some of the spacers 1293 are positioned between adjacent coil contact plates 1275 in order to create and maintain an insulating gap (e.g., a space) between the adjacent coil contact plates 1275. In some embodiments, the plurality of spacers 1293 are equally spaced circumferentially around the coil contact plates 1275. The spacers 1293 are pre-molded onto the coil contact plates 1275 before the coil contact plates 1275 are overmolded. As such, the coil contact plates 1275 and the spacers 1283 are overmolded in the end cap 1205. In particular, each of the spacers 1293 are molded on one of the coil contact plates 1275. In the illustrated embodiment, the spacers 1293 include a first spacer positioned between the first and second adjacent coil contact plates 1275a, 1275b, and a second spacer 1293 positioned between the adjacent first and third coil contact plates 1275a, 1275c. As such, insulating gaps are created between the adjacent coil contact plates 1275. The pre-molded spacers 1293 prevent internal shorts between coil contact plates 1275 and portions of the coil contact plates 1275 being exposed. In other words, the relative spacing between adjacent coil contact plates 1275 may be difficult to adequately control during an injection molding process, and the coil contact plates 1275 may deform during the molding process from the injection pressure. This deformation of the coil contact plates 1275 can cause internal shorts or exposure. By adding the pre-molding spacers 1293, deformation of the coil contact plates 1275 while being overmolded is prevented.

With reference to FIGS. 82-88, a motor assembly 2026 is shown including a motor housing 2030, a motor 2034 positioned within the motor housing 2030, and a rotor position sensing assembly 2042 coupled to an end of the motor housing 2030. The motor 2034 includes a stator 2046 and a rotor 2050 positioned at least partially within the stator 2046. The motor assembly 2026 is similar to the motor assembly 26 of FIGS. 3-6B, and similar features have been referenced with the same reference numeral plus "2000."

Figure 85:
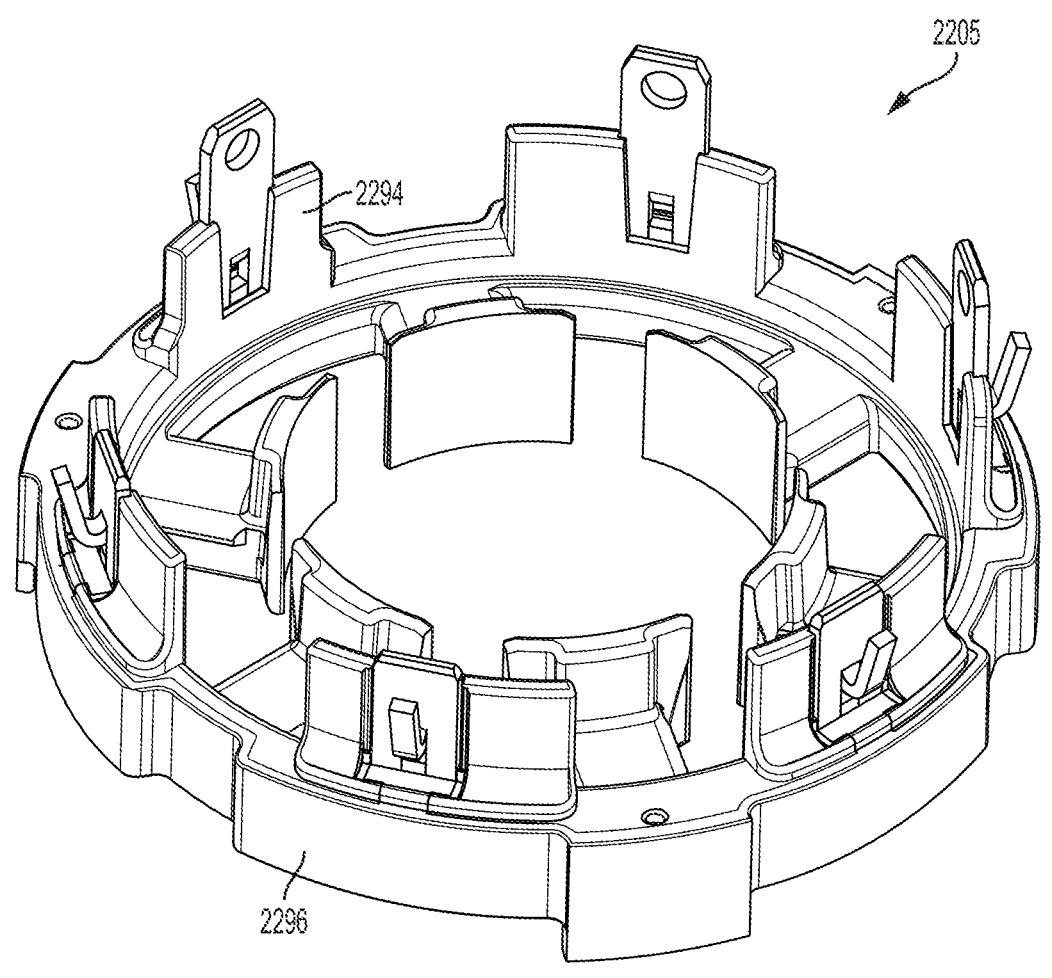
FIG. 85 is a perspective view of a stator end cap of the motor assembly of FIG. 82 with coil contact plates overmolded therein.
Figure 86:
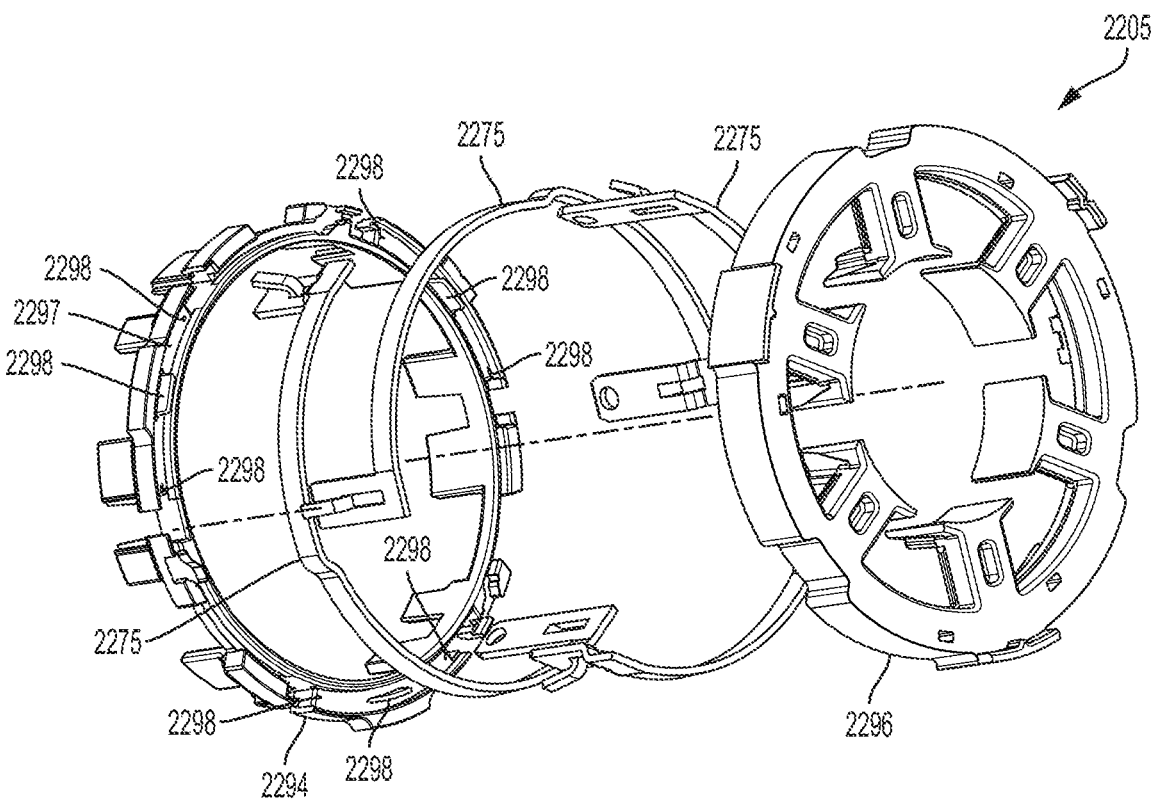
FIG. 86 is an exploded perspective view of the stator end cap of FIG. 85.

With reference to FIGS. 85-86, the motor assembly 2026 includes a stator end cap 2205, with contact plates 2275 (also referred to herein as coil contact plates 2275) that short-circuit diagonally opposite pairs of coil windings. The coil contact plates 2275 are generally semi-circular in shape and staggered to avoid contact between adjacent coil contact plates 2275. In particular, the first coil contact plate 2275 is positioned radially inwardly of the second coil contact plate 2275, and the first coil contact plate 2275 is positioned radially outwardly of the third coil contact plate 2275.

In the end cap 2205 of FIGS. 85-86, the coil contact plates 2275 are first positioned in a pre-molded annular carrier 2294 prior to being positioned in a mold for applying an outer resin layer 2296 to the pre-assembled carrier 2294 and coil contact plates 2275. The illustrated carrier 2294 includes a single circumferential groove 2297 defined in a side of the end cap 2205 facing the stator 2046 in which the coil contact plates 2275 are positioned (FIG. 86). A plurality of ribs 2298 are located in the groove 2297 for maintaining an air gap between adjacent coil contact plates 2275, thereby preventing relative movement between the plates 2275 during an injection molding process to apply the resin layer 2296 that might otherwise cause two adjacent plates 2275 to come into contact and short.

Figure 84:
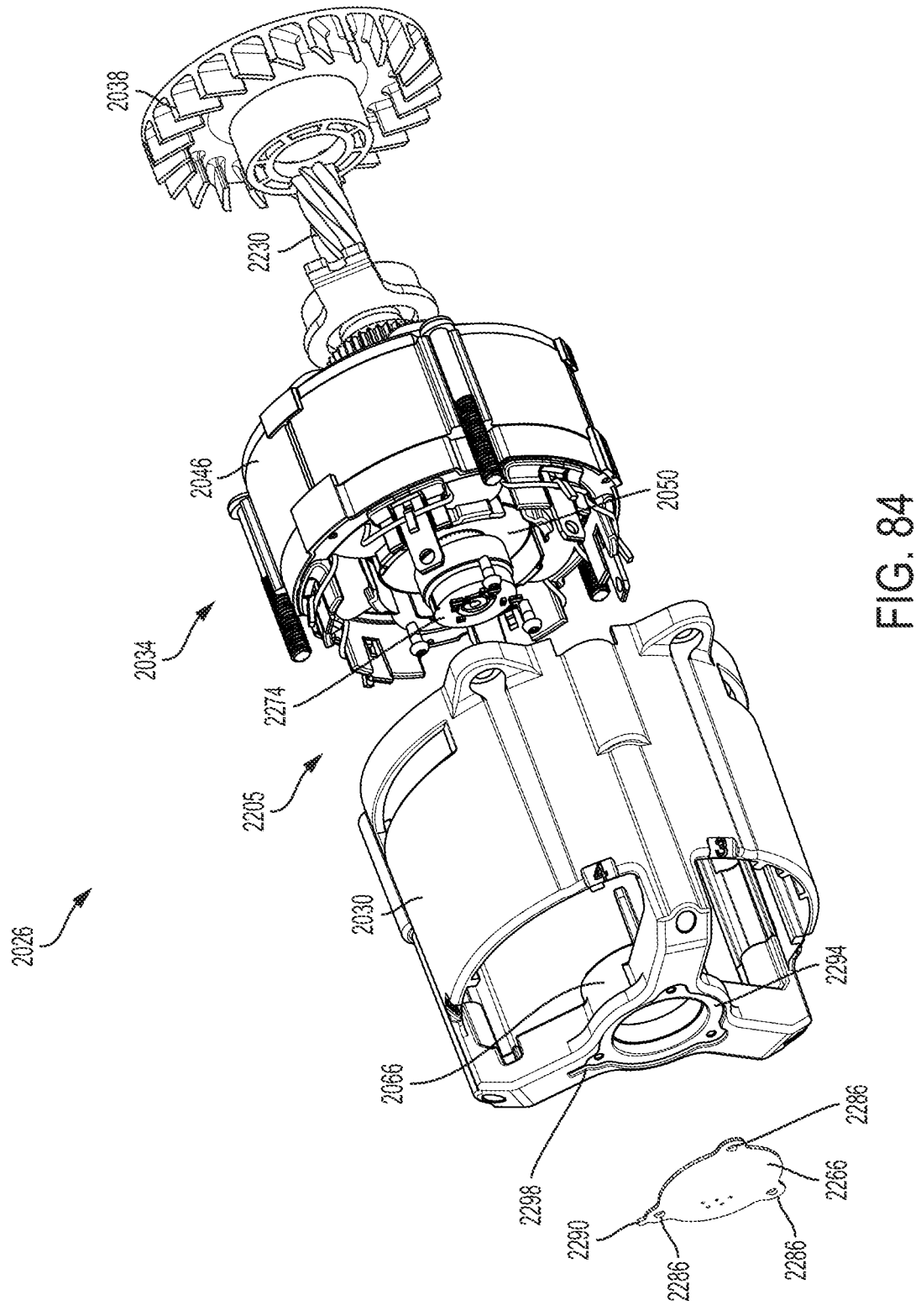
FIG. 84 is an exploded perspective view of the motor assembly of FIG. 82.
Figure 87:
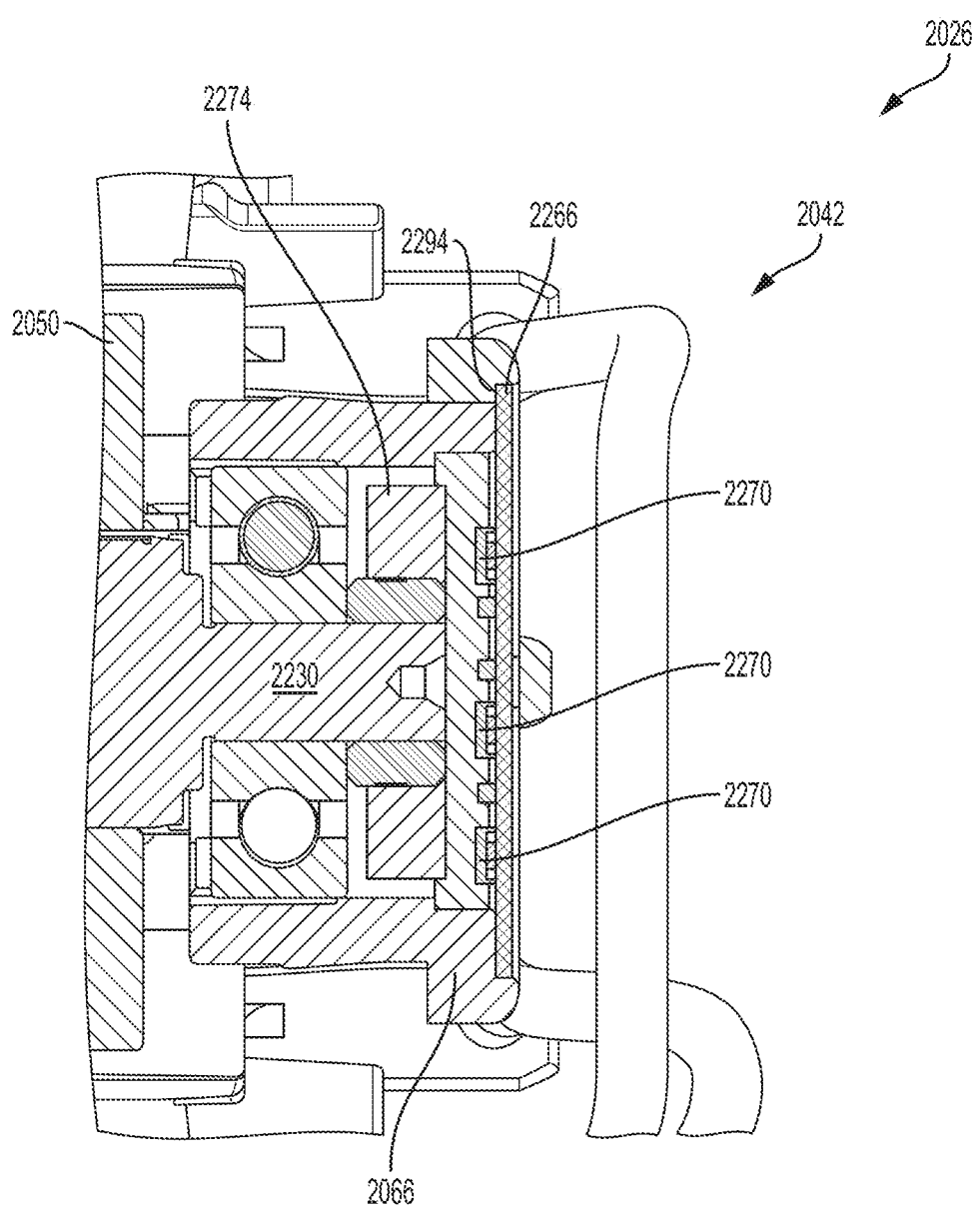
FIG. 87 is a partial cross-sectional view of the motor assembly of FIG. 82, taken generally along lines 87-87 in FIG. 82.

With reference to FIG. 87, the rotor position sensing assembly 2042 includes a printed circuit board (PCB) 2266, a plurality of Hall-effect sensors 2270, and a magnet 2274. The illustrated PCB 2266 includes three mounting lobes 2286 and a tab 2290 for properly orienting the PCB 2266. In the illustrated embodiment, the tab 2290 is formed on one of the mounting lobes 2286. Specifically, the PCB 2266 is received within a recess 2294 formed in the hub portion 2066 of the motor housing 2030 (FIG. 84). The recess 2294 defines a slot 2298 (FIG. 84) to receive the tab 2290 to enable installation of the rotor position sensing assembly 2042 in only the correct orientation.

With continued reference to FIG. 87, the illustrated magnet 2274 is a circular magnet with at least two magnetic poles. In particular, the magnet 2274 is a hollow ring mounted around a rotor shaft 2230. Specifically, the ring magnet 2274 is affixed to the rotor shaft 2230 and co-rotates with the rotor shaft 2230, emanating a rotating magnetic field detectable by Hall-effect sensors 2270 (FIG. 87) mounted on the position sensor PCB 2266. In other words, the Hall-effect sensors 2270 on the position sensor PCB 2266 detect the rotating magnetic field emanated by the ring magnet 2274.

The Hall-effect sensors 2270 are mounted to the PCB 2266 in facing relationship with the magnet 2274. In particular, the Hall-effect sensors 2270 are mounted aligned with and spaced from the magnet 2274. In other words, the Hall-effect sensors 2270 are co-axially mounted with respect to the magnet 2274. In the illustrated embodiment, the Hall-effect sensors 2270 are spaced less than 90 degrees apart from an adjacent Hall-effect sensor 2270.

Figure 88:
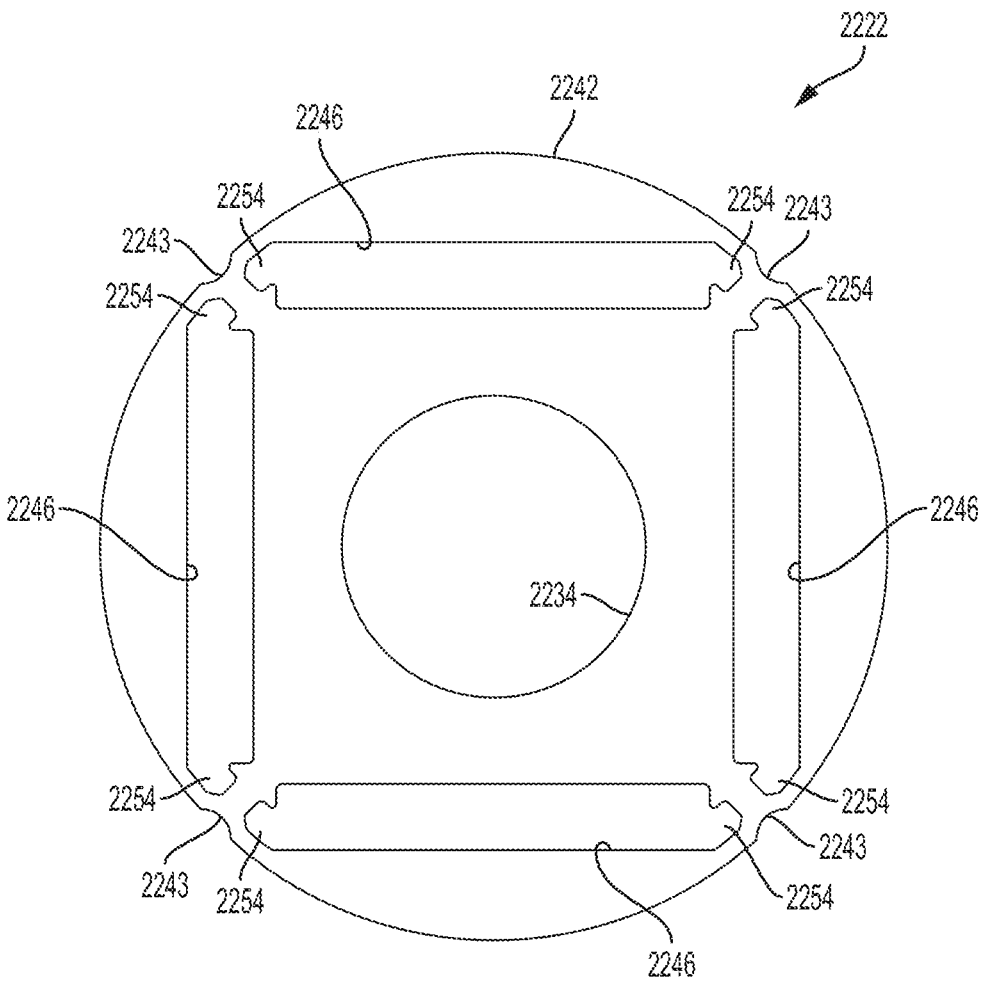
FIG. 88 is a front view of a rotor lamination of the motor assembly of FIG. 82.

With reference to FIG. 88, the rotor 2050 includes individual rotor laminations 2222 stacked together to form the rotor 2050. The rotor shaft 2230 is positioned through a center aperture 2234 in the rotor laminations 2222. The rotor laminations 2222 include a circular outer circumference 2242 with a plurality of notches 2243 formed in the circular outer circumference 2242. The rotor laminations 2222 also include a plurality of slots 2246 in which permanent magnets are received. In the illustrated embodiment, the rotor 2050 is an interior permanent magnet type rotor (a.k.a., a buried magnet type rotor). In the illustrated embodiment, the plurality of slots 2246 further include air barriers 2254 (i.e., flux barriers) at ends of the slots 2246. In addition to improving the magnetic characteristics of the rotor 2050, the air barriers 2254 may accommodate adhesive to aid in retaining the permanent magnets within the slots 2246. The notches 2243 are positioned between two adjacent air barriers 2254.

Thus, the invention may provide, among other things, high-power, battery-powered electrical system, such as a power tool system.

Although the invention has been described in detail with reference to certain preferred embodiments, variations and modifications exist within the scope and spirit of one or more independent aspects of the invention as described.

One or more independent features and/or independent advantages of the invention may be set forth in the claims.

What is claimed is:

1. An electrical combination comprising:
   a tool including
   a tool housing,
   a motor supported by the tool housing and including an output shaft,
   a tool terminal electrically connected to the motor, and
   a first controller including a first electronic processor supported by the tool housing and operable to control the motor;
   a battery pack including
   a pack housing,
   battery cells supported by the pack housing, the battery cells being electrically connected,
   a second controller including a second electronic processor supported by the pack housing, and
   a pack terminal electrically connectable to the tool terminal to transfer current between the battery pack and the tool; and
   a third controller including a third electronic processor operable to communicate between with the second controller and the first controller to control operation of the tool, wherein a functional load of the electrical combination is distributed among the first controller and the third controller.

2. The combination of claim 1, wherein the first controller is formed as a modular unit with the motor, wherein the motor includes a motor housing, a stator supported by the motor housing, and a rotor supported by the motor housing, and wherein the first controller is supported by the motor housing.

3. The combination of claim 1, wherein the pack housing is connectable to and supportable by the tool housing such that the battery pack is supportable by the tool.

4. The combination of claim 1, wherein the third controller is configured to:
   determine a discharge capability of the battery pack, wherein the discharge capability is determined based on condition of the battery pack; and
   communicate the discharge capability to the first controller,
   wherein the first controller is configured to control operation of the motor based on the discharge capability.

5. The combination of claim 4, wherein the third controller is configured to:
   after a time interval, determine a second discharge capability of the battery pack, the second discharge capability being different from the discharge capability; and
   communicate the second discharge capability to the first controller,
   wherein the first controller is configured to control operation of the motor based on the second discharge capability.

6. The combination of claim 1, wherein the third controller and the second controller are configured to communicate via a grouped read, the grouped read including a group of measurements or states of the battery pack or the tool.

7. The combination of claim 6, wherein the third controller and the second controller are configured to communicate via a group including one or more of a battery pack voltage measured after a discharge switch in the battery pack and daughterboard information, the daughterboard information including a communication state, a communication retry and a board interface retry.

8. The combination of claim 6, wherein the third controller and the second controller are configured to communicate via a group including one or more of errors or warnings for temperature or state of charge.

9. The combination of claim 6, wherein the third controller and the second controller are configured to communicate via a group including one or more of a battery pack voltage measured after a discharge switch in the battery pack and daughterboard information, the daughterboard information including a communication state, a communication retry and a board interface retry.

10. The combination of claim 6, wherein the third controller and the second controller are configured to communicate via a group including a dynamic load request, the dynamic load request including one or more of a target current, diagnostic information and voltage and current information.

11. The combination of claim 1, wherein the tool includes a trigger assembly engageable by a user to operate the motor, and wherein the third controller communicates with the trigger assembly to determine trigger information, the third controller providing the trigger information to the first controller, the first controller controlling operation of the motor based on the trigger information.

12. The combination of claim 11, wherein the first controller includes an inverter bridge, the first controller controlling operation of the motor through the inverter bridge, wherein the inverter bridge includes a high-side field effect transistor (FET) electrically connected between the battery pack and the motor and a low-side FET electrically connected between the motor and ground, wherein each FET has a drain-source breakdown voltage of at least 120 V, and wherein each FET has a continuous drain current of at least about 50 A, a pulsed drain current of at least about 200 A, and a drain-source on-state resistance of less than about 15 mΩ.

13. An electrical combination comprising:
a tool including
a tool housing,
a motor supported by the tool housing and including an output shaft,
a tool terminal electrically connected to the motor, and
a motor controller including a first electronic processor supported by the tool housing and operable to control the motor, wherein the motor controller is formed as a modular unit with the motor;
a battery pack including
a pack housing,
battery cells supported by the pack housing, the battery cells being electrically connected,
a pack controller including a second electronic processor supported by the pack housing, and
a pack terminal electrically connectable to the tool terminal to transfer current between the battery pack and the tool;
a main controller including a third electronic processor operable to communicate between the battery pack and the motor controller to control operation of the tool, wherein a functional load of the electrical combination is distributed among the motor controller and the main controller.

14. The combination of claim 13, wherein the motor includes a motor housing, a stator supported by the motor housing, and a rotor supported by the motor housing, and wherein the motor controller is supported by the motor housing.

15. The combination of claim 14, wherein the tool includes a trigger assembly engageable by a user to operate the motor, and wherein the main controller communicates with the trigger assembly to determine trigger information, the main controller providing the trigger information to the motor controller, the motor controller controlling operation of the motor based on the trigger information.

16. The combination of claim 15, further comprising:
an inverter bridge, wherein the inverter bridge includes a high-side field effect transistor (FET) electrically connected between the battery pack and the motor and a low-side FET electrically connected between the motor and ground, and wherein the motor controller controls operation of the motor through the inverter bridge.

17. The combination of claim 16, wherein each FET has a drain-source breakdown voltage of at least 120 V, wherein each FET has a continuous drain current of at least about 50 A, a pulsed drain current of at least about 200 A, and a drain-source on-state resistance of less than about 15 mΩ.

18. The combination of claim 13, wherein the main controller is configured to:
determine a discharge capability of the battery pack, wherein the discharge capability is determined based on condition of the battery pack; and
communicate the discharge capability to the motor controller,
wherein the motor controller is configured to control operation of the motor based on the discharge capability.

19. The combination of claim 18, wherein the main controller is configured to:

after a time interval, determine a second discharge capability of the battery pack, the second discharge capability being different from the discharge capability; and
communicate the second discharge capability to the motor controller,
wherein the motor controller is configured to control operation of the motor based on the second discharge capability.

20. The combination of claim 13, wherein the main controller and the pack controller are configured to communicate via a grouped read, the grouped read including a group of measurements or states of the battery pack or the tool.

21. The combination of claim 20, wherein the main controller and the pack controller are configured to communicate via a group including one or more of a battery pack voltage measured after a discharge switch in the battery pack and daughterboard information, the daughterboard information including a communication state, a communication retry and a board interface retry.

22. The combination of claim 20, wherein the main controller and the pack controller are configured to communicate via a group including one or more of errors or warnings for temperature or state of charge.

23. The combination of claim 20, wherein the main controller and the pack controller are configured to communicate via a group including one or more of a battery pack voltage measured after a discharge switch in the battery pack and daughterboard information, the daughterboard information including a communication state, a communication retry and a board interface retry.

24. The combination of claim 20, wherein the main controller and the pack controller are configured to communicate via a group including a dynamic load request, the dynamic load request including one or more of a target current, diagnostic information and voltage and current information.

25. A power tool comprising:
a tool housing;
a motor supported by the tool housing and including an output shaft;
a tool terminal electrically connected to the motor, the tool terminal electrically connectable to a battery pack terminal to transfer current between a battery pack and the power tool;
a first controller including a first electronic processor supported by the tool housing and operable to control the motor, wherein the first controller is formed as a modular unit with the motor;
a second controller including a second electronic processor supported by the tool housing and operable to communicate between a battery pack controller including a third electronic processor and the first controller to control operation of the power tool, wherein a functional load of the power tool is distributed among the first controller and the second controller.

26. The power tool of claim 25, wherein the motor includes a motor housing, a stator supported by the motor housing, and a rotor supported by the motor housing, and wherein the first controller is supported by the motor housing.

27. The power tool of claim 26, further comprising:
a trigger assembly engageable by a user to operate the motor, wherein the second controller communicates with the trigger assembly to determine trigger information, the second controller providing the trigger information to the first controller, the first controller controlling operation of the motor based on the trigger information.

28. The power tool of claim 27, further comprising:

an inverter bridge, wherein the inverter bridge includes a high-side field effect transistor (FET) electrically connected between the battery pack and the motor and a low-side FET electrically connected between the motor and ground, and wherein the first controller controls operation of the motor through the inverter bridge.

29. The power tool of claim 25, wherein the second controller is configured to:

determine a discharge capability of the battery pack coupled to the power tool, wherein the discharge capability is determined based on condition of the battery pack; and communicate the discharge capability to the first controller, wherein the first controller is configured to control operation of the motor based on the discharge capability.

30. The power tool of claim 29, wherein the second controller is configured to:

after a time interval, determine a second discharge capability of the battery pack, the second discharge capability being different from the discharge capability; and communicate the second discharge capability to the first controller, wherein the first controller is configured to control operation of the motor based on the second discharge capability.

\* \* \* \* \*